(12) United States Patent
Yamashita et al.

(10) Patent No.: US 7,285,334 B1
(45) Date of Patent: Oct. 23, 2007

(54) MATERIAL FOR PACKAGING CELL, BAG FOR PACKAGING CELL, AND ITS PRODUCTION METHOD

(75) Inventors: Rikiya Yamashita, Tokyo-To (JP); Kazuki Yamada, Tokyo-To (JP); Yuichi Hirai, Tokyo-To (JP); Youichi Mochiduki, Tokyo-To (JP); Takanori Yamashita, Tokyo-To (JP); Hitoshi Sekino, Tokyo-To (JP); Jun Fukuda, Tokyo-To (JP); Kouichi Mikami, Tokyo-To (JP); Hiroki Nakagawa, Tokyo-To (JP); Miho Miyahara, Tokyo-To (JP); Chie Kawai, Tokyo-To (JP); Hideki Arao, Tokyo-To (JP); Takakazu Goto, Tokyo-To (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 09/719,098

(22) PCT Filed: Apr. 10, 2000

(86) PCT No.: PCT/JP00/02330

§ 371 (c)(1),
(2), (4) Date: Dec. 8, 2000

(87) PCT Pub. No.: WO00/62354

PCT Pub. Date: Oct. 19, 2000

(30) Foreign Application Priority Data

| Apr. 8, 1999 | (JP) | 11-101528 |
| May 25, 1999 | (JP) | 11-145672 |
| May 25, 1999 | (JP) | 11-145687 |
| May 26, 1999 | (JP) | 11-147290 |
| Jun. 24, 1999 | (JP) | 11-177964 |
| Jul. 16, 1999 | (JP) | 11-202843 |
| Jul. 16, 1999 | (JP) | 11-202888 |
| Jul. 16, 1999 | (JP) | 11-202917 |
| Aug. 19, 1999 | (JP) | 11-233162 |
| Sep. 20, 1999 | (JP) | 11-266066 |

(51) Int. Cl.
B32B 15/04 (2006.01)
B32B 15/08 (2006.01)
B32B 27/08 (2006.01)

(52) U.S. Cl. ............ 428/458; 428/220; 428/332; 428/457; 428/461; 428/500; 428/515

(58) Field of Classification Search ............ 428/34.1, 428/34.3, 34.6, 34.7, 35.3, 35.8, 35.9, 323, 428/411.1, 413, 419, 423.1, 423.5, 423.7, 428/424.2, 457, 458, 461, 473.5, 474.4, 475.8, 428/500, 515, 480, 483, 220, 332
See application file for complete search history.

(56) References Cited

U.S. PATENT DOCUMENTS 3,644,245 A * 2/1972 Flanagan et al. ............ 524/262

(Continued)

FOREIGN PATENT DOCUMENTS

JP 59-103280 6/1984

(Continued)

Primary Examiner—Sheeba Ahmed
(74) Attorney, Agent, or Firm—Burr & Brown

(57) ABSTRACT

A lithium battery comprises a pouch (4) and a lithium battery module (2) packaged in the pouch (4). The pouch (4) is formed from a battery packaging laminated structure (10). The laminated structure (10) has an outermost layer (11), a barrier layer (12) and an innermost layer (14), or an outermost layer (11), a barrier layer (12), an intermediate layer (13) and an innermost layer (14) superposed in that order. The outermost layer (11) is formed of a formable base material, the barrier layer (12) is formed of a impermeable base material having a barrier property, the intermediate layer (13) is formed of a formable base material and the innermost layer (14) is formed of a heat-adhesive base material.

14 Claims, 23 Drawing Sheets

U.S. PATENT DOCUMENTS

| | | | |
|---|---|---|---|
| 3,867,322 A * | 2/1975 | Leumann et al. | 260/18 |
| 4,487,909 A * | 12/1984 | Coughlin et al. | 528/60 |
| 4,610,798 A * | 9/1986 | Burkus | 252/79.2 |
| 5,433,982 A * | 7/1995 | Yamada et al. | 428/35.7 |
| 5,445,856 A * | 8/1995 | Chaloner-Gill | 428/35.9 |
| 5,969,019 A * | 10/1999 | Kanai et al. | 524/140 |
| 6,010,759 A * | 1/2000 | Yamada et al. | 428/35.7 |
| 6,066,376 A * | 5/2000 | Krueger | 428/35.7 |
| 6,579,580 B1 * | 6/2003 | Yamada et al. | 428/34.2 |
| 6,761,994 B2 * | 7/2004 | Yamashita et al. | 429/171 |
| 6,841,298 B2 * | 1/2005 | Yamashita et al. | 429/179 |
| 6,877,216 B2 * | 4/2005 | Fukuda et al. | 29/730 |
| 7,008,721 B2 * | 3/2006 | Yamashita et al. | 429/184 |

FOREIGN PATENT DOCUMENTS

| | | |
|---|---|---|
| JP | 61-267928 | 11/1986 |
| JP | 02021557 A | 1/1990 |
| JP | 03-179666 | 8/1991 |
| JP | 08-315787 | 11/1996 |
| JP | 09-316422 | 12/1997 |
| JP | 10-208708 | 8/1998 |
| JP | 11-067166 | 3/1999 |
| JP | 11-185717 | 7/1999 |
| JP | 3062551 | 7/1999 |
| WO | WO99/36971 | 7/1999 |

* cited by examiner

MATERIAL FOR PACKAGING CELL, BAG FOR PACKAGING CELL, AND ITS PRODUCTION METHOD

TECHNICAL FIELD

The present invention relates to a battery packaging laminated structure resistant to acids and organic solvents, a battery pouch and a battery pouch manufacturing method. Generally, batteries, such as lithium batteries, include those using a liquid electrolyte, those using a gelled electrolyte and those using a solid electrolyte. Lithium batteries include lithium ion batteries and polymer batteries.

BACKGROUND ART

Various pouches formed by working various laminated structures each formed by laminating various kinds of sheets are used principally as packaging articles. Recently, lithium batteries each formed by packaging a lithium battery module in a pouch formed from a laminated structure have been developed.

A lithium battery module, which is also called a lithium secondary battery module, employs a polyelectrolyte, generates current by the agency of the migration of lithium ions and have positive and negative electrodes containing polymers as active substances.

The lithium battery comprises a lithium battery module having a positive electrode collector (aluminum or nickel), a positive electrode active substance layer (metal oxide, carbon black, a metal sulfide, an electrolytic solution or a polymer, such as polyacrylonitrile), an electrolytic layer (a carbonate electrolytic solution of propylene carbonate, ethylene carbonate, dimethyl carbonate or ethylene methyl carbonate, an inorganic solid electrolyte of a lithium salt or a gelled electrolyte), a negative electrode active layer (lithium, an alloy, carbon, a liquid electrolyte or a polymer, such as polyacrylonitrile) and a negative collector (copper, nickel or a stainless steel), and a package containing the lithium battery module therein.

The lithium battery is used as a power supply for personal computers, portable terminal devices, such as portable telephones and PDAs, video cameras, electric vehicles, robots, artificial satellites and the like and as an energy storage battery.

The lithium battery comprises a lithium battery module having a positive collector of aluminum or nickel, a positive electrode active substance layer of a metal oxide, carbon black, a metal sulfide, an electrolytic solution or a polymer, such as polyacrylonitrile, an electrolytic layer of a carbonate electrolytic solution of propylene carbonate, ethylene carbonate, dimethyl carbonate, ethyl carbonate or ethylene methyl carbonate, an inorganic solid electrolyte containing a lithium salt or a gelled electrolyte, a negative electrode active layer of lithium, an alloy, carbon, a liquid electrolyte or a polymer, such as polyacrylonitrile, and a negative collector of copper, nickel or a stainless steel, and a package containing the lithium battery module therein.

The package of the lithium battery is a cylindrical or parallelepipedic metal can formed by pressing a metal sheet or a pouch formed by working a multilayer film consisting of an outer layer, an aluminum layer and a sealant layer.

These packages for the lithium batteries have the following problems. The metal can has rigid walls and hence the shape of the lithium battery module is dependent on that of the metal can. Since the hardware is designed so as to conform to the shape of the battery pack, the dimensions of the hardware are dependent on the shape of the battery pack, which reduces the degree of freedom of designing the shape of the hardware.

The pouch made from a multilayer film does not place any restrictions on the shape of the hardware using the battery pack like the metal can does. However, there have not yet been developed any packaging laminated structures satisfactorily meeting physical properties and functions required of materials of packages for the lithium battery. The required physical properties and functions include the followings.

For example, the package for the lithium battery must be capable of hermetically sealing portions of electrodes connecting a principal part of the lithium battery module to hardware to insulate the same from the atmosphere. Therefore, the innermost layer of the multilayer film must be capable of adhering to the electrodes, particularly, must be capable of adhering to the electrodes when heat and pressure are applied thereto.

The lithium battery must be capable of maintain the sealing effect even if the temperature of the lithium battery module rises during charging and discharging, and must be, as well as hardware that withstands high temperatures, such as high temperatures on the instrument panel of a vehicle in summer, and low temperatures in a cold district, must be heat-resistant and cold-resistant. The lithium battery must be capable of maintaining satisfactory sealing effect in a severe environment.

Sometimes, it occurred that the electrolyte of the lithium battery module consisting of a carbonate solvent and a lithium salt affects adversely to the package and reduces bond strength between the layers of the multilayer film. The solvent (carbonate solvent) contained in the lithium battery module swells adhesive layers bonding together the component layers of the multilayer film to reduce bond strength between the layers.

It is possible that an acid is produced and heat is generated by the hydrolysis of the electrolyte, a metal barrier layer is corroded by the agency of the acid and heat to reduce bond strength between the layers, and that the battery is ignited by the heat. If the temperature of the battery rises, the electromotive force of the battery decreases and it is possible that the device connected to the battery stops or malfunctions.

The electrolysis of the electrolyte that causes those problems is caused by the penetration of external moisture into the sealed system of the battery. Therefore, the package must have a barrier property capable of inhibiting the penetration of external moisture into the package.

Packages containing batteries including lithium batteries must not be conductive and must not transmit electricity to devices (hardware) surrounding the packages and must be capable of electrically isolating the electrodes from each other so that the electrodes are not short-circuited.

The package of the lithium battery may be a metal can, a pouch or a formed package having a container and a cover. When the formed package having the containing part and the cover is employed, a resin forming the innermost layer of the laminated structure must be heat-adhesive and the laminated structure for forming the formed package must have a high formability.

DISCLOSURE OF THE INVENTION

The present invention has been made in view of those problems and it is therefore an object of the present invention to provide a battery packaging laminated structure excellent in gas-barrier property, having high mechanical strengths including piercing strength and capable being used in a hot environment and stable under the influence of an electrolyte, a battery pouch fabricated by working the battery packaging laminated structure, and a method of manufacturing the battery pouch.

According a first aspect of the present invention, a battery packaging laminated structure comprises an outermost layer, a barrier layer and an innermost layer laminated in that order or an outermost layer, a barrier layer, an intermediate layer and an innermost layer laminated in that order; wherein the outermost layer is formed of a formable base material, the barrier layer is formed of a impermeable base material having a barrier property, the intermediate layer is formed of a formable intermediate base material and the innermost layer is formed of a heat-adhesive base material.

Preferably, the barrier layer is a soft aluminum foil having an iron content in the range of 0.3 to 9.0%.

Preferably, the barrier layer is a metal foil having a surface on the side of the innermost layer, finished by degreasing or pickling.

Preferably, the barrier layer is a metal foil having a surface on the side of the innermost layer, coated with an acid-resistant film including at least a phosphate film, a chromate film, a fluoride film or a triazine thiol compound film.

Preferably, the barrier layer is a metal foil having a surface on the side of the innermost layer, finished by decreasing or pickling, and coated with an acid-resistant film including at least a phosphate film, a chromate film, a fluoride film and a triazinethiol compound film.

Preferably, the barrier layer has a surface on the side of the innermost layer, coated with a 0.5 to 30 μm thick protective layer of a resin containing 30% or above of at least one of epoxy resins, phenol resins, melamine resins, polyimide resins, unsaturated polyester resins, polyurethane resins, alkyd resins, unsaturated carboxylic acid graft polyolefin resins, polyester copolymers, such as polyethylene terephthalate resins or polybutylene terephthalate resins, ionomers, ethylene-vinyl acetate copolymers, copolymers of ethylene and an acrylic acid derivative, copolymers of ethylene and a methacrylic acid derivative, polyether resins and derivatives of those resins.

Preferably, the innermost layer has a thickness of 10 μm or above and is formed of one of unsaturated carboxylic acid graft polyolefin resins including unsaturated carboxylic acid graft polyethylene resins, unsaturated carboxylic acid graft polypropylene resins, unsaturated carboxylic acid graft poly (methyl pentene) resins and mixtures of some of those resins, and having a melting point of 80° C. or above and a Vicat softening point of 70° C. or above.

Preferably, at least one dry lamination adhesive layer of a dry lamination adhesive is formed between the layers on the side of the innermost layer with respect to the barrier layer, the dry lamination adhesive includes a resin and an accelerator, the resin is a blended resin of a polyester resin consisting of an acid component containing at least two of sebacic acid, isophthalic acid, terephthalic acid, octanedioic acid, nonanedioic acid, undecanedioic acid and palmitic acid, and an alcohol component containing at least one of ethylene glycol, hexanediol and glycol, and a bisphenol A-type epoxy resin, and the accelerator contains a polyisocyanate component.

Preferably, the innermost layer is a multilayer film consisting of at least two resin films formed by coextrusion, and one of the resin films cannot be welded to metal members but the same resin film is heat-adhesive.

According to a second aspect of the present invention, a battery pouch is formed from a laminated structure having at least a base layer, a barrier layer and a heat-adhesive resin layer, wherein the laminated structure is folded in a pair of leaves with the heat-adhesive resin layers of the pair of leaves facing each other, peripheral portions of the pair of leaves are joined together by heat-sealing to form heat-sealed [arts, and $D_0 < (D_1 + D_2)/2$, where $D_1$ and $D_2$ are the respective thicknesses of the heat-adhesive resin layers of the pair of leaves, and $D_0$ is the thickness of the heat-sealed parts.

According to a third aspect of the present invention, a battery pouch is formed from a laminated structure having at least a base layer, a barrier layer and a heat-adhesive resin layer, wherein the laminated structure is folded in a pair of leaves with the heat-adhesive resin layers of the pair of leaves facing each other, peripheral portions of the pair of leaves are joined together by heat-sealing to form heat-sealed parts, the pair of leaves have unsealed portions continuous with the heat-sealed part, and the unsealed portions are folded back and are bonded to corresponding portions of the laminated structure.

According to a fourth aspect of the present invention, a battery pouch manufacturing method comprises the steps of forming a laminated structure having a base layer, a barrier layer and a heat-adhesive resin layer in a tubular structure, putting a flat lithium battery module provided with terminals in the tubular structure, bonding together overlapped side portions of the laminated structure by heat-sealing to form a sealed back seam, heat-sealing a first end portion of the tubular structure corresponding to the terminals to form a first sealed part, heat-sealing a second end portion of the tubular structure opposite the first end portion of the same to form a second sealed part, and cutting the first and the second end portion of the tubular structure.

According to a fifth aspect of the present invention, a battery packaging laminated structure is formed by laminating an aluminum foil and an inner layer, wherein at least one surface of the aluminum foil on the side of the inner layer is an easy-to-bond surface finished by surface treatment, and the inner layer is bonded to the easy-to-bond surface of the aluminum foil with an adhesive layer.

BEST MODE FOR CARRYING OUT THE INVENTION

First Embodiment

A lithium battery packaging laminated structure in a first embodiment according to the present invention will be described with reference to the accompanying drawings.

Figure 1:
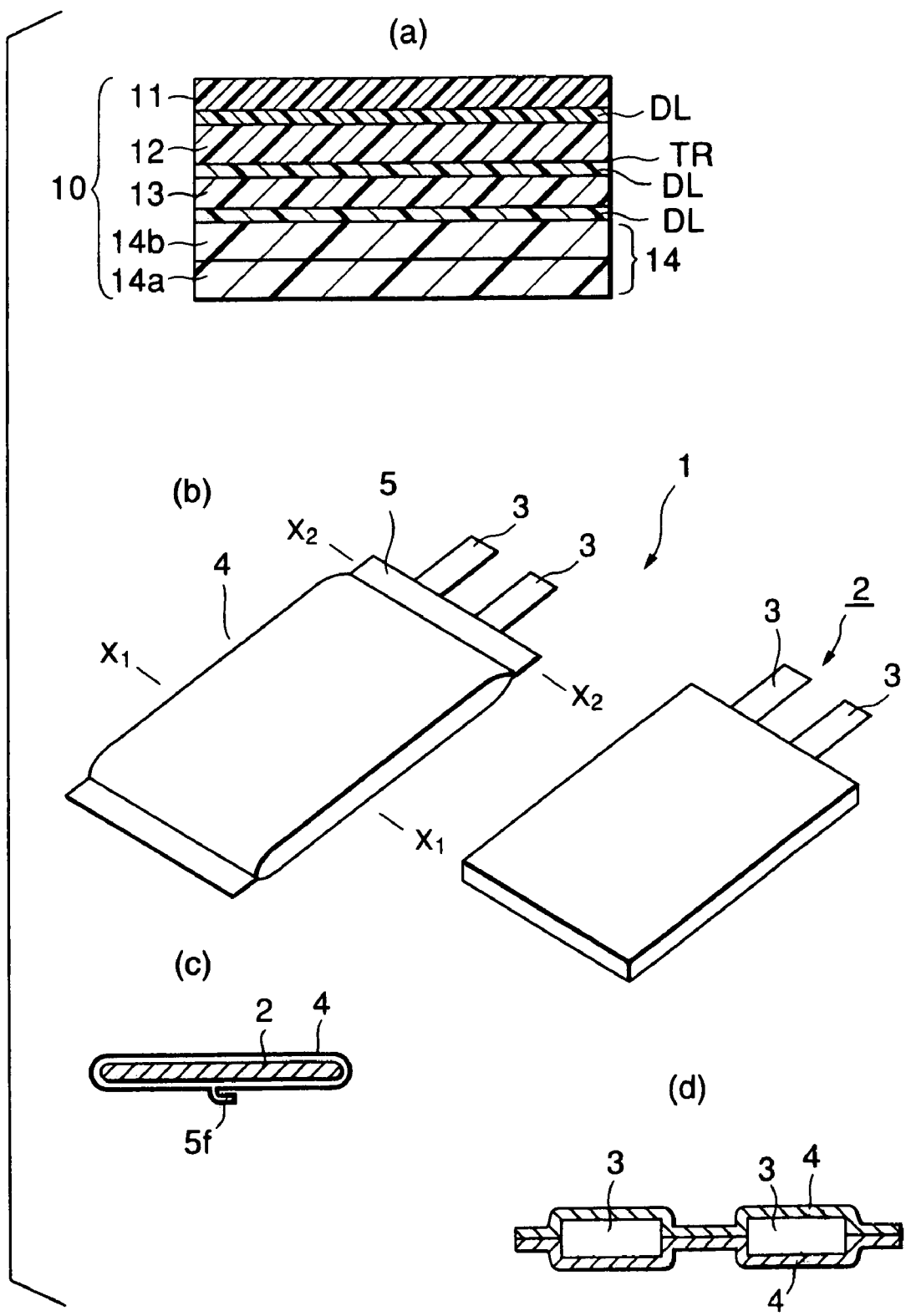
FIG. 1 is a view of a battery packaging laminated structure embodying the present invention.
Figure 2:
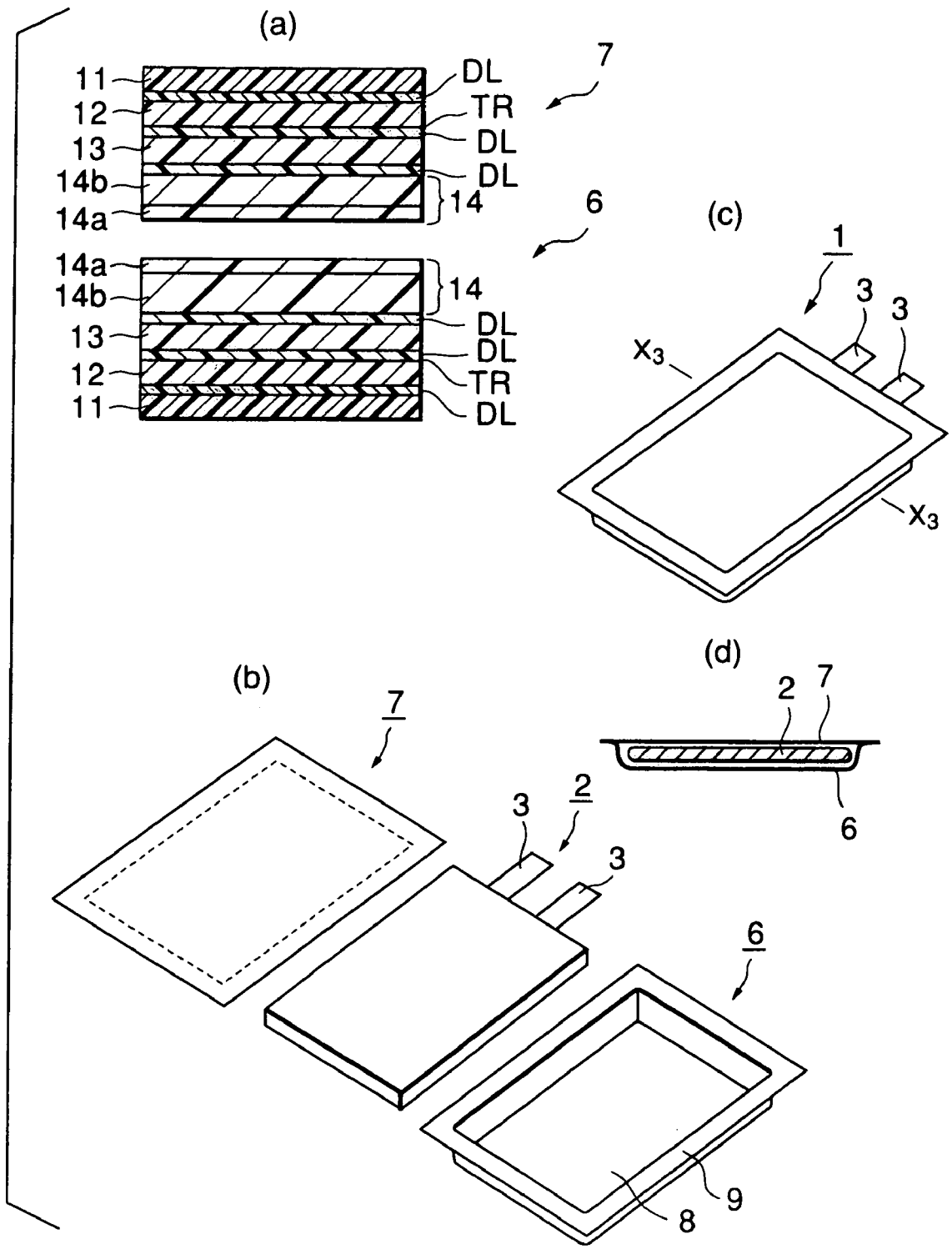
FIG. 2 is a view of a battery packaging structure in a modification of the battery packaging laminated structure embodying the present invention.
Figure 3:
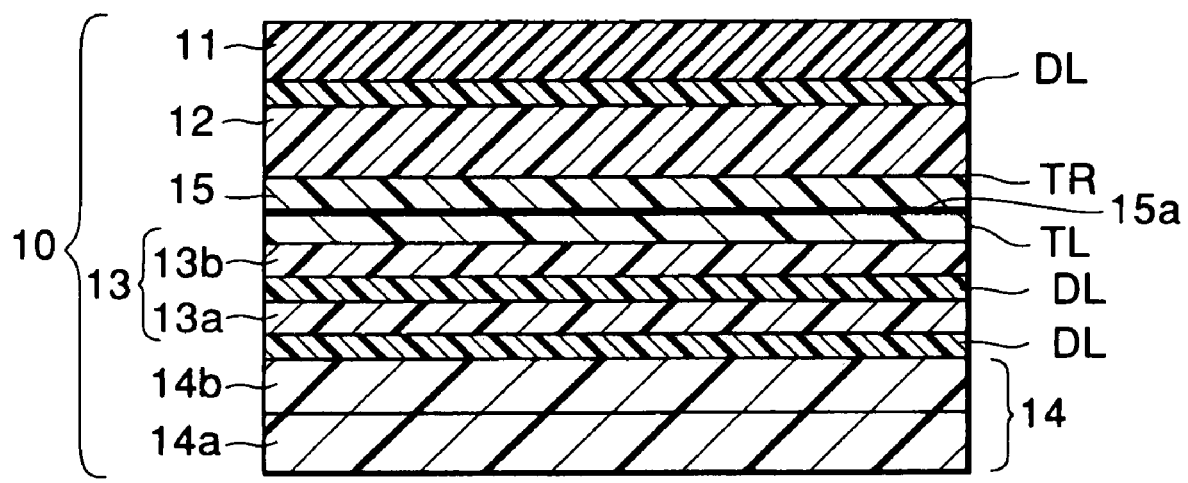
FIG. 3 is a sectional view of a battery packaging laminated structure.
Figure 4:
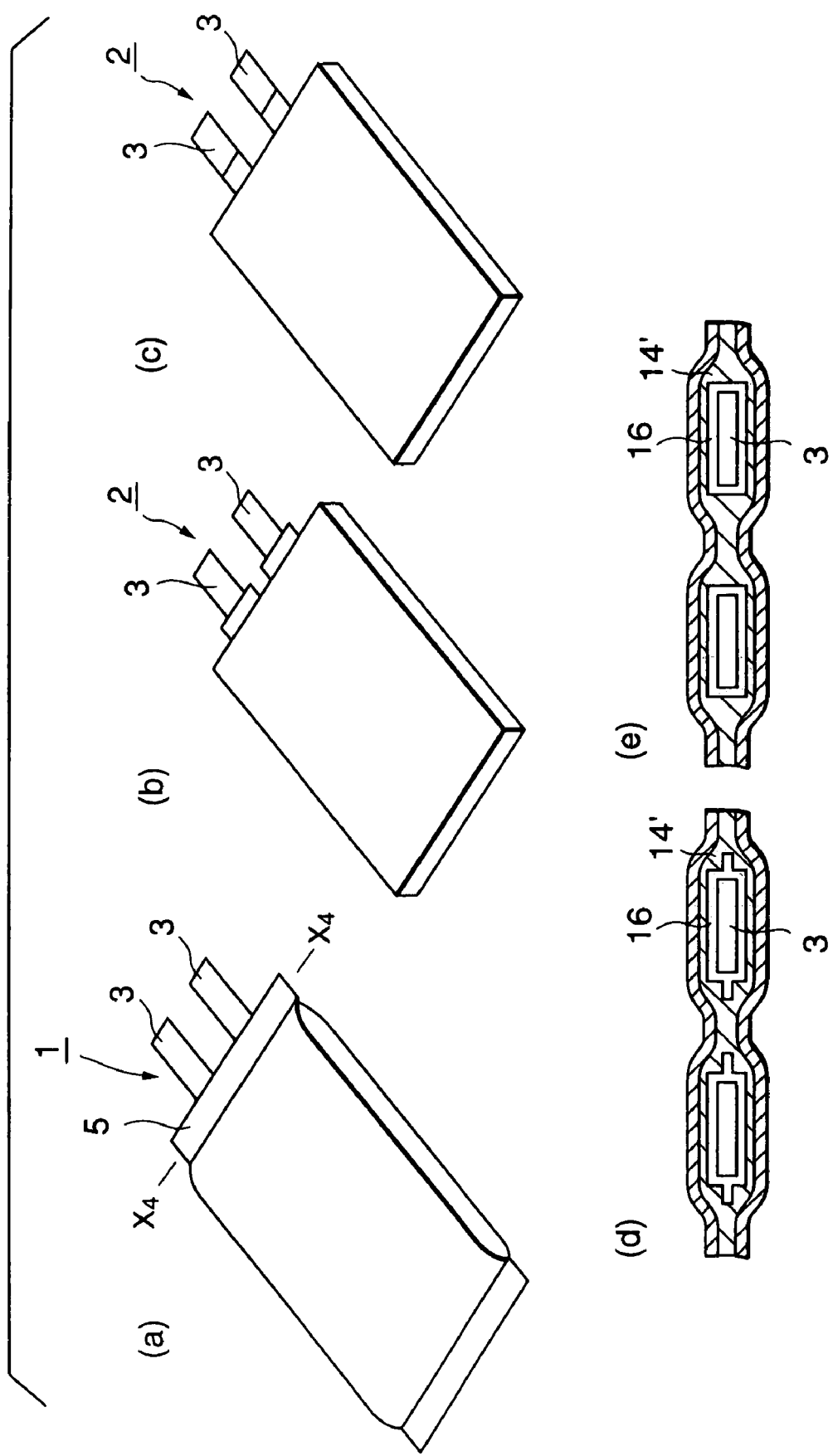
FIG. 4 is a view showing a battery pouch according to the present invention and tabs bonded to the battery pouch.
Figure 5:
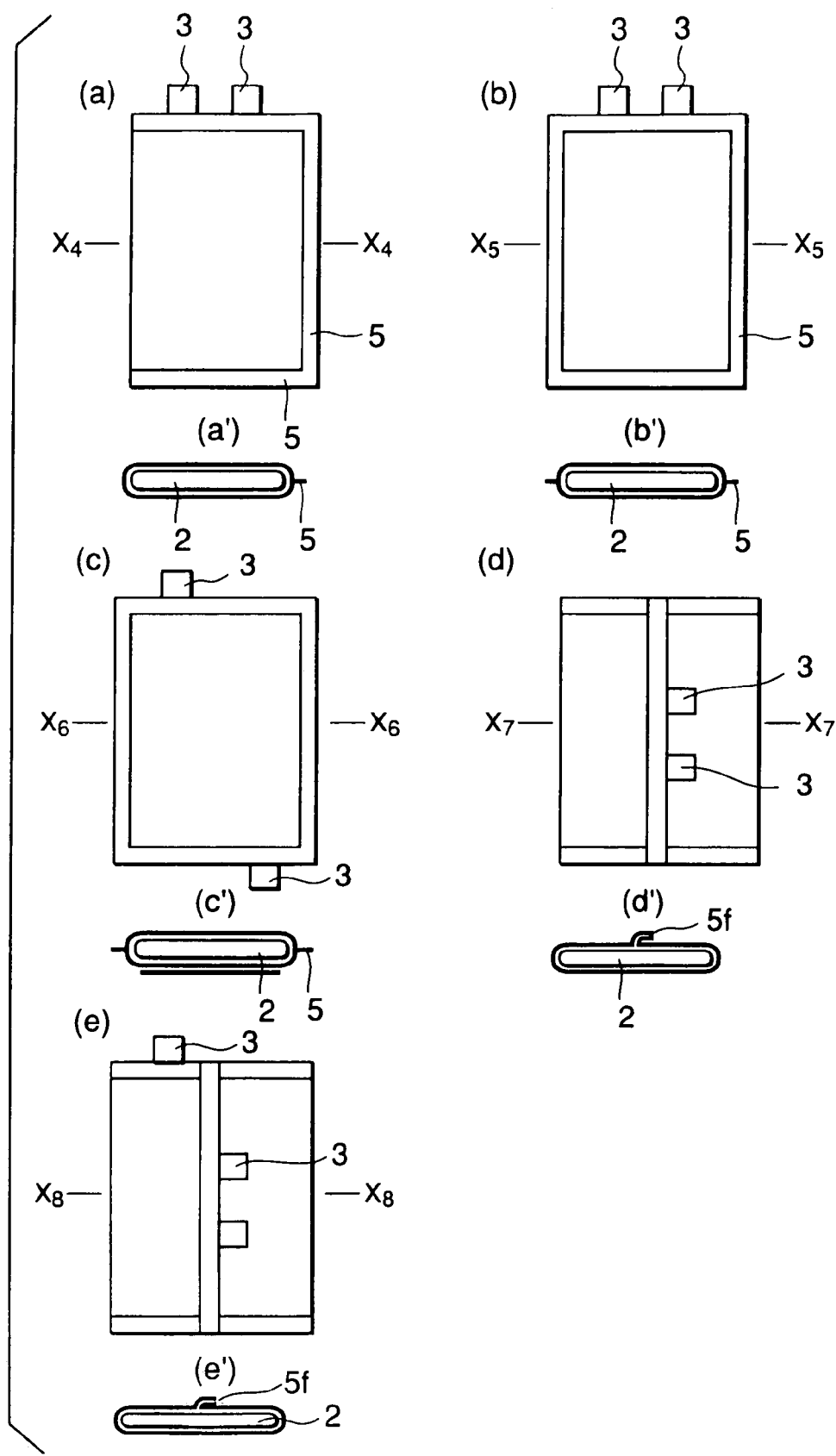
FIG. 5 is a view showing battery pouches according to the present invention.
Figure 6:
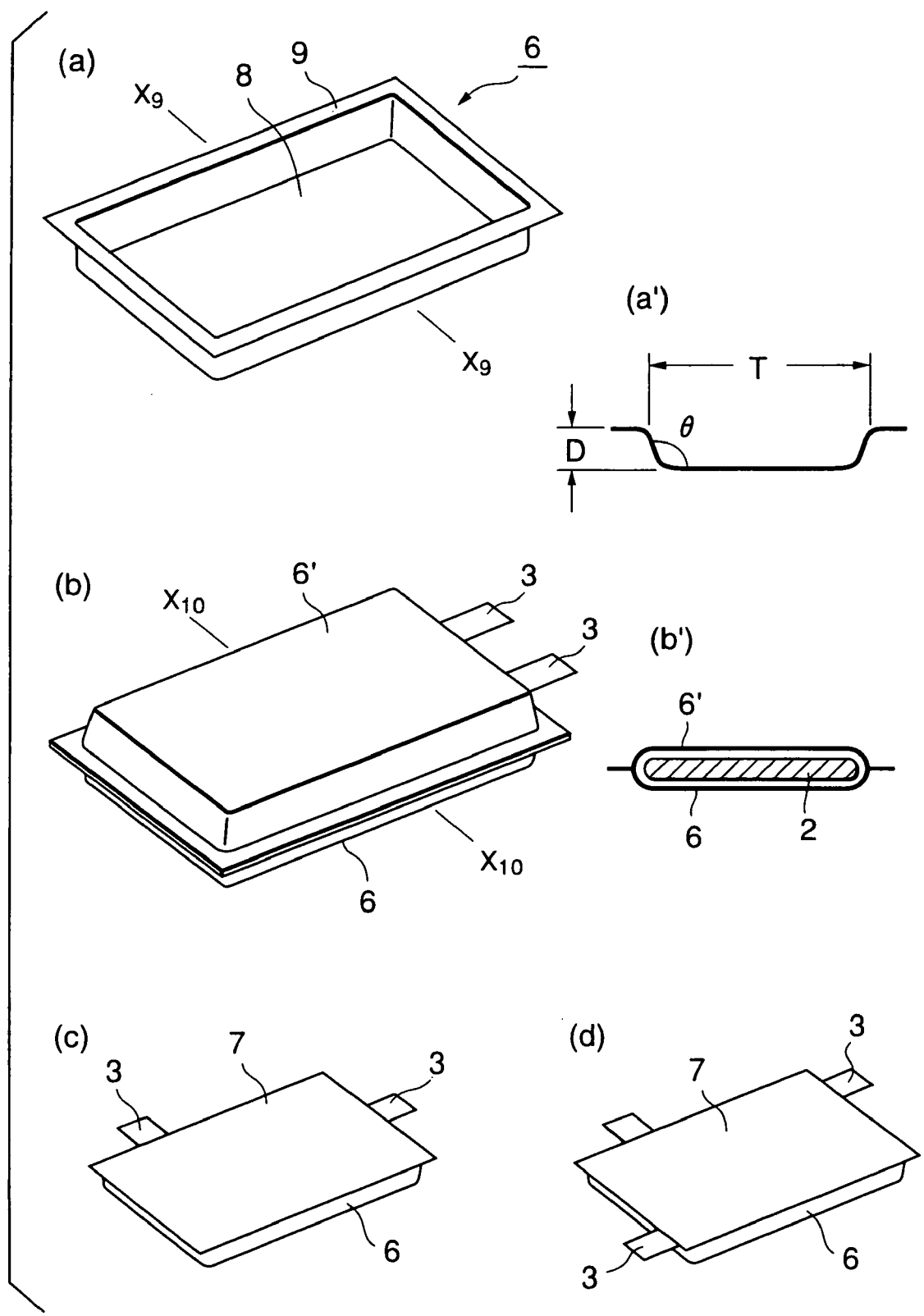
FIG. 6 is a view of a battery pouch in a modification of the battery pouch according to the present invention.

FIGS. 1(a) to 1(d) show a lithium battery packaging laminated structure in a first example, in which FIG. 1(a) is a typical sectional view of a basic laminated structure, FIG. 1(b) is a perspective view of assistance in explaining a lithium battery, FIG. 1(c) is a sectional view taken on line $X_1$-$X_1$ in FIG. 1(b), and FIG. 1(d) is a sectional view taken on line $X_2$-$X_2$ in FIG. 1(b) FIGS. 2(a) to 2(d) show a lithium battery packaging laminated structure in a second example, in which FIG. 2(a) is a typical sectional view of a basic laminated structure, FIG. 2(b) is a perspective view of assistance in explaining a lithium battery, FIG. 2(c) is a perspective view of a lithium battery provided with an embossed battery package and FIG. 2(d) is a sectional view taken on line $X_3$-$X_3$ in FIG. 2(c). FIG. 3 is a sectional view of a battery packaging laminated structure in a third example according to the present invention for packaging a lithium battery module. FIGS. 4(a) to 4(e) show another package according to the present invention and tabs, in which FIG. 4(a) is a perspective view of a lithium battery, FIG. 4(b) is a perspective view of a lithium battery module with tabs bonded thereto, FIG. 4(c) is a perspective view of another lithium battery module provided with heat-adhesive tabs bonded thereto, and FIGS. 4(d) and 4(e) are sectional views taken on line $X_4$-$X_4$ in FIG. 4(a). FIGS. 5(a) to 5(e') are plan views and sectional views of battery pouches formed from a lithium battery packaging laminated structure according to the present invention. FIGS. 6(a) to 6(d) are views of an embossed lithium battery package formed from a lithium battery packaging laminated structure according to the present invention, in which FIG. 6(a) is a perspective view of a container of a single-part embossed battery package, FIG. 6(a') is a sectional view taken on line $X_9$-$X_9$ in FIG. 6(a), FIG. 6(b) is a perspective view of a double-part embossed battery package, FIG. 6(b') is a sectional view taken on line $X_{10}$-$X_{10}$ in FIG. 6(b), FIG. 6(c) is a perspective view showing tabs of an embossed battery package and FIG. 6(d) is a conceptional perspective view showing tabs of another embossed battery package.

The inventors of the present invention found through the earnest study of problems to be solved by the present invention that the problems can be solved by a laminated structure 10 shown in FIG. 1(a) and have made the present invention. As shown in FIGS. 1(b) and 1(c), a lithium battery 1 related with the present invention is formed by sealing a lithium battery module 2 having terminals 3 in a pillow type battery package (battery pouch) 4 having a back sealed part 5f with the terminals 3 partly extending outside the battery package 4.

As shown in FIGS. 2(b) and 2(d), an embossed battery package (sometimes, referred to as "cup-type battery package") has a container 6 having an embossed part 8 and a flange 9, and a cover 7 formed by cutting the laminated structure 10. The container 6 is formed by press forming (embossing) the laminated structure 10, a lithium battery module 2 is put in the embossed part 8 of the container 6, and the cover 7 is put on the flange 9 of the container 6 so as to cover the lithium battery module 2, and a peripheral part of the cover 7 is bonded to the flange 9 of the container 6 by heat-sealing to seal the lithium battery in the embossed battery package.

The battery pouch and the embossed battery package will be described in detail later.

Basically, the laminated structure 10 has an outermost layer 11, a barrier layer 12 and an innermost layer 14 laminated in that order. An intermediate layer may be sandwiched between the barrier layer 12 and the innermost layer 14. FIG. 1(a) shows a laminated structure 10 having an outermost layer 11, a barrier layer 12 an intermediate layer 13 and an innermost layer 14 laminated in that order. Those component layers of the laminated structures 10 are formed of the following materials. As shown in FIG. 1(d), a lithium battery relating with the present invention has a heat-sealed part 5 including portions of the terminals 3.

The outermost layer 11 of the laminated structure according to the present invention is formed of an oriented polyester resin or an oriented nylon resin. Possible polyester resins are polyethylene terephthalate resins, polyethylene naphthalate resins, polyethylene naphthalate resins, polyester copolymers, polycarbonate resins and the like. Possible nylons are crystalline or noncrystalline nylons including nylon 6, nylon 66, copolymers of nylon 6 and nylon 66, nylon 610, polymethaxylilene adipamide (MXD6).

When the lithium battery is used on a device (hardware), the outermost layer 11 touches the device. Therefore, it is desirable to form the outermost layer 11 of an insulating resin. Since a film forming the outermost layer 11 has pinholes and pinholes will be formed in the film during processing, the thickness of the outermost layer 11 must be 6 µm or above. preferably, the thickness of the outermost layer 11 is in the range of 12 to 25 µm.

The outermost layer 11 may be formed from a laminated film in view of providing the outermost layer 11 with a high pinhole-resistant property and an improved insulating ability.

Preferably, the outermost layer 11 includes at least one resin layer consisting of two or more layers each having a thickness of 6 µm or above, preferably, in the range of 12 to 25 µm. The following laminated structures 1) to 3) are examples of the outermost layer 11 of laminated construction.

1) Oriented polyethylene terephthalate film/ON
2) Oriented polyethylene terephthalate film/Polyethylene film
3) ON/Polyethylene film The outermost layer 11 is bonded to the barrier layer 12 by dry lamination using a bonding film or by extrusion coating.

The barrier layer 12 prevents the penetration of moisture into the lithium battery 1. To avoid the adverse effect of pinholes that may be formed in the barrier layer 12, to stabilize the workability (ease of fabricating pouches or forming) and to provide the barrier layer 12 with pinhole resistance, the barrier layer 12 is formed from a foil of a metal, such as aluminum or nickel, or a film of an inorganic compound, such as silicon dioxide or alumina. Preferably, the thickness of the barrier layer 12 is in the range of 20 to 80 µm.

The inventors of the present invention made earnest studies to reduce pinholes and to prevent the formation of cracks in an embossed battery package and found that aluminum having an iron content in the range of 0.3 to 9.0%, preferably, in the range of 0.7 to 2.0% is superior in ductility to aluminum not containing any iron, pinholes are less liable to be formed in a film of such aluminum when a laminated structure including the film of such aluminum is folded and walls of an embossed battery package can be easily formed. Aluminum having an iron content less than 0.3% is unable to form a satisfactorily pinhole-resistant film and does not have improved formability. Aluminum having an iron content exceeding 9.0% is unsatisfactory in flexibility and affects adversely to the workability of the laminated structure in forming a pouch.

The inventors of the present invention found that coating a surface of an aluminum film with an acid-resistant film TR and a protective layer 15 and employment of the foregoing techniques have remarkable effect on preventing the dissolution and corrosion of the surface of the aluminum foil by hydrofluoric acid (HF) produced by the interaction of the electrolyte of the lithium battery module 2 and moisture, improving the adhesive property (wettability) of the surface of the aluminum foil and stabilizing the adhesive strength between the aluminum foil and the innermost layer.

The acid-resistant film TR formed on the aluminum foil is a film of a phosphate or a chromate. The phosphate is zinc phosphate, iron phosphate, manganese phosphate, calcium phosphate or chromium phosphate. The chromate is chromium chromate.

The adhesive property of the surface of the aluminum foil can be improved by finishing the surface by a coupling property improving process and/or surface roughening. The coupling property improving process may use a silane coupling agent, an organic titanium coupling agent or an organic aluminum coupling agent.

An organic titanium coupling agent may be tetraalkoxy titanium, titanium acylate, titanium chelate or the like. The organic aluminum coupling agent may be trialkoxy aluminum, aluminum chelate, aluminum acylate or the like.

Surface roughening of the aluminum foil is effective in improving the adhesive property of the surface of the aluminum foil. The surface of the aluminum foil may be etched and cleaned with an acid or alkali solution to remove aluminum oxide ($Al_2O_3$) formed on the surface of the aluminum foil, to increase surface are a by enhancing the surface roughness and to provide the surface with an anchoring property for the improvement of adhesive property.

The protective layer 15 formed on the surface of the aluminum foil is a layer of a resin, such as an epoxy resin, a phenolic resin, a melamine resin, a polyester resin, an unsaturated carboxylic acid graft polyolefin resin or a derivative of one of those resins, containing a modifier for acid resistance improvement.

The foregoing surface treatment processes may be used in combination.

(1) Aluminum barrier layer 12/Formation of acid-resistant film TR
(2) Aluminum barrier layer 12/Formation of acid-resistant film TR/Formation of protective layer 15

According to the present invention, a second protective layer 15a of a resin not containing any modifier for acid resistance improvement may be formed in addition to the protective layer 15 containing a modifier for acid resistance improvement. The second protective layer 15a may be formed of an epoxy resin, a phenolic resin, a melamine resin, an olefin resin, an unsaturated carboxylic acid graft polyolefin resin, an acrylic resin or a derivative of one of those resins.

The second protective layer 15a is formed, for example, by either of the following methods.

(1) Aluminum barrier layer 12/Formation of acid-resistant film TR/Formation of second protective layer 15a
(2) Aluminum barrier layer 12/Formation of acid-resistant film TR/Formation of protective layer 15/Formation of second protective layer 15a According to the present invention, an intermediate layer 13 may be sandwiched between the barrier layer 12 or the protective layer 15, and the innermost layer 14 by using films for dry lamination DL or thermal lamination TL. The intermediate layer 13 protects the barrier layer 12 and prevents contact (short circuit) between the terminals 3 and the aluminum barrier layer 12 due to the thinning of the innermost layer 14, i.e., a heat-adhesive layer, by heat and pressure applied thereto in a heat-sealing process for forming a pouch. The intermediate layer 13 may be formed by bonding together a first intermediate layer 13a and a second intermediate layer 13b by a film for dry lamination DL.

The intermediate layer 13 is added to stabilize the environmental suitability (heat resistance and cold resistance) of the lithium battery. The intermediate layer 13 has a thickness of 10 µm or above and a melting point of 80° C. or above. Preferably, the intermediate layer 13 includes at least one layer of a thickness in the range of 12 to 25 µm formed of a polyester resin, a polyolefin resin, a derivative of one of those resins or a resin produced by mixing some of those resins.

Suitable polyester resins for forming the intermediate layer 13 are polyethylene terephthalate resins, polybutylene terephthalate resins, polyethylene naphthalate resins, polybutylene naphthalate resins, polycarbonate resins, copolymers of some of those polymers and derivatives of those polymers. The polyolefin resins are polypropylene resins, ethylene-propylene copolymers, low-density polyethylene resins, medium-density polyethylene resins, high-density polyethylene resins, linear low-density polyethylene resins, ethylene-α-olefin copolymers produced through polymerization using a single-site catalyst, polyethylene resins containing metal ions, copolymers of ethylene and acrylic acid derivatives, copolymers of ethylene and methacrylic acid derivatives, polybutene resins, unsaturated carboxylic acid graft poly(methyl pentene) resins and derivatives of those polymers.

Films of these resins may be either oriented or unoriented.

The innermost layer 14 of the lithium battery packaging laminated structure according to the present invention is bonded to the intermediate layer 13 by a film for dry lamination DL. The innermost layer 14 is formed of an unsaturated carboxylic acid graft polyolefin resin, a copolymer of ethylene and an acrylic acid derivative or a copolymer of ethylene and a methacrylic acid derivative, a metal ion crosslinked polyethylene resin, a derivative of some of those polymers or a mixture of some of those polymers. Preferably, the innermost layer 14 has a thickness of 20 above and is formed of a resin having a melting point of 70° C. or above and a Vicat softening point of 60° C. or above.

An innermost layer 14' of a polyolefin resin not adhesive to metals may be used. When the innermost layer 14' is used, the terminals 3 are covered with heat-adhesive tabs 16 of 15 µm or above in thickness formed of unsaturated graft polyolefin, metal ion crosslinked polyethylene, a copolymer of ethylene or propylene and acrylic acid, or a copolymer of propylene and acrylic acid, methacrylic acid or a methacrylic acid derivative. The tabs 16 can be perfectly hermetically bonded to the innermost layer 14' as shown in FIG. 4. More concretely, portions of the terminals 3 of a lithium battery module 2 to be packaged in a battery package are sandwiched between heat-adhesive tabs 16 of a width greater than that of the terminals 3 as shown in FIG. 4(b), the lithium battery module 2 is put in the battery package, and the battery package is sealed. FIG. 4(d) is a typical sectional view taken on line $X_4$-$X_4$ in FIG. 4(a). In FIG. 4(d), the outermost layer 11, the barrier layer 12, and the intermediate layer 13 are represented by a single layer. FIG. 4(c) shows a lithium battery module 2 provided with terminals 3 having portions wrapped in heat-adhesive tabs 16 to be covered with the battery package. FIG. 4(e) is a typical sectional view taken on line $X_4$-$X_4$ in FIG. 4(a) when the lithium battery module 2 shown in FIG. 4(c) is sealed in the battery package.

In the lithium battery 1 using a pouch or an embossed battery package, the terminals of a lithium battery module are sandwiched between the innermost layers 14 and the innermost layers 14 are welded together to form a sealed system. However, welded portions of the olefin resin forming the innermost layers becomes brittle and cracks and pinholes are liable to be formed therein. The thickness of the innermost layer is reduced by a value corresponding to the thickness of the tabs 16 when the innermost layers are welded to the tabs 16 to prevent forming pinholes. If the innermost layer is formed of a single layer of an olefin resin having a high melting point to enhance the heat resistance of the innermost layer, a high pressure and heat of a high temperature must be applied for a long time to the innermost layers to weld the innermost layers together by heat-sealing. Such a welding process deteriorates the characteristic of the lithium battery module 2 and deteriorates the function of the battery package by causing the shrinkage of the other component layer, such as the outermost layer of a polyester resin or a nylon resin, by heat.

The inventors of the present invention made studies to solve such a problem and found that it is effective in solving such a problem to form the innermost layer 14 in a multilayer structure consisting of a first layer 14a on the side of the inner surface of the laminated structure 10 and a second layer 14b on the side of the outer surface of the laminated structure 10. More concretely, the following multilayer structures can be used as the innermost layer.

(1) Film of an olefin resin or a derivative of olefin resin/Unsaturated graft polyolefin film (2) Film of an olefin resin or a derivative of an olefin resin/Film of a copolymer of ethylene and an acrylic acid derivative or a copolymer of ethylene and a methacrylic acid derivative (3) Film of an olefin resin or a derivative of olefin resin/Metal ion crosslinked polyethylene or metal ion crosslinked polypropylene film The following are representative olefin resins.

a) Polypropylene resins

1) Homopolypropylene (melting point: 150° C. or above, Vicat softening point: 140° C. or above)

2) Ethylene-propylene copolymer (terpolymer of random propylene, block propylene or butene-random propylene copolymer having a melting point of 110° C. or above and a Vicat softening point of 100° C. or above)

b) polyethylene resins

1) Low-density polyethylene, medium-density polyethylene, high-density polyethylene, linear low-density polyethylene, ethylene-propylene-diene copolymer ethylene-propylene-butene copolymer and ethylene-α-olefin copolymer produced through polymerization using a single-site catalyst (melting point: 90° C. or above, Vicat softening point: 80° C.)

Acid-denatured polyolefin resins (melting point: 90° C. or above, Vicat softening point: 80° C.)

a) Ethylene-vinyl acetate copolymers b) Metal ion crosslinked polyethylene, metal ion crosslinked polypropylene c) Unsaturated graft polyolefins including unsaturated carboxylic acid graft polyethylene, unsaturated carboxylic acid graft polypropylene and unsaturated carboxylic acid graft poly(methyl pentene), and derivatives of those polymers d) Copolymers of ethylene or propylene, and methacrylic acid derivatives or acrylic acid derivatives, including ethylene-methyl methacrylate copolymers (EMMA), ethylene-ethyl methacrylate copolymers (EMA), ethylene-methyl acrylate copolymers (EMAA), ethylene-ethyl acrylate copolymers (EEA), ethylene-acrylate copolymers (EAA), propylene-ethyl methacrylate (PMA) and propylene-ethyl acrylate (PAA) The following multilayer structures may be used as the multilayer innermost layer 14.

(1) Low-density polyethylene or linear low-density polyethylene/Copolymer of ethylene and a methacrylic acid derivative or an acrylic acid derivative (2) Ethylene-propylene copolymer/Copolymer of propylene and a methacrylic acid derivative or an acrylic acid derivative (3) Low-density polyethylene or linear low-density polyethylene/Metal crosslinked polyethylene (4) Ethylene-propylene copolymer/Metal crosslinked propylene (5) Random propylene/Unsaturated carboxylic acid graft homopropylene (6) Block propylene/Unsaturated carboxylic acid graft homopropylene (7) Homopropylene/Unsaturated graft random or graft propylene (8) Random or block propylene/Homopropylene (9) Ethylene-propylene copolymer/Polyethylene/ethylene-propylene copolymer

(10) Ethylene-propylene copolymer/Polyethylene/Unsaturated graft polyethylene

(11) Homopropylene/Random propylene

(12) Random polypropylene/Homopropylene/random propylene

(13) Random propylene/Block propylene/Random propylene

(14) Random propylene/Butene-random propylene copolymer

(15) Homopropylene/Butene-random propylene copolymer

It is desirable that the innermost layer 14 has a coefficient of static friction and a coefficient of kinetic friction of 0.5 or below, preferably, 2.0 or below to stabilize embossing formability. To form the innermost layer 14 having such a coefficient of friction, it is preferable that the material forming the innermost layer 14 contains 500 ppm or above of a fatty acid amide lubricant, such as erucic acid amide, stearic acid amide or oleic acid amide, or 1000 ppm or above of silicone lubricant having a molecular weigh of 100,000 or above, such as dimethyl silicone or methyl phenyl silicone, or 3% or above of silicone resin powder.

The component layers of the laminated structure 10, i.e., the lithium battery packaging laminated structure according to the present invention, may be processed by a surface activating process, such as a corona discharge process, a blasting process, an oxidizing process or an ozonation process, to stabilize properties needed for film formation, lamination and final product forming (embossing or pouch fabrication).

The outermost layer 11 and the barrier layer 12 of the laminated structure or the outermost layer 11, the barrier layer 12, the intermediate layer 13 and the innermost layer 14 may be formed and laminated by a T-die extrusion coating process, a tubular film extrusion processor a coextrusion process. When necessary, a secondary film may be formed by a coating process, an evaporation process, an ultraviolet curing process or an electron beam curing process. The adjacent layers may be bonded together by a dry lamination process, an extrusion coating process, a coextrusion lamination process or a thermal lamination process. The layers on the outer side of the barrier layer 12 may be laminated by a dry lamination process using an ordinary adhesive for dry lamination. Preferably, adhesives of compositions, which will be described below, are used for laminating the layers on the inner side of the barrier layer 12.

When the laminated structure for forming a lithium battery package is formed by a dry lamination process, it is possible that the layers are separated by the agency of a polycarbonate solvent contained in the electrolyte of the lithium battery module and the layer bonded to the inner surface of the barrier layer 12 is separated by the agency of hydrofluoric acid produced by the interaction of the lithium salt and water. The inventors of the present invention found through earnest studies that the separation of the layers and the separation of the layer from the surface of the barrier layer can be prevented and a laminated structure having excellent heat resistance can be formed by laminating the layers on the inner side of the barrier layer 12 of the laminated structure 10 by dry lamination using an adhesive of the following composition.

The adhesive is a two-part adhesive supplied in a resin and an accelerator. The resin is a blended resin of a polyester resin consisting of an acid component containing at least two of sebacic acid, isophthalic acid, terephthalic acid, octanedioic acid, nonanedioic acid, undecanedioic acid and palmitic acid, and an alcohol component containing at least one of ethylene glycol, hexanediol and diethylene glycol, and a bisphenol A-type epoxy resin. The accelerator contains a polyisocyanate component (TDI, MDI, IPDI, FDI or ADI).

When unsaturated graft polyolefin is used as a resin for extrusion coating or thermal lamination, adhesive strength and chemicals unsusceptibility, i.e., resistance to the adverse effect of chemicals, are improved.

When layers are laminated by extrusion coating, the adhesive strength between the layers can be stabilized by an adhesive strength enhancing process that coats the bonding surface of the layer to be bonded to another with an about 1 μm thick film of any one of polyester resins, polyether resins, urethane resins, polyether-urethane resins, polyester-urethane resins, isocyanate resins, polyolefin resins, polyethylene-imine resins, cyanoacrylate resins, organotitanium compounds, epoxy resins, imide resins, silicone resins, derivatives of those resins and mixtures of some of those resins or by a surface activation process, such as an ozonation process.

The following are three representative methods of forming the laminated structure 10 of the present invention consisting of the three layers.

1) A method that forms a laminated structure of the outermost layer 11 and the barrier layer 12 as a first substructure, and the innermost layer 14 as a second substructure separately, and laminates the first and the second substructures by thermal lamination.

2) A method that forms a laminated structure of the outermost layer 11 and the barrier layer 12 as a first substructure, and the innermost layer 14 as a second substructure separately, and laminates the first and the second substructures by extrusion coating (or coextrusion lamination). When necessary, the laminated structure is subjected to a thermal lamination process.

3) A method that laminates the outermost layer 11, the barrier layer 12 and the innermost layer 14 by dry lamination.

The following are three representative methods of forming the laminated structure 10 of the present invention consisting of the four layers.

1) A method that forms a laminated structure of the outermost layer 11 and the barrier layer 12 as a first substructure, and a laminated structure of the intermediate layer 13 and the innermost layer 14 as a second substructure separately, and laminates the first and the second substructures by thermal lamination.

2) A method that forms a laminated structure of the outermost layer 11 and the barrier layer 12 as a first substructure, and a laminated structure of part of the intermediate layer 13 and the innermost layer 14 or only the innermost layer 14 as a second substructure separately, and laminates the first and the second substructures by extruding the intermediate layer 13 for extrusion coating (or coextrusion lamination). When necessary, the laminated structure is subjected to a thermal lamination process.

3) A method that laminates the outermost layer 11, the barrier layer 12, the intermediate layer 13 and the innermost layer 14 by dry lamination.

The intermediate layer 13 may be coated with a thin film impermeable to gases, liquids and ions to prevent the permeation of the components of the electrolyte through the barrier layer 12 and to secure stable adhesive strength. The thin film may be a metal thin film, such as an aluminum film, or a metal oxide film, such as an aluminum oxide or a tin oxide film, formed by a sputtering process, a chemical vapor deposition process or a physical vapor deposition process or a resin film, such as a vinylidene chloride film, formed by a coating process.

EXAMPLES

Laminated structures in examples of the laminated structure 10 according to the present invention as the lithium battery packaging laminated structure were fabricated and pouches and embossed battery packages for packaging a lithium battery module were formed from the laminated structures. The quality and performance of the laminated structures, the pouches and the embossed battery packages were evaluated.

In the following description, materials of films and processes will be represented by the following symbols (acronyms, initial words and abbreviations).

Symbols

PET: Polyester film, CPET: Copolyester film, OPET: Oriented polyester film, ON: Oriented polyamide (nylon) film, NY: Polyamide (nylon) film, P-EP: Epoxy protective layer, AL: Aluminum foil, COPET: Oriented copolyester film, PC: Chromium phosphate film, 3C: Tervalent chromium film, PZ: Zinc phosphate film, PCa: Calcium phosphate film, PUD: Polyester-urethane adhesive film, PED: Polyether-urethane adhesive film, PAD: Unsaturated carboxylic acid graft random polypropylene adhesive film, PEAD: Unsaturated carboxylic acid graft polyethylene adhesive film, TL: Thermal lamination, DL: Dry lamination, EC: Extrusion lamination, ANC: Anchor coat, EP: Epoxy resin film, FN: Phenolic resin film, MR: Melamine resin film, AC: Acrylic resin film, PPA: Unsaturated carboxylic acid graft random polypropylene film (unsaturated carboxylic acid graft polypropylene film), PEA: Unsaturated carboxylic acid graft polyethylene film, EAM: Ethylene-methyl methacrylate copolymer film, PH: Homopolypropylene film, PR: Random polypropylene film, PP: Polypropylene film, BR: Butene-random propylene copolymer film, PE: Polyethylene film, HD: High-density polyethylene film, LD: Low-density polyethylene film, MD: Medium-density polyethylene film, AD: Acid-modified unsaturated polyolefin film, PMa: Unsaturated carboxylic acid graft poly(methyl pentene) film, TPX: Poly(methyl pentene) film.

Unless otherwise specified, the dry lamination process used a polyester-urethane adhesive for lamination.

Evaluation

Pouches and embossed battery packages were fabricated and abilities of the pouches and embossed battery packages were evaluated for the following properties.

1. Electrolyte Resistance

An imitation electrolyte was poured into a test sample, the test sample was sealed. The condition of adhesion between the barrier layer 12 and the innermost layer 14 or between the barrier layer 12 and the intermediate layer 13 was examined after storing the test sample at 60° C. for thirty days.

2. Moisture Impermeability

Moisture content of a test sample was measured after storing the test sample in an environment of 40° C. and 90% RH for thirty days. The moisture content must be 300 ppm or below.

3. Change in Peel Strength of the Innermost Layer

Peel strength of the innermost layer was measured after storing the test sample in an environment of −40° C. for thirty days and leaving the same at a room temperature (23° C.) for one hour. The peel strength must be 9.8 N/15 mm (1 kgf/15 mm) or above.

4. Short Circuit Preventing Ability

The terminals 3 covered with the tabs 16 were sandwiched between the innermost layers 14 and portions of the innermost layers 14 holding the portions of the terminals covered with the tabs 16 were heat-sealed by applying heat of 190° C. and a pressure of 0.3 MPa for 3.5 s.

(1) Any pinholes must not be formed in the outermost layer 11 and the outermost layer 11 must not be separated from the barrier layer 12.

(2) The barrier layer 12 must not be in contact with the terminals 3 and the tabs 16.

5. Embossed Package Formability

Containers of 1 mm in depth were formed by cold pressing using a male die and a female die. Clearance between the male and the female die was 1 mm. One hundred sample containers were examined for pinholes.

The imitated electrolyte was prepared by adding 1 M lithium phosphate hexafluoride (LiPFe) to a mixture of 1% by weight ethylene carbonate, 1% by weight diethyl carbonate and 1% by weight dimethyl carbonate.

Heat-sealing conditions: 190° C., 0.3 MPa, 3.5 s

Pouches

Type: Four-side sealed type

Size: 40 mm×60 mm (Width of sealed part: 5 mm)

Order of lamination: Not limited to that of examples

Representation of Laminated Structure

In the following representation of laminated structures, outer layers are nearer to the left end and inner layers are nearer to the right end (the end on the side of the lithium battery module).

Sample Battery Packaging Materials for Pouches

Example 1

A 12 μm thick oriented polyester film (outermost layer 11) and a 20 μm thick aluminum foil (barrier layer 12) coated with a tervalent chromium film (acid-resistant film) were laminated by dry lamination. A 6 μm thick oriented polyester film (intermediate layer 13) was laminated by dry lamination to the aluminum foil coated with the tervalent chromium film. A 50 μm thick unsaturated carboxylic acid graft random propylene film (innermost layer 14) was laminated by dry lamination to the oriented polyester film to complete a packaging laminated structure in Example 1. The packaging laminated structure in Example 1 is expressed by:

OPET12/PUD/AL20/3C/PUD/OPET6/PUD/PPA50

Numeral appended to a symbol standing for a layer of the laminated structure indicates the thickness (μm) of the layer, a symbol // stands for coextrusion and a symbol + stands for blending.

Example 2

A battery packaging laminated structure was formed by laminating the component layers by a method similar to that by which the component layers of the battery packaging laminated structure in Example 1 was formed. The battery packaging laminated structure in Example 2 is similar in construction to that in Example 1, except that a 15 μm thick oriented polyamide film, a 15 μm thick aluminum foil and a 10 μm thick homopropylene film were used as the outermost layer 11, the barrier layer 12 and the intermediate layer 13, respectively.

ON15/PUD/AL15/3C/PH10/PUD/PPA70

Example 3

A battery packaging laminated structure in Example 3 was formed by a method similar to that by which the battery packaging laminated structure in Example 1 was formed, except that a 25 μm thick aluminum foil was used as the barrier layer 12, an acrylic resin film as a protective layer 15 was laminated to a surface of the aluminum foil on the side of the innermost layer 14 by dry lamination, and a coextruded film of random propylene, homopropylene and random propylene was used as the innermost layer 14.

OPET12/PUD/AL25/3C/AC5/PUD/OPET6/PUD/PR5//PH30//PR10

Example 4

A 12 μm thick oriented polyester film and a 15 μm thick oriented polyamide film was bonded together by dry lamination to form an outermost layer 11, a 20 μm thick aluminum foil coated with a tervalent chromium film, i.e., an acid-resistant film, to the oriented polyamide film with a polyester-polyurethane adhesive by dry lamination, a 6 μm thick oriented polyester film as an intermediate layer 13 was bonded to the aluminum foil coated with the acid-resistant film by dry lamination, and a 60 μm thick unsaturated carboxylic acid graft random propylene film as an innermost layer 14 was bonded to the intermediate layer.

OPET12/PUD/ON15/PUD/AL20/3C/PUD/OPET6/PUD/PPA60

Example 5

A buttery packaging laminated structure in Example 5 was formed by a method similar to that by which the battery packaging laminated structure in Example 4 was formed, except that 25 μm thick aluminum foil was used as a barrier layer 12, a chromium phosphate film was used as an acid-resistant film and an innermost layer 14 was formed in a thickness of 40 μm.

OPET12/PUD/ON15/PUD/AL25/PC/PUD/OPET6/PUD/PPA40

Example 6

A battery packaging laminated structure in Example 6 was formed by a method similar to that by which the battery packaging laminated structure in Example 5 was formed, except that a zinc phosphate film was used as an acid-resistant film and a 50 μm thick PPA film was used as an innermost layer 14.

OPET12/PUD/ON15/PUD/AL25/PZ/PUD/OPET6/PUD/PPA50

Example 7

A battery packaging laminated structure in Example 7 was formed by a method similar to that by which the battery packaging laminated structure in Example 6 was formed, except that a calcium phosphate film was used as an acid-resistant film OPET12/PUD/ON15/PUD/AL25/PCa/PUD/OPET6/PUD/PPA50

Example 8

A 12 μm thick oriented polyester film and a 15 μm thick oriented polyamide film were laminated by dry lamination to form an outermost layer 11, a 20 μm thick aluminum foil coated with a tervalent chromium film as an acid-resistant film was laminated to the oriented polyamide film by dry lamination, a 5 μm thick epoxy resin film as a protective layer 15 was formed on a surface of the aluminum foil on the side of an innermost layer 14, a 6 μm thick oriented polyester film as an intermediate layer 13 was laminated to the protective layer 15 by dry lamination, and a 50 μm thick unsaturated carboxylic acid graft random propylene was laminated to the intermediate layer 13 by dry lamination.

OEPT12/PUD/ON15/PUD/AL25/3C/EP5/PUD/OPET6/PUD/PPA50

Example 9

A battery packaging laminated structure in Example 9 was formed by a method similar to that by which the battery packaging laminated structure in Example 8 was formed, except that a 3 μm thick phenolic resin film was used as a protective layer 15.

OPET12/PUD/ON15/PUD/AL25/3C/FN3/PUD/OPET6/PUD/PPA50

Example 10

A battery packaging laminated structure in Example 10 was formed by a method similar to that by which the battery packaging laminated structure in Example 8 was formed, except that a polyether-urethane adhesive was used for bonding together an outermost layer 11 and an aluminum foil and a 4 μm thick melamine resin film was used as a protective layer 15.

OPET12/PUD/ON15/PED/AL25/3C/MR4/PUD/OPET6/PUD/PPA50

Example 11

A battery packaging laminated structure in Example 11 was formed by a method similar to that by which the battery packaging laminated structure in Example 10 was formed, except that a 10 μm thick polyester resin film was used as a protective layer 15.

OPET12/PUD/ON15/PUD/AL25/EC/AC5/PUD/OPET6/PUD/PPA50

Example 12

A battery packaging laminated structure in Example 12 was formed by a method similar to that by which the battery packaging laminated structure in Example 8 was formed, except that a 5 μm thick acrylic resin film was used as a protective layer 15.

OPET12/PUD/ON15/PUD/AL25/3C/AC5/PUD/OPET6/PUD/PPA50

Example 13

A battery packaging laminated structure in Example 13 was formed by a method similar to that by which the battery packaging laminated structure in Example 8 was formed, except that a polyether-urethane adhesive was used for laminating a 12 μm thick oriented polyester film and a 15 μm thick oriented polyamide film by dry lamination, and a 4 μm thick unsaturated carboxylic acid graft random propylene film was used as a protective layer 15.

OPET12/PED/ON15/PUD/AL25/3C/PPA4/PUD/OPET6/PUD/PPA50

Example 14

A battery packaging laminated structure in Example 14 was formed by a method similar to that by which the battery packaging laminated structure in Example 8 was formed, except that a 4 μm thick unsaturated carboxylic acid graft polyethylene film was used as a protective layer 15.

OPET12/PUD/ON15/PUD/AL25/3C/PEA4/PUD/OPET6/PUD/PPA50

Example 15

A battery packaging laminated structure in Example 15 was formed by a method similar to that by which the battery packaging laminated structure in Example 12 was formed, except that a polyether-urethane adhesive was used for laminating an outermost layer 11 and a barrier layer 12, and a 70 μm thick unsaturated carboxylic acid graft polyethylene film was used as an innermost layer 14.

OPET12/PUD/ON15/PED/AL25/3C/AC5/PUD/OPET6/PUD/PEA70

Example 16

A battery packaging laminated structure in Example 16 was formed by a method similar to that by which the battery packaging laminated structure in Example 12 was formed, except that a 50 μm thick ethylene-methyl methacrylate copolymer film was used as an innermost layer 14.

OPET12/PUD/ON15/PUD/AL25/3C/AC5/PUD/OPET6/PUD/EAM50

Example 17

A battery packaging laminated structure in Example 17 was formed by a method similar to that by which the battery packaging laminated structure in Example 12 was formed, except that a 30 μm thick homopropylene film was used as an innermost layer 14.

OPET12/PUD/ON15/PUD/AL25/3C/AC3/PUD/OPET6/PUD/PH30

Example 18

A battery packaging laminated structure in Example 18 was formed by a method similar to that by which the battery packaging laminated structure in Example 12 was formed, except that a 40 μm thick random propylene film was used as an innermost layer 14.

OPET12/PUD/ON15/PUD/AL25/3C/AC3/PUD/OPET6/PUD/PR40

Example 19

A battery packaging laminated structure in Example 19 was formed by a method similar to that by which the battery packaging laminated structure in Example 12 was formed, except that a 90 butene-random propylene copolymer film was used as an innermost layer 14.

OPET12/PUD/ON15/PUD/AL25/3C/AC1/PUD/OPET6/PUD/BR90

Example 20

A 12 μm thick oriented polyester film and a 15 μm thick polyamide film were laminated by dry lamination of form an outermost layer 11, and a 20 μm thick aluminum foil coated with a tervalent chromium film (acid-resistant film) was laminated to the oriented polyamide film by dry lamination. A 2 μm thick acrylic resin film as a protective layer was laminated to the tervalent chromium film, and a 60 μm thick random propylene film as an innermost layer 14 was laminated to the acrylic resin film by thermal lamination using an unsaturated carboxylic acid graft random propylene as an adhesive.

OPET12/PUD/ON15/PUD/AL25/3C/AC2/PUD/OPET6/TL=PAD/PR60

Example 21

A battery packaging laminated structure in Example 21 was formed by a method similar to that by which the battery packaging laminated structure in Example 20 was formed, except that an outermost layer 11 and a barrier layer 12 were laminated by dry lamination using a polyether-urethane adhesive, a 5 μm thick epoxy resin layer was used as a protective layer 15, an unsaturated carboxylic acid graft polyethylene was applied to the protective layer 15 and a 50 μm thick ethylene-methyl methacrylate copolymer film was used as an innermost layer 14.

OPET12/PUD/ON15/PED/AL25/3C/EP5/TL=PEAD/EAM50

Example 22

A battery packaging laminated structure in Example 22 was formed by a method similar to that by which the battery packaging laminated structure in Example 20 was formed, except that a 5 μm thick unsaturated carboxylic acid graft random propylene film was used as a protective layer 15, and a 50 μm thick unsaturated carboxylic acid graft random propylene film was used as an innermost layer 15 and was laminated directly to the protective layer 15 by dry lamination.

OPET12/PUD/ON15/PUD/AL25/3C/PPA5/TL/PPA50

Example 23

A battery packaging laminated structure in Example 23 was formed by a method similar to that by which the battery packaging laminated structure in Example 20 was formed, except that a zinc phosphate film was used as an acid-resistant film, a 2 μm thick phenolic resin film was used as a protective layer 15, and a 70 μm thick butene-random propylene copolymer film was used an innermost layer 14.

OPET12/PUD/ON15/PUD/AL25/PZ/FN2/TL=PAD/BR70

Example 24

A battery packaging laminated structure in Example 24 was formed by a method similar to that by which the battery packaging laminated structure in Example 20 was formed, except that a zinc phosphate film was used as an acid-resistant film, a 6 μm thick film of a blend of five parts of an epoxy resin and one part of a melamine resin was used as a protective layer 15.

OPET12/PUD/ON15/PUD/AL25/PZ/EP+MR/TL=PAD/PPA50

Example 25

A battery packaging laminated structure in Example 25 was formed by a method similar to that by which the battery packaging laminated structure in Example 20 was formed, except that an outermost layer 11 and a barrier layer 12 were laminated by dry lamination using a polyether-urethane adhesive, a 4 µm thick acrylic resin film was used as a protective layer 15, an innermost layer 14 was formed by the coextrusion of a 40 µm thick homopropylene film and a 10 µm thick random propylene film, and the homopropylene film was laminated to the protective layer 15 by dry lamination.

OPET12/PUD/ON15/PED/AL25/3C/AC4/PUD/OPET6/PUD/PH40//PR10

Example 26

A battery packaging laminated structure in Example 26 was formed by a method similar to that by which the battery packaging laminated structure in Example 20 was formed, except that a 4 µm thick acrylic resin film was used as a protective layer 15, an innermost layer 14 was formed by the coextrusion of a 30 µm thick homopropylene film and a 25 µm thick unsaturated carboxylic acid graft random propylene film, and the homopropylene film was laminated to the protective layer 15 by dry lamination.

OPET12/PUD/ON15/PUD/AL25/3C/AC4/PUD/OPET6/PUD/PH30//PPA25

Example 27

A battery packaging laminated structure in Example 27 was formed by a method similar to that by which the battery packaging laminated structure in Example 20 was formed, except that a 4 µm thick acrylic resin film was used as a protective layer 15, an innermost layer 14 was formed by the coextrusion of a 40 µm thick homopropylene film and a 10 µm thick random propylene film, and the homopropylene film was laminated to the protective layer 15 by thermal lamination using an unsaturated carboxylic acid graft random propylene adhesive.

OPET12/PUD/ON15/PUD/AL25/3C/AC4/TL=PAD/PH40//PR10

Example 28

A battery packaging laminated structure in Example 28 was formed by a method similar to that by which the battery packaging laminated structure in Example 20 was formed, except that a zinc phosphate film was used as an acid-resistant film, an innermost layer 14 was formed by the coextrusion of a 5 µm thick random propylene film and a 20 µm thick homopropylene film, and the 5 µm thick random propylene film was laminated to the zinc phosphate film by thermal lamination using an unsaturated carboxylic acid graft random propylene adhesive.

OPET12/PUD/ON15/PUD/AL25/PZ/PPA6/TL=PAD/PR5//PH30/PR10

Example 29

A battery packaging laminated structure in Example 29 was formed by a method similar to that by which the battery packaging laminated structure in Example 28 was formed, except that a 3 µm thick unsaturated carboxylic acid graft polyethylene film was used as a protective layer 15, an innermost layer 14 was formed by the coextrusion of a 15 µm thick low-density polyethylene film and a 50 µm thick ethylene-methyl methacrylate copolymer film, and the low-density polyethylene film was laminated to the protective layer.

OPET12/PUD/ON15/PUD/AL25/PZ/PEA3/TL=PAD/LD15//EAM50

Example 30

An outermost layer 11 was formed by laminating a 12 µm thick oriented polyester film and a 15 µm thick oriented polyamide film by dry lamination using a polyether-urethane adhesive, a 25 µM thick aluminum foil was coated with a tervalent chromium film as an acid-resistant film, the aluminum foil was laminated to the oriented polyamide film of the outermost layer 11 by dry lamination, a 4 µm thick phenolic resin film was ford as a protective layer 15 on the surface of the tervalent chromium film, a 10 µm thick high-density polyethylene film as an intermediate layer 13 was laminated to the phenolic resin film by dry lamination, and a 70 µm thick ethylene-methyl methacrylate copolymer film was laminated to the high-density polyethylene film by thermal lamination.

OPET12/PED/ON15/PUD/AL25/3C/FN4/TL=PEAD/HD10/TL/EAM70

Example 31

A battery packaging laminated structure in Example 31 was formed by a method similar to that by which the battery packaging laminated structure in Example 30 was formed, except that an outermost layer 11 was formed by laminating a 12 µm thick oriented polyester film and a 15 µm thick oriented polyamide film by dry lamination using a polyester-urethane adhesive, a 4 µm thick acrylic resin film was used as a protective layer 15. a 15 µm thick homopropylene film was used as an intermediate layer 13, and a 50 µm thick unsaturated carboxylic acid graft random propylene film was used as an innermost layer 14.

OPET12/PUD/ON15/PUD/AL25/3C/AC4/TL=PAD/PH15/TL/PPA50

Example 32

A battery packaging laminated structure in Example 32 was formed by a method similar to that by which the battery packaging laminated structure in Example 31 was formed, except that a 3 µm thick acrylic resin film was used as a protective layer 15, a 6 µm thick homoproylene film was used as an intermediate layer 13 and a 50 µm thick unsaturated carboxylic acid graft random propylene film was used as an innermost layer 14.

OPET12/PUD/ON15/PUD/AL25/PZ/AC3/TL=PAD/PH6/TL=PAD/PA50

Example 33

A 12 µm thick oriented polyester film and a 15 µm thick oriented polyamide film were laminated by dry lamination using a polyether-urethane adhesive to form an outermost layer 11, a 25 µm thick aluminum foil coated with a tervalent chromium film as an acid-resistant film was laminated to the oriented polyamide film of the outermost layer 11 by dry lamination, the tervalent chromium film was coated with a 4 µm thick acrylic resin film as a protective layer 15, a 6 µm thick oriented polyester film as an intermediate layer 13 is laminated to the acrylic resin film by dry lamination, an innermost layer 14 was formed by the coextrusion of a 40 µm thick random propylene film and a 20 µm thick butene-random propylene copolymer film, and the random propylene film of the innermost layer was laminated to the intermediate layer 13.

OPET12/PUD/ON15/PUD/AL25/3C/AC4/PUD/OPET6/
PUD/PR40//BR20

Example 34

A battery packaging laminated structure in Example 34 was formed by a method similar to that by which the battery packaging laminated structure in Example 33 was formed, except that a polyester-urethane adhesive was used for laminating a 12 µm thick oriented polyester film and a 15 µm thick polyamide film by lamination to form an outermost layer 11, a film formed by the coextrusion of a random propylene film and a butene-homopropylene copolymer film was used as an innermost layer 14, and the random propylene film of the innermost layer 14 was laminated to an intermediate layer 13.

OPET12/PUD/ON15/PUD/AL25/3C/AC4/PUD/OPET6/
PUD/PR10//PH20//BR20

Example 35

A battery packaging laminated structure in Example 35 was formed by a method similar to that by which the battery packaging laminated structure in Example 34 was formed, except that a 5 µm thick epoxy resin film was used as a protective layer 15, an innermost layer 14 was formed by the coextrusion of a 15 µm thick low-density polyethylene film and a 50 µm thick ethylene-methyl methacrylate film, and the low-density polyethylene film was laminated to an intermediate layer 13.

OPET12/PUD/ON15/PUD/AL25/3C/EP5/PUD/OPET6/
PUD/LD15//EAM50

Example 36

An outermost layer 11 was formed by laminating a 12 µm thick oriented polyester film and a 15 µm thick oriented polyamide film by dry lamination using a polyether-urethane adhesive, a 25 µm thick aluminum foil coated with a tervalent chromium film as an acid-resistant film was laminated to the oriented nylon film of the outermost layer 11 and a 2 µm thick acrylic resin film as a protective layer 15 was formed on the tervalent chromium film. A 20 µm thick low-density polyethylene film as a first intermediate layer, 6 µm thick oriented polyester film as a second intermediate layer and a 50 µm thick random propylene film as an innermost layer 14 were laminated sequentially to the protective layer 15 by dry lamination.

OPET12/PED/ON15/PUD/AL25/3C/AC2/PUD/LD20/
PUD/OPET6/PUD/PR50

Example 37

An outermost layer 11 was formed by laminating a 12 µm thick oriented polyester film and a 15 µm thick polyamide film by dry lamination, a 25 µm thick aluminum foil coated with a zinc phosphate film as an acid-resistant film was laminated to the oriented polyamide film by dry lamination, a 3 µm thick polyester film as a protective layer 15 was formed on the zinc phosphate film, a 15 µm thick random propylene film as a second intermediate layer 13b was laminated to the protective layer 15 by using an unsaturated carboxylic acid graft random propylene adhesive, a 6 µm thick oriented polyester film as a first intermediate layer 13a was laminated to the protective layer 15 with an unsaturated carboxylic acid graft random propylene adhesive, a 6 µm thick oriented polyester film as a first intermediate layer 13a coated with a polyester-urethane adhesive as an anchor coat was laminated to the second intermediate layer 13b by thermal lamination, and a 50 µm thick unsaturated carboxylic acid graft random propylene film as an innermost layer 14 was laminated to the first intermediate layer 13a by dry lamination.

OPET12/PUD/ON15/PUD/AL25/PZ/PET3/TL=PAD/
PR15/ANC=PUD/OPET6/PUD/PPA50

Example 38

A battery packaging laminated structure in Example 38 was formed by a method similar to that by which the battery packaging laminated structure in Example 37 was formed, except that a 3 µm thick polyester film was used as a protective layer 15, a 10 µm thick random propylene film was used as a second intermediate layer 13b, an innermost layer 14 was formed by the coextrusion of a 30 µm thick homopropylene film and a 25 µm thick unsaturated carboxylic acid graft random propylene film, and the 30 µm thick homopropylene film was laminated to a first intermediate layer 13a by dry lamination.

OPET12/PUD/ON15/PUD/AL25/PZ/PET3/TL=PAD/
PR10/ANC=PUD/OPET6/PUD/PH30//PPA25

Example 39

A battery packaging laminated structure in Example 39 was formed by a method similar to that by which the battery packaging laminated structure in Example 38 was formed, except that a 3 µm thick acrylic resin film was used as a protective layer 15, an innermost layer 14 was formed by the coextrusion of a 10 µm thick random propylene film, a 20 µm thick homopropylene film and a 20 µm thick butene-random propylene copolymer film, and the 10 µm thick random propylene film was bonded to a first intermediate layer 13a.

OPET12/PUD/ON15/PUD/AL25/PZ/AC3/TL=PAD/
PR10/ANC=PUD/OPET6/PUD/PR10//PH20//BR20

Example 40

An outermost layer 11 was formed by laminating a 12 µm thick oriented polyester film and a 15 µm thick oriented polyamide film by dry lamination, a 25 µm thick aluminum foil coated with a tervalent chromium film as an acid-resistant film was laminated to the oriented polyamide film by dry lamination, a 4 µm thick acrylic resin film was formed as a protective layer 15 on the tervalent chromium film, an intermediate layer 13 was formed by the coextrusion of a 5 µm thick random propylene film, a 30 µm thick homopropylene film and a 5 µm thick random propylene film, the random propylene film of the intermediate layer 13 was laminated to the protective layer 15 by thermal lamination using an unsaturated carboxylic acid graft random propylene adhesive, and a 20 µm thick unsaturated carboxylic acid graft random propylene film as an innermost layer 14 was laminated to the intermediate layer 13 by thermal lamination.

OPET12/PED/ON15/PUD/AL25/3C/Polyacrylate4/
TL=PAD/PR5//PH30//PR5/TL=PPA50

Example 41

A battery packaging laminated structure in Example 41 was formed by a method similar to that by which the battery packaging laminated structure in Example 40 was formed, except that a zinc phosphate film was used as an acid-resistant film, a 5 μm thick polyester film was used as a protective layer, an intermediate layer 13 was formed by the coextrusion of a 5 μm thick low-density polyethylene film, a 30 μm thick high-density polyethylene and a 5 μm thick low-density polyethylene film, the intermediate layer 13 was laminated to the protective layer 15 by dry lamination, and a 20 μm thick ethylene-methyl methacrylate copolymer film was used as an innermost layer 14.

OPET12/PUD/ON15/PUD/AL25/PZ/PET5/PUD/LD5//HD30//LD5/TL/EAM20

Performance Characteristics of Pouches

Pouches were fabricated by working the buttery packaging laminated structures in Examples 1 to 41. The performance characteristics of all the pouches were satisfactory.

1. Electrolyte resistance: Not delaminated
2. Moisture impermeability: 300 ppm or below
3. Peel strength: 9.8 N/15 mm or above (−40° C.)
   9.8 N115 mm or above (120° C.)
4. Short circuit preventing ability The outermost layers and the corresponding barrier layers were not delaminated.

Pinholes were not formed in none of the outermost layers.

None of the barrier layers was in contact with the terminals.

Embossed Packages

Shape: Rectangular tray with flange

Overall dimensions: 42 mm×58 mm×3.1 mm (Width of sealed part: 5 mm)

Dimensions of embossed part: 30 mm×45 mm×3.1 mm (Inclination of side walls: 5°)

Note: A numeral in [ ] is the coefficient μ of kinetic friction of the innermost layer.

Sample Battery Packaging Materials for Embossed Packages

In the following representation of laminated structures, outer layers are nearer to the left end and inner layers are nearer to the right end (the end on the side of the lithium battery module).

Sample Battery Packaging Materials for Embossed Packages

Example 1

An outermost layer 11 was formed by laminating a 16 μm thick oriented copolyester film and a 15 μm thick oriented polyamide film by dry lamination using a polyester-urethane adhesive, a 50 μm thick aluminum foil coated with a tervalent chromium film was laminated to the oriented polyimide film with the tervalent chromium film contiguous with the oriented polyamide film by dry lamination, and a 16 μm thick oriented polyester film was laminated to the tervalent chromium film by dry lamination and a 30 μm thick unsaturated carboxylic acid graft random propylene film as an innermost layer 14 was laminated to the oriented polyester film by dry lamination

OPET16/PUD/ON15/PUD/AL(#1)50/3C/PUD/OPET16/PUD/PPA30-[0.29]

Note: AL(#1) stands for an aluminum foil containing 1.0% iron, 0.10% silicon and 0.01% manganese.

Example 2

A 16 μm thick oriented copolyester film as an outermost layer 11 and a 50 μm thick aluminum foil coated with a tervalent chromium film were laminated by dry lamination, a 10 μm thick homopropylene film as an intermediate layer 13 was laminated to the tervalent chromium film by dry lamination and a 30 μm thick unsaturated carboxylic acid graft random propylene film as an innermost layer 14 was laminated to the intermediate layer 13 by dry lamination.

OPET16/PUD/AL(#1)50/EC/PUD/PH10/PUD/PPA30 [0.25]

Example 3

A 16 μm thick oriented copolyester film as an outermost layer 11 and a 50 μm thick aluminum foil coated with a tervalent chromium film were laminated by dry lamination and a 30 μm thick unsaturated carboxylic acid graft random propylene film as an innermost layer 14 was laminated to the tervalent chromium film.

OPET16/PUD/AL(#1)50/3C/PUD/PPA30[0.28]

Example 4

A battery packaging laminated structure in Example 4 was formed by a method similar to that by which the battery packaging laminated structure in Example 3 was formed, except that a 40 μm thick aluminum foil was used.

OPET16/PUD/AL(#1)40/3C/PUD/PPA30[0.2]

Example 5

A battery packaging laminated structure in Example 5 was formed by a method similar to that by which the battery packaging laminated structure in Example 3 was formed, except that an 80 μm thick aluminum foil was used.

OPET16/PUD/AL(#1)80/3C/PUD/PPA30[0.2]

Example 6

A 16 μm thick oriented copolyester film and a 40 μm thick aluminum foil coated with a 2 μm thick tervalent chromium film were laminated by dry lamination, a 2 μm thick acrylic resin film as a protective layer 15 was formed on the tervalent chromium film, a 50 μm thick random propylene film as an innermost layer 14 was laminated to the protective layer 15 by thermal lamination using an unsaturated carboxylic acid graft polyethylene adhesive.

Note: AL(#2) stands for an aluminum foil containing 1.2% iron, 0.15% silicon and 0.002% manganese.

OPET16/PUD/AL(#2)40/3C/AC2/TL=PAD/PR30[0.2]

Example 7

A battery packaging laminated structure in Example 7 was formed by a method similar to that by which the battery packaging laminated structure in Example 6 was formed, except that a 1 μm thick tervalent chromium film was used as a protective layer 15 and a 40 μm thick aluminum foil represented by AL(#3) was used.

Note: AL(#3) stands for an aluminum foil containing 1.5% iron, 0.09% silicon and 0.5% manganese.

OPET16/PUD/AL(#3)40/3C/AC2/TL=PAD/PR30[0.2]

Example 8

A battery packaging laminated structure in Example 8 was formed by a method similar to that by which the battery packaging laminated structure in Example 7 was formed, except that a 40 µm thick aluminum foil represented by AL(#4) was used.
 Note: AL(#4) stands for an aluminum foil containing 1.5% iron, 0.15% silicon and 0.5% manganese.
 OPET16/PUD/AL(#4)40/3C/AC2/TL=PAD/PR30[0.2]

Example 9

A battery packaging laminated structure in Example 9 was formed by a method similar to that by which the battery packaging laminated structure in Example 6 was formed, except that a 40 µm thick aluminum foil represented by AL(#5) was used.
 Note: AL(#5) stands for an aluminum foil containing 0.8% iron, 0.1% silicon and 0.01% manganese.
 OPET16/PUD/AL(#5)40/3C/AC2/TL=PAD/PR30[0.2]

Example 10

A battery packaging laminated structure in Example 10 was formed by a method similar to that by which the battery packaging laminated structure in Example 7 was formed, except that a 40 µm thick aluminum foil represented by AL(#6) was used.
 Note: AL(#6) stands for an aluminum foil containing 0.5% iron, 0.2% silicon and 1.1% manganese.
 OPET16/PUD/AL(#6)40/3C/AC2/TL=PAD/PR30[0.2]

Example 11

A battery packaging laminated structure in Example 11 was formed by a method similar to that by which the battery packaging laminated structure in Example 7 was formed, except that a 40 µm thick aluminum foil represented by AL(#7) was used.
 Note: AL(#7) stands for an aluminum foil containing 6.0% iron, 1.15% silicon and 0.1% manganese.
 OPET16/PUD/AL(#7)40/3C/AC2/TL=PAD/PR30[0.2]

Example 12

A battery packaging laminated structure in Example 12 was formed by a method similar to that by which the battery packaging laminated structure in Example 7 was formed, except that a 50 µm thick aluminum foil represented by AL(#3) was used.
 OPET16/PUD/AL(#3)50/3C/AC2/TL=PAD/PR30[0.2]

Example 13

A 16 µm thick oriented copolyester film as an outermost layer 11 and a 50 µm thick aluminum foil coated with a tervalent chromium film as an acid-resistant film were laminated by dry lamination, and a 40 µm thick random propylene film as an innermost layer 14 was laminated to the tervalent chromium film by dry lamination.
 OPET16/PUD/AL(#3)50/PC/PUD/PR40[0.2]

Example 14

A battery packaging laminated structure in Example 14 was formed by a method similar to that by which the battery packaging laminated structure in Example 13 was formed, except that a zinc phosphate film was used as an acid-resistant film.
 OPET16/PUD/AL(#3)50/PZ/PUD/PR40[0.2]

Example 15

A battery packaging laminated structure in Example 15 was formed by a method similar to that by which the battery packaging laminated structure in Example 13 was formed, except that a calcium phosphate film was used as an acid-resistant film
 OPET16/PUD/AL(#3)50/PCa/PUD/PR40[0.2]

Example 16

A 16 µm thick oriented copolyester film as an outermost layer 11 and a 50 µm thick aluminum foil (AL(#3)) coated with a 2 µm thick tervalent chromium film as an acid-resistant film were laminated by dry lamination, a 5 µm thick epoxy resin film as a protective layer 15 was formed on the trivalent chromium film and a 30 µm thick random propylene film as an innermost layer 14 was laminated to the protective layer 15 by dry lamination.
 OPET16/PUD/AL(#3)50.3C/EP5/PUD/PR30[0.2]

Example 17

A battery packaging laminated structure in Example 17 was formed by a method similar to that by which the battery packaging laminated structure in Example 16 was formed, except that a 3 µm thick phenolic resin film was used as a protective layer 15.
 OPET16/PUD/AL(#3)50/3C/FN3/PUD/PR30[0.2]

Example 18

A battery packaging laminated structure in Example 18 was formed by a method similar to that by which the battery packaging laminated structure in Example 16 was formed, except that a 4 µm thick melamine resin film was used as a protective layer 15.
 OPET16/PUD/AL(#3)50/3C/MR4/PUD/PR30[0.2]

Example 19

A battery packaging laminated structure in Example 19 was formed by a method similar to that by which the battery packaging laminated structure in Example 16 was formed, except that a 10 µm thick polyester film was used as a protective layer 15.
 OPET16/PUD/AL(#3)503C/PET10/PUD/PR30[0.2]

Example 20

A battery packaging laminated structure in Example 20 was formed by a method similar to that by which the battery packaging laminated structure in Example 16 was formed, except that a 5 µm thick acrylic resin film was used as a protective layer 15.
 OPET16/PUD/AL(#3)50/3C/AC5/PUD/PR30[0.2]

Example 21

A battery packaging laminated structure in Example 21 was formed by a method similar to that by which the battery packaging laminated structure in Example 16 was formed, except that a 4 μm thick unsaturated carboxylic acid graft random polypropylene film was used as a protective layer 15.

OPET16/PUD/AL(#3)50/3C/PPA4/PUD/PPA30[0.2]

Example 22

A battery packaging laminated structure in Example 22 was formed by a method similar to that by which the battery packaging laminated structure in Example 16 was formed, except that a 4 μm thick unsaturated carboxylic acid graft polyethylene film was used as a protective layer 15.

OPET16/PUD/AL(#3)50/3C/PEA4/PUD/PR30[0.2]

Example 23

A 16 μm thick oriented copolyester film as an outermost layer 11 and a 50 μm thick aluminum foil (AL(#3)) coated with a 2 μm thick tervalent chromium film as an acid-resistant film were laminated by dry lamination, a 5 μm thick acrylic resin film as a protective layer 15 was formed on the trivalent chromium film, a 16 μm thick polyester film as an intermediate layer 13 was laminated to the protective layer 15 by dry lamination and a 40 μm thick unsaturated carboxylic acid graft random propylene film as an innermost layer 14 was laminated to the intermediate layer 13 by dry lamination.

COPET16/PUD/AL(#3)50/3C/AC5/PUD/COPET16/ PUD/PPA40[0.2]

Example 24

A battery packaging laminated structure in Example 24 was formed by a method similar to that by which the battery packaging laminated structure in Example 23 was formed, except that a 30 μm thick unsaturated carboxylic acid graft polyethylene film was used as an innermost layer 14.

COPET16/PUD/AL(#3)50/3C/AC5/PUD/COPET16/ PUD/PEA30[0.25]

Example 25

A battery packaging laminated structure in Example 25 was formed by a method similar to that by which the battery packaging laminated structure in Example 23 was formed, except that a 50 μm thick ethylene-methyl methacrylate copolymer film was used as an innermost layer 14.

COPET16/PUD/AL(#3)50/3C/AC5/PUD/COPET16/ PUD/EAM50[0.3]

Example 26

A 10 μm thick low-density polyethylene film as a second intermediate layer 13b was attached to a 2 μm thick acrylic resin film as a protective layer 15 by extrusion coating, a 50 μm thick aluminum foil (AL(#3)) coated with a tervalent chromium film as an acid-resistant film was laminated to the protective layer 15 by dry lamination, a 16 μm thick oriented polyester film coated with a polyester-urethane adhesive as an anchor coat as a first intermediate layer 13a was laminated to the second intermediate layer 13a, and a 50 μm thick random propylene film as an innermost layer by dry lamination.

OPET16/PUD/AL(#3)50/3C/AC2/PUD/LD10/ ANC=PUD/COPET16/PCD/PR 50[0.4]

Example 27

A battery packaging laminated structure in Example 27 was formed by a method similar to that by which the battery packaging laminated structure in Example 23 was formed, except that a 3 μm thick acrylic resin film was used as a protective layer 15 and a 30 μm thick homopropylene film was used an innermost layer 14.

COPET16/PUD/AL(#3)50/3C/AC3/PUD/COPET16/ PUD/PH30[0.13]

Example 28

A battery packaging laminated structure in Example 28 was formed by a method similar to that by which the battery packaging laminated structure in Example 27 was formed, except that a 40 μm thick random propylene film was used as an innermost layer 14.

COPET16/PUD/AL(#3)50/3C/AC3/PUD/COPET16/ PUD/PR40[0.1]

Example 29

A battery packaging laminated structure in Example 29 was formed by a method similar to that by which the battery packaging laminated structure in Example 27 was formed, except that a 90 μm thick butene-random propylene copolymer film was used as an innermost layer 14.

COPET16/PUD/AL(#3)50/3C/AC5/PUD/COPET16/ PUD/BR90[0.5]

Example 30

A 16 μm thick oriented copolyester film as an outermost layer 11 and a 40 μm thick aluminum foil (AL(#3)) coated with a tervalent chromium film were laminated by dry lamination, a 2 μm thick acrylic resin film as a protective layer 15 was formed on the tervalent chromium film, a 30 μm thick random propylene film as an innermost layer 14 was laminated to the protective layer 15 by thermal lamination using an unsaturated carboxylic acid graft random polypropylene adhesive.

COPET16/PUD/AL(#3)50/3C/AC2/TL=PAD/PR30[0.2]

Example 31

A battery packaging laminated structure in Example 31 was formed by a method similar to that by which the battery packaging laminated structure in Example 30 was formed, except that a 5 μm thick epoxy resin film was used as a protective layer 15, a 50 μm thick ethylene-methyl methacrylate copolymer film was used as an innermost layer 14 and an unsaturated carboxylic acid graft polyethylene was used as an adhesive for thermal lamination.

COPET16/PUD/AL(#3)50/3C/EP5/TL=PEAD/EAM50 [0.2]

Example 32

A 16 μm thick oriented copolyester film as an outermost layer 11 and a 40 μm thick aluminum foil (AL(#3)) coated with a tervalent chromium film were laminated by dry lamination, a 4 μm thick phenolic resin film as a protective layer 15 was formed on the tervalent chromium film, a 10 μm thick high-density polyethylene film as an intermediate layer 13 was laminated to the protective layer 15 by thermal lamination using an unsaturated carboxylic acid graft random polypropylene adhesive, and a 70 μm thick ethylene-methyl methacrylate copolymer film as an innermost layer 14 was laminated to the intermediate layer 13 by thermal lamination.

COPET16/PUD/AL(#3)50/3C/FN4/TL=PEAD/HD10/TL=PEAD/EAM70[0.1]

Example 33

A battery packaging laminated structure in Example 33 was formed by a method similar to that by which the battery packaging laminated structure in Example 32 was formed, except that a 4 μm thick phenolic resin film was used as a protective layer 15, a 15 μm thick homoproylene film was used as an intermediate layer 13, the protective layer 15 and the intermediate layer 13 were laminated by thermal lamination using an unsaturated carboxylic acid graft polyethylene adhesive, and a 30 μm thick unsaturated carboxylic acid graft random polypropylene film was used as an innermost layer 14.

COPET16/PUD/AL(#3)50/3C/FN4/TL=PEAD/PH10/TL=PEAD/PPA30[0.2]

Example 34

A battery packaging laminated structure in Example 34 was formed by a method similar to that by which the battery packaging laminated structure in Example 30 was formed, except that a 5 μm thick unsaturated carboxylic acid graft random polypropylene film was used as a protective layer 15, a 30 μm thick unsaturated carboxylic acid graft random polypropylene film was used as an innermost layer 14, and the protective layer 15 and the innermost layer 14 are laminated by thermal lamination using unsaturated carboxylic acid graft polyethylene.

COPET16/PUD/AL(#3)50/3C/PPA5/TL=PEAD/PPA30[0.5]

Example 35

A battery packaging laminated structure in Example 35 was formed by a method similar to that by which the battery packaging laminated structure in Example 30 was formed, except that a zinc phosphate film was used as an acid-resistant film, a 2 μm thick phenolic resin film was used as a protective layer 15 and a 70 μm thick butene-random propylene copolymer film was used as an innermost layer 14.

COPET16/PUD/AL(#3)50/PZ/FN2/TL=PAD/BR70[0.6]

Example 36

A 10 μm thick low-density polyethylene film as a second intermediate layer 13b was attached to a 3 μm thick polyester film as a protective layer 15 by extrusion coating, a 50 μm thick aluminum foil (AL(#3)) coated with a zinc phosphate film as an acid-resistant film was laminated to the protective layer 15 by dry lamination, a 6 μm thick oriented polyester film coated with a polyester-urethane adhesive as an anchor coat as a first intermediate layer 13a was laminated to the second intermediate layer 13a, and a 50 μm thick graft random propylene film as an innermost layer 14 by dry lamination.

OPET16/PUD/AL(#3)50/PZ/PET3/TL=PAD/PR10/ANC=PUD/COPET16/PUD/PPA50[0.2]

Example 37

A battery packaging laminated structure in Example 37 was formed by a method similar to that by which the battery packaging laminated structure in Example 30 was formed, except that a zinc phosphate film was used as an acid-resistant film, a 6 μm thick blended resin film of an epoxy resin and melamine resin (blend ratio: 5:1) was used as a protective layer 15 and a 50 μm thick unsaturated carboxylic acid graft random polypropylene film was used as an innermost layer 14.

COPET16/PUD/AL(#3)50/PZ/EP+MR/TL=PAD/PPA50[0.15]

Example 38

A battery packaging laminated structure in Example 37 was formed by a method similar to that by which the battery packaging laminated structure in Example 33 was formed, except that a zinc phosphate film was used as an acid-resistant film, a 3 μm thick acrylic resin film was used as a protective layer 15, a 10 μm thick homopropylene film was used as an intermediate layer 13 and a 50 μm thick unsaturated carboxylic acid graft random polypropylene film was used as an innermost layer 14.

COPET16/PUD/AL(#3)50/PZ/AC3/TL=PAD/PH10/PPA50[0.3]

Example 39

A 16 μm thick oriented copolyester as an outermost layer 11 and a 50 μm thick aluminum foil (AL(#3)) coated with a tervalent chromium film as an acid-resistant film were laminated by dry lamination, a 5 μm thick acrylic resin film as a protective layer 15 was formed on the tervalent chromium film, a 16 μm thick copolyester film as an intermediate layer 13 was laminated to the protective layer 15 by dry lamination, a coextruded film of a 5 μm thick random propylene film, a 30 μm thick homopropylene film and a 10 μm thick random propylene film as an innermost layer 14 was laminated to the intermediate layer 13 by dry lamination.

COPET16/PUD/AL(#3(50/3C/AC5/PUD/COPET16/PUD/PR5//PH 30//PR10[0.2]

Example 40

A battery packaging laminated structure in Example 40 was formed by a method similar to that by which the battery packaging laminated structure in Example 30 was formed, except that a 4 μm thick acrylic resin film was used as a protective layer 15, a coextruded film of a 40 μm thick random propylene film and a 20 μm thick butene-random propylene copolymer film was used as an innermost layer 14, and the random propylene film was used as a lamination surface.

COPET16/PUD/AL(#3)50/3C/AC4/PUD/COPET16/PUD/PR40//BR20[0.18]

Example 41

A battery packaging laminated structure in Example 41 was formed by a method similar to that by which the battery packaging laminated structure in Example 30 was formed, except that a coextruded film of a 10 μm thick random propylene film, a 20 μm thick homopropylene film and a 20 μm thick butene-random propylene copolymer film was used as an innermost layer 14, and the random propylene film was laminated to a protective layer 15.

COPET16/PUD/AL(#3)50/3C/AC4/PUD/COPET16/PUD/PR40//BR20[0.18]

Example 42

A battery packaging laminated structure in Example 42 was formed by a method similar to that by which the battery packaging laminated structure in Example 30 was formed, except that 5 μm thick epoxy resin film was used as a protective layer 15, a coextruded film of a 15 μm thick low-density polyethylene film and a 50 μm thick ethylene-methyl methacrylate copolymer was used as an innermost layer 14, and the low-density polyethylene film was laminated to the protective layer 15.

COPET16/PUD/AL(#3)50/3C/EP5/PUD/COPET16/LD15//EAM50[0.3]

Example 43

A 16 μm thick oriented copolyester film as an outermost layer 11 and a 50 μm thick aluminum foil (AL(#3)) coated with tervalent chromium film as an acid-resistant film were laminated by dry lamination, a 4 μm thick acrylic resin film as a protective layer 15 was formed on the tervalent chromium film, a coextruded film of a 40 μm homopropylene film and a 10 μm thick random propylene film was used as an innermost layer 14, the protective layer 15 and the homopropylene film of the innermost layer 14 were laminated by dry lamination.

COPET16/PUD/AL(#3)50/3C/AC4/PUD/PH40//PR10[0.22]

Example 44

A battery packaging laminated structure in Example 44 was formed by a method similar to that by which the battery packaging laminated structure in Example 43 was formed, except that a coextruded film of a 30 μm thick homopropylene film and a 25 μm thick unsaturated carboxylic acid graft random polypropylene film was used as an innermost layer 14, and the homopropylene film of the innermost layer 14 was laminated to a protective layer 15.

COPET16/PUD/AL(#3)50/3C/AC4/PUD/PH30//PPA25[0.3]

Example 45

A battery packaging laminated structure in Example 45 was formed by a method similar to that by which the battery packaging laminated structure in Example 43 was formed, except that a coextruded film of 30 μm thick homopropylene film and a 10 μm thick random propylene film was used as an innermost layer 14, the homopropylene film of the innermost layer 14 was laminated to a protective layer 15 by thermal lamination using unsaturated carboxylic acid graft random polypropylene adhesive.

COPET16/PUD/AL(#3)50/3C/AC4/TL=PAD/PH40//PR10[0.2]

Example 46

A battery packaging laminated structure in Example 46 was formed by a method similar to that by which the battery packaging laminated structure in Example 43 was formed, except that a 6 μm thick unsaturated carboxylic acid graft random polypropylene film was used as a protective layer 15, a coextruded film of a 5 μm thick random propylene film, a 30 μm thick homopropylene film and a 10 μm thick random propylene film was used as an innermost layer 14, and the protective layer and the 5 μm thick random propylene film were laminated by thermal lamination.

COPET16/PUD/AL(#3)50/3C/PPA6/TL=PUD/PR5//PH30//PR10[0.2]

Example 47

A battery packaging laminated structure in Example 47 was formed by a method similar to that by which the battery packaging laminated structure in Example 43 was formed, except that a 3 μm thick unsaturated carboxylic acid graft polyethylene film was used as a protective layer 15, a coextruded film of 15 μm thick low-density polyethylene film and a 50 μm thick ethylene-methyl methacrylate copolymer film was used as an innermost layer 14, and the protective layer 15 and the low-density polyethylene film of the innermost layer 14 were laminated by thermal lamination.

COPET16/PUD/AL(#3)50/3C/PEA3/TL=PUD/LD15//EAM50[0.5]

Example 48

A 16 μm thick oriented copolyester film as an outermost layer 11 and a 50 μm thick aluminum foil (AL(#3)) coated with a zinc phosphate film as an acid-resistant film were laminated by dry lamination, a 3 μm thick polyester film as a protective layer 15 was formed on the zinc phosphate film, a 10 μm thick random propylene film as a second intermediate layer 13b was laminated to the protective layer 15 by thermal lamination using an unsaturated carboxylic acid graft random polypropylene adhesive, μm thick oriented polyester film as a first intermediate layer 13a was coated with a polyester-urethane adhesive as an anchor coat, a coextruded film of a 30 μm homopropylene film and a 25 μm thick unsaturated carboxylic acid graft random propylene film was used as an innermost layer 14, and the intermediate layer 13a and the innermost layer 14 were laminated by dry lamination.

COPET16/PUD/AL(#3)50/PZ/PET3/TL=PAD/PR10/EC=PUD/OPET6/ANC=PUD/PH30//PPA25[0.24]

Example 49

A battery packaging laminated structure in Example 49 was formed by a method similar to that by which the battery packaging laminated structure in Example 48 was formed, except that a 3 μm thick acrylic resin film was used as a protective layer 15, a coextruded film of a 10 μm thick random propylene film, a 20 μm thick homopropylene film and a 20 μm thick butene-random propylene copolymer film was used as an innermost layer 14, and the random propylene film of the innermost layer 14 was laminated to a first intermediate layer 13a

COPET16/PUD/AL(#3)50/PZ/AC3/TL=PAD/PR10/EC=PUD/OPET6/ANC=PUD/PR10//PH20//BR20[0.4]

Example 50

A 16 μm thick oriented copolyester film as an outermost layer 11 and a 50 μm thick aluminum foil (AL(#3)) coated with a tervalent chromium film as an acid-resistant film were laminated by dry lamination, a 4 μm thick acrylic resin film as a protective layer 15 was formed on the tervalent chromium film, a coextruded film of a 5 μm random propylene film, a 30 μm thick monopropylene film and a 5 μm thick random propylene film was used as an intermediate layer 13, the protective layer and the intermediate layer 13 were laminated by thermal lamination using an unsaturated carboxylic acid graft random polypropylene adhesive, a 20 thick unsaturated carboxylic acid graft random polypropylene film was used as an innermost layer 14, and the innermost layer 14 was laminated to the intermediate layer 13 by thermal lamination.

COPET16/PUD/AL(#3)50/3C/AC4/TL=PAD/PR5//PH30//PR5/TL/PPA20[0.19]

Example 51

A battery packaging laminated structure in Example 51 was formed by a method similar to that by which the battery packaging laminated structure in Example 50 was formed, except that a zinc phosphate film was used as an acid-resistant film, a coextruded film of a 5 μm thick low-density polyethylene film and a 50 μm thick high-density polyethylene film was used as an intermediate layer 13, the intermediate layer 13 was laminated to a protective layer 15 by dry lamination, a 20 μm thick ethylene-methyl methacrylate film was used as an innermost layer 14, and the intermediate layer 13 and the innermost layer 14 was laminated by thermal lamination.

COPET16/PUD/AL(#3)50/PZ/PET5/PUD/LD5//HD30//LD5/TL/EAM20[0.18]

Performance Characteristics of Embossed Packages

Embossed packages were fabricated by working the buttery packaging laminated structures in Examples 1 to 51. The performance characteristics of all the embossed battery packages were satisfactory.

1. Electrolyte resistance: Not delaminated
2. Moisture impermeability: 300 ppm or below
3. Peel strength: 9.8 N/15 mm or above (−40° C.) 9.8 N/15 mm or above (120° C.)
4. Short circuit preventing ability The outermost layers and the corresponding barrier layers were not delaminated.

Pinholes were not formed in none of the outermost layers.
None of the barrier layers was in contact with the terminals.

5. Formability

Any pinholes were not formed in any one of the embossed battery packages.

As shown in FIG. 3, a laminated structure 10 may be formed by constructing a first substructure by bonding together an outermost layer 11 and a barrier layer 12 with a dry lamination film DL, treating the surface of the barrier layer 12 and bonding a protective layer 15 to the barrier layer 12; constructing a second substructure by forming a two-layer intermediate layer 13 of a first intermediate layer 13a and a second intermediate layer 13b bonded together by dry lamination DL, and bonding an innermost layer 14 to the intermediate layer 13 by dry lamination DL; and bonding together the first and the second substructure by thermal lamination using a film for thermal lamination TL.

The laminated battery packaging structure of the present invention may be used for both forming a pouch for containing a lithium battery module and forming an embossed battery package (cup type package) for containing a lithium battery module. The pouch may be a pillow-type pouch, a three-sided seal pouch as shown in FIG. 5(a) or a four-sided seal pouch as shown in FIG. 5(b). Each of those pouches is sealed so that the terminals of the lithium battery project outside from a sealed end part of the pouch. As shown in FIGS. 5(c), 5(d) and 5(e), the terminals may extend outside from any optional portions of the sealed part of the pouch or the embossed battery package.

Sometimes, a battery package 4 of the battery packaging laminated structure of the present invention is an embossed battery package as shown in FIG. 2(b). The embossed battery package has a container 6 having an embossed part 8 and a flange 9, and a cover 7 to be bonded to the flange 9. Basically, a battery packaging laminated structure of four-layer construction as shown in FIG. 2(a) is used for forming the container 6. A polyester resin forming the outermost layer 11 and/or the intermediate layer 13 is a polyethylene terephthalate copolymer or a polybutylene terephthalate copolymer. It is preferable that the film forming the outermost layer 11 and/or the intermediate layer 13 is oriented at a low draw ratio. When such a copolymer is used, the container 6 shown in FIG. 6(a) can be formed in a rectilinear shape. The container can be easily formed in a shape in which a ratio D/T is 1/50 or greater, where T is the width of the open end of the container 6 and D is the depth of the container 6 (FIG. 6(a')), and side wall is inclined at an inclination θ of 130° or below. It is desirable to use an aluminum foil of 30 μm or above in thickness for forming the barrier layer to prevent the formation of pinholes when the battery packaging laminated structure is worked. Since the cover 7 to be attached to the container 6 having an embossed part 8 (FIG. 6(a)) is not embossed, the outermost layer 11 and/or the intermediate layer 13 of a battery packaging laminated structure for forming the cover 7 need not be the copolymer film. When an embossed battery package has a pair of containers 6 and 6' each having an embossed part 8 as shown in FIGS. 6(b) and 6(b'), both the containers 6 and 6' are formed from the battery packaging laminated structure.

The embossed battery package is capable of neatly containing a lithium battery module.

When the embossed battery package is used, the terminals may be extended outside from optional positions of the sealed parts of the embossed battery package as shown in FIGS. 6(c) and 6(d).

A lithium battery formed by sealing a lithium battery module in a pouch formed from the lithium battery packaging laminated structure of the present invention is flexible, is lighter than a lithium battery employing a metal can, can be formed in a small thickness and reduces space necessary for containing a battery. The battery packaging laminated structure of the present invention has a high barrier property, is capable of maintaining the barrier property for a long time and is excellent in heat resistance, cold resistance and chemicals unsusceptibility.

Second Embodiment

Packaging laminated structures in a second embodiment according to the present invention will be described as applied to battery packages for packaging lithium battery modules. However, the packaging laminated structures according to the present invention are applicable to packages for packaging foodstuffs and medicinal supplies.

FIG. 7(a) is a typical sectional view of a packaging laminated structure of basic construction, FIG. 7(b) is a typical sectional view of a packaging laminated structure of another basic construction, FIG. 7(c) is a perspective view of a lithium battery, FIG. 7(d) is a sectional view taken on line $X_1$-$X_1$ in FIG. 7(c) and FIG. 7(e) is an enlarged sectional view taken on line $X_2$-$X_2$ in FIG. 7(c). FIG. 8(a) is a typical sectional view of another packaging laminated structure according to the present invention of basic construction, FIG. 8(b) is a perspective view of a lithium battery, FIG. 8(c) is a perspective view of a lithium battery employing an embossed battery package and FIG. 8(d) is a sectional view taken on line $X_3$-$X_3$ in FIG. 8(c). FIGS. 9(a) and 9(b) are plan views of lithium batteries employing battery pouches according to the present invention, respectively, and FIGS. 9(a') and 9(b') are sectional views taken on line $X_3$-$X_3$ in FIG. 9(a) and taken on lines $X_4$-$X_4$ in FIG. 9(b), respectively.

The inventors of the present invention found through the earnest study of problems to be solved by the present invention that the problems can be solved by multilayer packaging laminated structures which are laminated structures formed from the following materials and have made the present invention. As shown in FIGS. 7(c) and 7(d), a lithium battery 1 is formed by sealing a lithium battery module 2 having terminals 3 in a pillow-type battery package (battery pouch) 4 having sealed peripheral parts 5 with the terminals 3 partly extending outside the battery package 4. Basically, a lithium battery packaging laminated structure (laminated structure) 10 for forming the battery package 4 has an outermost layer 11, a moisture barrier layer 12 and an innermost layer 12 as shown in FIG. 7(a). Those component layers are formed of the following materials.

Packaging laminated structures of the present invention are worked to form pouches as shown in FIG. 7(c) and embossed cases as shown in FIG. 8(b). FIGS. 9(a) and 9(a') show a three-sided seal pouch and FIGS. 9(b) and 9(b') show four-sided seal pouch. FIGS. 9(b) and 9(b') show a four-sided seal pouch.

The outermost layer 11 is formed of an oriented polyester resin or an oriented nylon resin. Possible polyester resins are polyethylene terephthalate, polybutylene terephthalate, polyethylene naphthalate, polybutylene naphthalate and polycarbonate. Possible nylon resins include polyamide resins, such as nylon 6 and nylon 66. The outermost layer 11 includes at leas tone oriented polyester or oriented nylon film of a thickness of 6 µm or above, preferably, in the range of 12 to 25 µm. When the packaging laminated structure is employed in a lithium battery, the outermost layer 11 comes into direct contact with a device (hardware). Therefore, it is desirable to form the outermost layer 11 of an insulating resin. Since a film forming the outermost layer 11 has pinholes and pinholes will be formed in the film during working, the thickness of the outermost layer 11 must be 6 µm or above. preferably, the thickness of the outermost layer 11 is in the range of 12 to 25 µm. The outermost layer 11 may be formed from a laminated film in view of providing the outermost layer 11 with a high pinhole-resistant property and an improved insulating ability. Preferably, the outermost layer 11 includes at least one resin layer consisting of two or more sublayers each having a thickness of 6 µm or above, preferably, in the range of 12 to 25 µm. The following multilayer structures 1) to 6) are examples of multilayer outermost layers 11.

1) Oriented polyethylene terephthalate film/Oriented nylon film

2) Oriented polyethylene terephthalate film/Polyethylene film

It is preferable to form the outermost layer in multilayer construction or to coat the surface of the outermost layer with a layer of a fluorocarbon resin or a silicone resin to improve the mechanical properties of the packaging laminated structure (stability in movement on packaging machines and processing machines) and to reduce friction between the outermost layer and a die when the packaging laminated structure is subjected to a forming process using the die to form embossed cases.

3) Fluorocarbon resin film/Oriented polyethylene terephthalate film (The fluorocarbon resin film is bonded to the oriented polyethylene terephthalate film or is formed on the oriented polyethylene terephthalate film by spreading a liquid fluorocarbon resin over the surface of the oriented polyethylene terephthalate film and drying the same.)

4) Silicone resin film/Oriented polyethylene terephthalate film (The silicone resin film is bonded to the oriented polyethylene terephthalate film or is formed on the oriented polyethylene terephthalate film by spreading a liquid silicone resin over the surface of the oriented polyethylene-terephthalate film and drying the same.)

5) Fluorocarbon resin film/Oriented polyethylene terephthalate film/Oriented nylon film 6) Silicone resin film/Oriented polyethylene terephthalate film/Oriented nylon film Adhesive layers for laminating the component sublayers of the outermost layer 11 are formed of polyester resins, polyether resins, urethane resins, polyether-urethane resins, polyester-urethane resins, isocyanate resins, polyolefin resins, polyethylene-imine resins, cyanoacrylate resins, organotitanium compounds, epoxy resins, imide resins, silicone resins, mixtures of some of those resins and derivatives of those resins.

The barrier layer 12 prevents the penetration of moisture and gases into packaging pouches. The barrier layer 12 is formed of a flexible metal, preferably, of a soft aluminum having an iron content in the range of 0.3 to 9.0%.

Aluminum foils as a packaging laminated structure having a barrier property are used for forming a laminated film in combination with films of other materials. Aluminum, as compared with other metals, is relatively susceptible to the corrosive action of organic solvents, acids and alkalis. The active materials and polyelectrolytes of most lithium battery modules contain an organic solvent, such as ethylene carbonate, propylene carbonate, diethyl carbonate, dimethyl carbonate or acetone. Hydrogen fluoride (HF), a strong acid, is produced by the interaction of water and a lithium salt contained in the polyelectrolyte. When the surface of an aluminum foil is corroded by such organic solvents and acids, adhesive strength between the aluminum foil and an innermost layer or an intermediate layer decreases and the laminated packaging laminated structure is delaminated and the functions of the packaging laminated structure are lost.

The inventors of the present invention have found that the corrosion of the surface of an aluminum foil can be prevented by coating the aluminum foil with an acid-resistant, solvent-resistant resin layer (herein after referred to as "protective layer 15"). It was also found that the protective layer 15 unexpectedly is effective in bonding the intermediate layer 13 to the aluminum foil as well as effective in protecting the surface of the aluminum foil. According to the present invention, suitable materials for forming the protective layer 15 coating the aluminum foil are resins including unsaturated carboxylic acid graft polyolefin resins (POa), copolyester resins (Co-PET), such as polyethylene terephthalate resins and polybutylene terephthalate resins, ionomers (Io), ethylene-vinyl acetate copolymers (EVA), ethylene-acrylate copolymers, ethylene-methacrylate copolymers (EMA), polyether-urethane resins (PeU) and derivatives of those resins. The protective layer 15 may contain 30% or above of at least one of those resins and the derivatives.

According to the present invention, an intermediate layer 13 may be sandwiched between the barrier layer 12 and the innermost layer. The intermediate layer 13 protects the barrier layer 12 and prevents contact (short circuit) between the terminals 3 and the barrier layer 12 of aluminum due to the thinning of the innermost layer 14, i.e., a heat-adhesive layer, by heat and pressure applied thereto in a heat-sealing process for forming a pouch. The intermediate layer 13 stabilizes the environmental capabilities of the battery. The intermediate layer 13 has a thickness of 10 μm or above and a melting point of 80° C. or above. Preferably, the intermediate layer 13 includes at least one film having a thickness in the range of 12 to 25 μm and formed of a polyester resin, a polyolefin resin or a fluorocarbon resin.

The intermediate layer 13 may be formed in a multilayer structure to provide the same with an enhanced function. A multilayer structure as the intermediate layer 13 may be formed by a coextrusion process or a dry lamination process. For example, each of the component sublayers of an intermediate layer 13 consisting of two or more sublayers and formed by a coextrusion process has a thickness in the range of 10 to 100 μm, preferably, in the range of 15 to 25 μm. The following multilayer structures 1) to 9) are examples of intermediate layers 13 formed by coextrusion.

1) PEA/HD
2) PEA/PP (melting point: 120° C. or above, preferably, 135° C. or above)
3) PMa/TPX (melting point: 120° C. or above, preferably, 135° C. or above), HD or PP
4) PEA or PPA/PMa (two layers)
5) PEA or PPA/PMa/PEA or PPA (three layers)
6) PEA or PPA/PMa/PMa (three layers)
7) PEA or PPA/PMa/TPX/PMa (four layers)
8) PEA or PPA/PMa/TPX/PMa/PEA or PPA (five layers)
9) PEA or PPA/PMa/PEA or PPA (three layers)

The following multilayer structures 1) to 9) are examples of intermediate layers 13 formed by dry lamination.

1) Sublayer 1 (layer of PEA, PPA or PMa)/HD
2) Sublayer 1/PP (melting point: 120° C. or above, preferably 135° C. or above)
3) Sublayer 1/TPX
4) Sublayer 1/PMa (melting point: 135° C. or above, Vicat softening point: 110° C. or above)
5) Sublayer 1/Oriented polyethylene terephthalate
6) Sublayer 1/Polybutylene terephthalate
7) Sublayer 1/Polyethylene naphthalate
8) Sublayer 1/Fluorocarbon
9) PEA, PPA or PMa/HD, PP, TPX, PMa, oriented polyethylene terephthalate, polybutylene terephthalate, polyethylene naphthalate or fluorocarbon/PEA, PPA or PMa Possible adhesives for bonding together the component sublayers of the foregoing intermediate layers 13 are polyether-urethane adhesives, polyester-urethane adhesives, isocyanate adhesives, polyolefin adhesives, polyethylene-imine adhesives, cyanoacrylate adhesives, organotitanium compounds, epoxy adhesives, imide adhesives and silicone adhesives.

The polyester resins for forming the intermediate layer 13 may include polyethylene terephthalate copolymers and polybutylene terephthalate copolymers.

Figure 7:
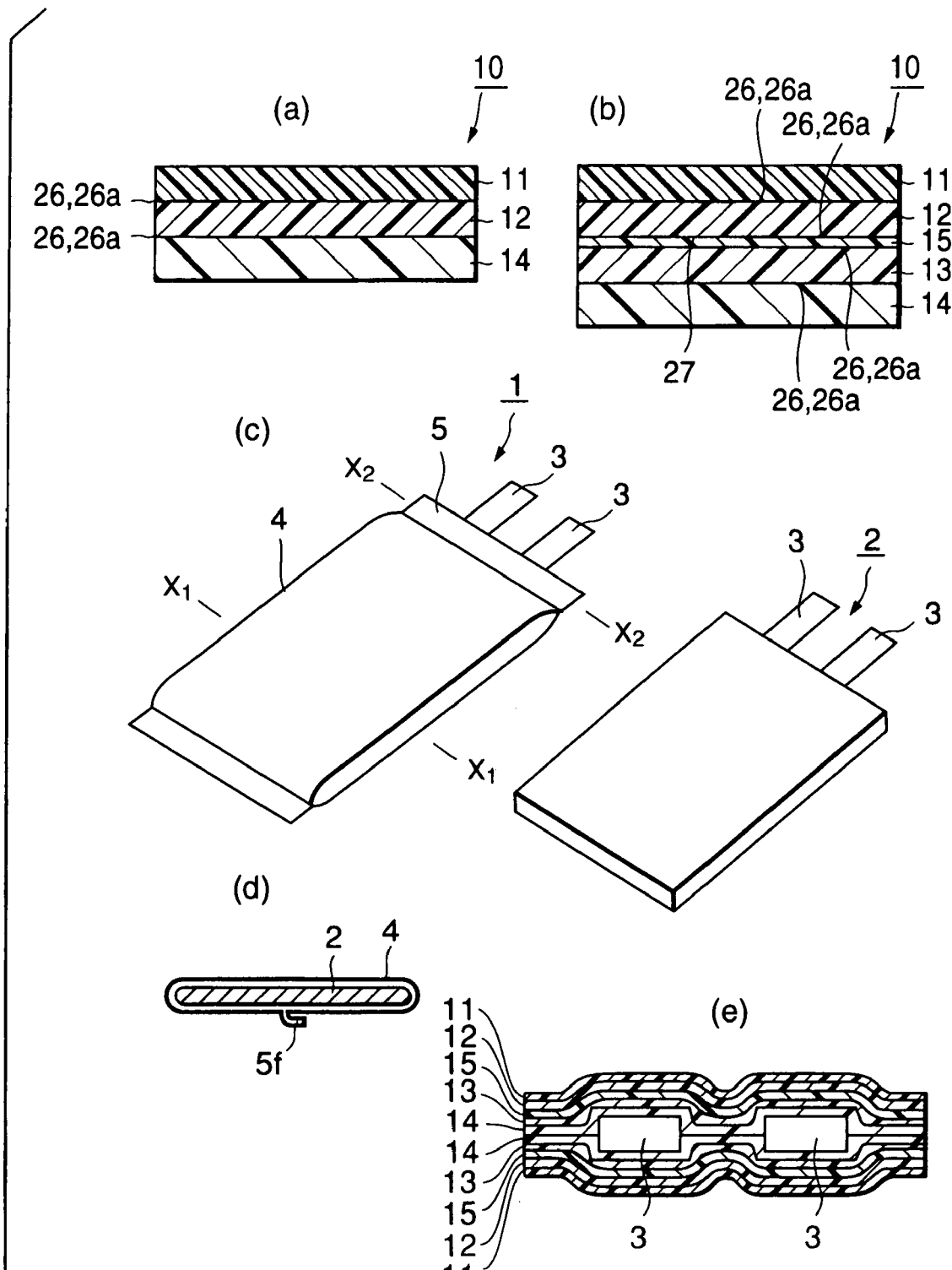
FIG. 7 is a view of a battery packaging laminated structure and a battery pouch in embodiments according to the present invention.

The innermost layer 14 of the lithium battery packaging laminated structure must be capable of being united with another innermost layer 14 by heat-sealing, of being bonded to metals, such as the terminals 3, as shown in FIG. 7(3) and of withstanding quality deteriorating actions of a lithium battery module packaged by the lithium battery packaging laminated structure. Materials satisfactorily meeting such requirements are films having a thickness of 10 μm or above, preferably, in the range of 50 to 100 μm, a melting point of 80° C. or above and a Vicat softening point of 70° C. or above and formed of any one of unsaturated carboxylic acid graft polyolefin resins including unsaturated carboxylic acid graft polyethylene resins, unsaturated carboxylic acid graft polypropylene resins and unsaturated carboxylic acid graft poly(methyl pentene) resins.

The unsaturated carboxylic acid graft polyolefin resins are satisfactory in heat resistance, cold resistance and workability.

When the thickness of the innermost layer 14 is less than 20 μm, portions of the package corresponding to the terminals 3 cannot be satisfactorily heat-sealed and the package loses the barrier property to inhibit the penetration of external moisture into the package. Innermost layers 14 of a material having an excessively low melting point and an excessively low Vicat softening point are not heat-resistant and not cold-resistant, adhesive strength between the innermost layers 14 and the terminals 3 are low and the package may break. The adhesive strength between heat-sealed innermost layers 14 does not increase even if the thickness of the innermost layers 14 is increased beyond 100 μm and the thickness of the laminated structure increases and a package formed from the laminated structure needs an increased space for installation if the thickness of the innermost layer 14 is increased. Although the foregoing unsaturated graft polymers may be individually used, a material produced by blending some of those unsaturated graft polymers have satisfactory properties.

Figure 8:
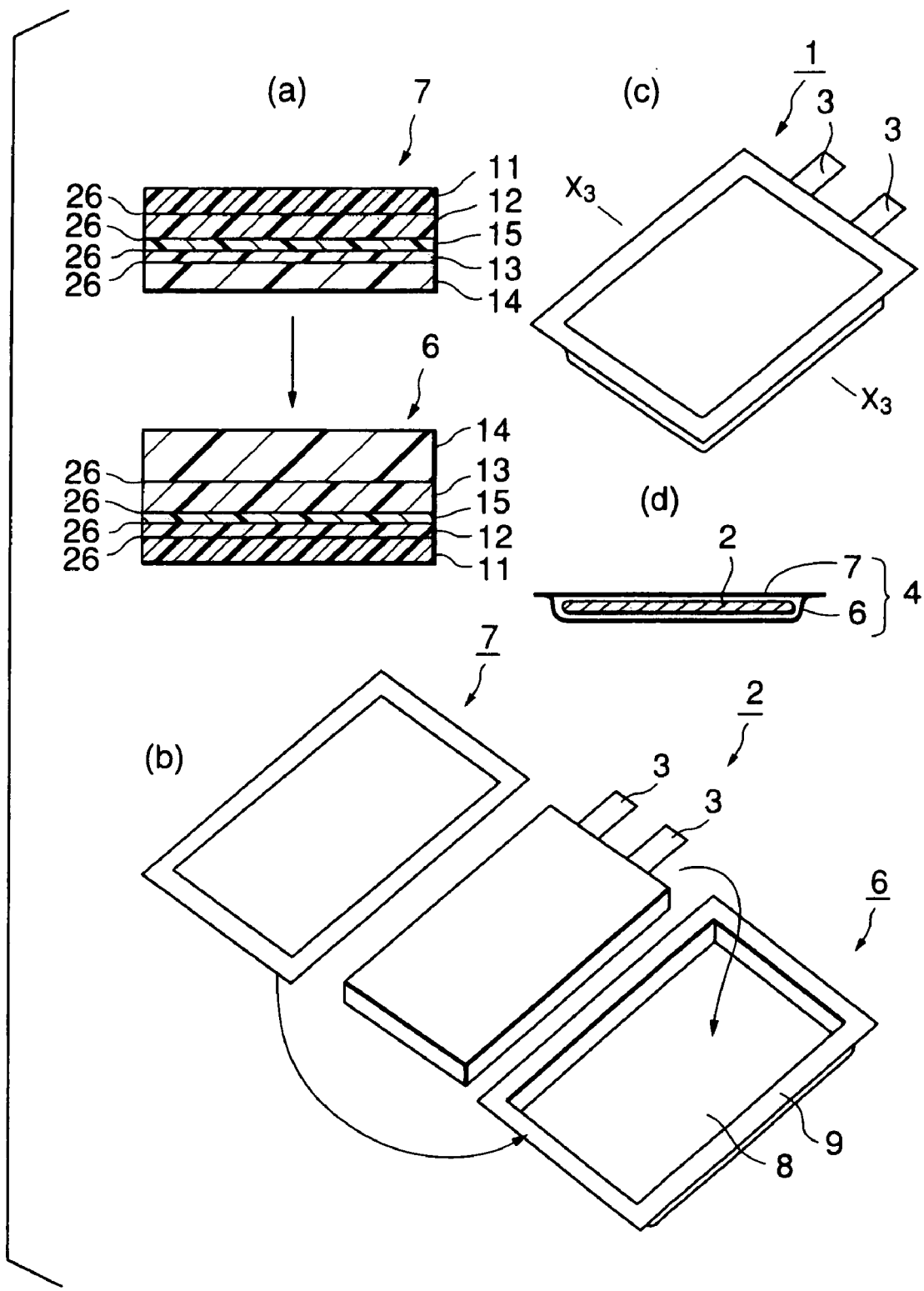
FIG. 8 is a view of a battery packaging laminated structure and a battery pouch in modifications of the battery packaging laminated structure and the battery pouch according to the present invention.
Figure 9:
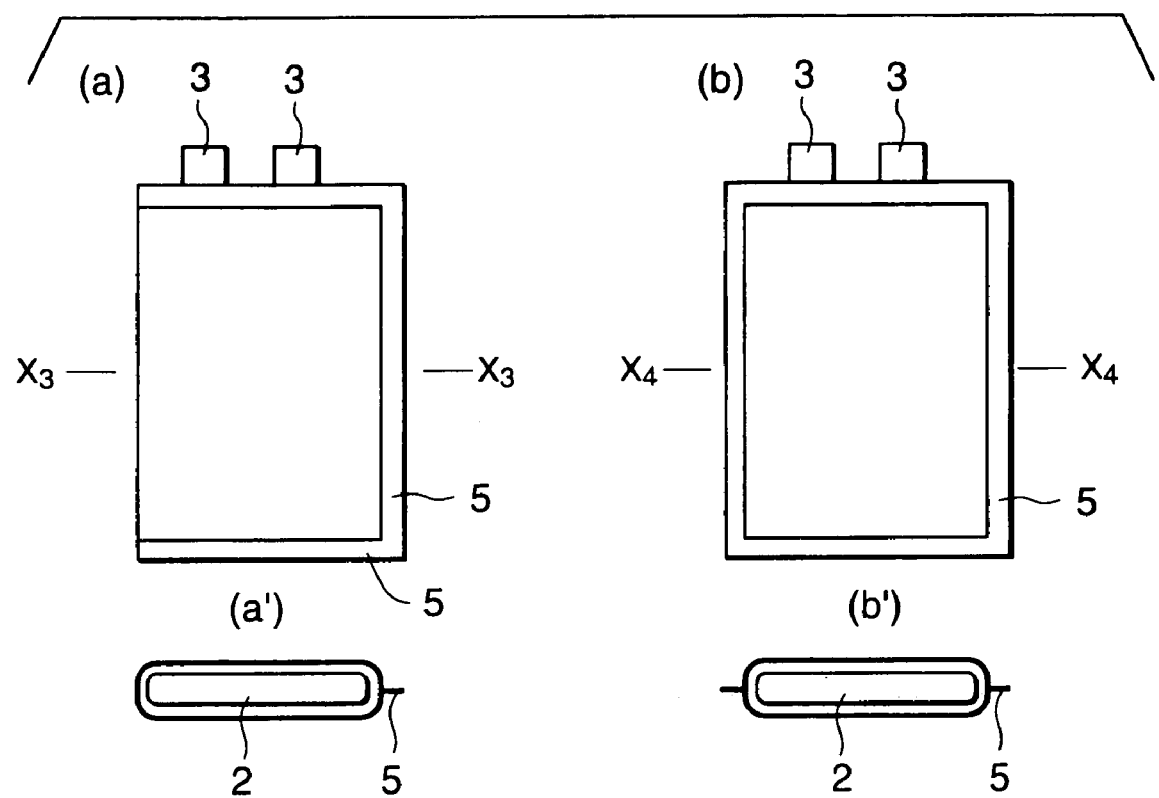
FIG. 9 is a view of battery pouches according to the present invention.

Sometimes, a tray-type embossed case as shown in FIG. 8(*b*) is formed from the packaging laminated structure according to the present invention. The embossed case has a container 6 having an embossed part 8 and a flange 9, and a cover 7 to be bonded hermetically to the flange 9. Basically, the container 6 is formed from a five-layer laminated structure as shown in FIG. 8(*a*). A polyester resin forming the outermost layer 11 and/or the intermediate layer 13 is a polyethylene terephthalate copolymer or a polybutyleneterephthalate copolymer. It is preferable that the film forming the outermost layer 11 and/or the intermediate layer 13 is oriented at a low draw ratio. When such a copolymer is used, the container 6 can be formed in a rectilinear shape. Since the cover 7 to be attached to the container 6 is not embossed, the outermost layer 11 and/or the intermediate layer 13 of a packaging laminated structure for forming the cover 7 need not be the copolymer film.

There is the possibility that the surface of the aluminum foil forming the battier layer 12 is corroded by an acid produced by the interaction of the electrolyte of the lithium battery and moisture and the intermediate layer 13 comes off the barrier layer 12. It was found through studies made to prevent the corrosion of the aluminum foil that the aluminum foil can be protected from corrosion by coating the aluminum foil beforehand with a coating of a heat-resistant, cold-resistant material that can be processed by secondary processing or with a protective layer 15 formed by spreading a molten resin over the surface of the aluminum foil. The coating and the protective layer 15 may be used individually, may be modified or may be used in combination. The aluminum foil may be coated with a plurality of coatings when necessary.

The protective layer 15 may be a film having a thickness in the range of 0.5 to 50 μm, preferably, in the range of 1 to 30 µm, a melting point of 80° C. or above and a Vicat softening point of 70° C. or above formed between the barrier layer 12 and the intermediate layer 13 or between the barrier layer 12 and the innermost layer 14. The protective layer may be formed of any one of unsaturated carboxylic acid graft polyolefin resins including unsaturated carboxylic acid graft polyethylene resins, unsaturated carboxylic acid graft polypropylene resins and unsaturated carboxylic acid graft poly(methyl pentene) resins. A protective layer 15 of an unsaturated carboxylic acid graft polyolefin resin may be formed on a surface of the barrier layer 12 on the side of the innermost layer 14 by extrusion coating or by laminating an unsaturated carboxylic acid graft polyolefin resin film to the same surface of the barrier layer 12 by dry lamination or thermal lamination.

The protective layer 15 may be formed by forming a coat of a thickness in the range of 0.5 to 10 µm, preferably, in the range of 1 to 30 µm of a resin containing 30% or above of at least one of epoxy resins, polyimide resins, unsaturated polyester resins, alkyd resins, phenolic resins, thermosetting acrylic resins, polyamide resins, fluorocarbon resins, unsaturated carboxylic acid graft polyolefin resins, polyethylene terephthalate copolymers, polybutylene terephthalate polymers, polyester-ethylene vinyl acetate copolymers, polyester-polystyrene copolymers, ionomers, copolymers of ethylene and acrylic acid derivatives, and copolymers of ethylene and methacrylic acid derivatives on a surface of the barrier layer 12 on the side of the innermost layer 14, and curing the coat at 150° C. for 10 s or longer.

A film as a protective layer 15 having a thickness in the range of 0.5 to 50 µm, preferably, in the range of 1 to 30 µm and formed of a material containing 30% or above of at least one of epoxy resins, polyimide resins, unsaturated polyester resins, fluorocarbon resins, unsaturated carboxylic acid graft polyolefin resins, polyethylene terephthalate copolymers, polybutylene terephthalate copolymers, polyester-ethylene vinyl acetate copolymers, polyester-polystyrene copolymers, ionomers, copolymers of ethylene and acrylic acid derivatives, and copolymers of ethylene and methacrylic acid derivatives may be laminated to the barrier layer 12 by dry lamination. The protective layer 15 may be bonded to the barrier layer 12 with a film having a thickness in the range of 1 to 10 µm and formed of one of polyether-urethane resins, polyester-urethane resins, isocyanate resins, polyolefin resins, polyethylene-imine resins, cyanoacrylate resins, organotitanium compounds, epoxy resins, imide resins and silicone resins.

A protective layer 15 having a thickness in the range of 0.5 to 10 µm, preferably, in the range of 1 to 30 µm and formed of a material containing 30% or above of at least one of epoxy resins, polyimide resins, unsaturated polyester resins, alkyd resins, unsaturated carboxylic acid graft polyolefin resins, polyethylene terephthalate copolymers, polybutylene terephthalate polymers, poly-ester-ethylene vinyl acetate copolymers, polyester-polystyrene copolymers, ionomers, copolymers of ethylene and acrylic acid derivatives, and copolymers of ethylene and methacrylic acid derivatives may be formed on a surface of the barrier layer 12 on the side of the innermost layer 14, a film having a thickness in the range of 1 to 50 µm and formed of a resin having a melting point of 80° C. or above and a Vicat softening point of 70° C. or above and containing an unsaturated carboxylic acid graft polypropylene or a unsaturated carboxylic acid graft poly(methyl pentene) is sandwiched between the protective layer 15 and the intermediate layer 13 or between the protective layer 15 and the innermost layer 14, and the protective layer 15, the intermediate layer 13 and the film sandwiched between the protective layer 15 and the intermediate layer, or the protective layer 15, the innermost layer 14 and the film sandwiched between the protective layer 15 and the innermost layer 14 are laminated by thermal lamination. Thus, the adhesive strength between the barrier layer 12 (more precisely, the protective layer 15) and the intermediate layer 13m, and the heat resistance and cold resistance of the laminated structure can be enhanced, and the delamination of the laminated structure during secondary processing can be prevented.

A silane coupling layer may be formed between the barrier layer 12 and the protective layer 15 to enhance the adhesive strength between the barrier layer 12 and the protective layer 15.

When fabricating the packaging laminated structure according to the present invention, the protective layer 15, and the intermediate layer 13 or the innermost layer 14, and the intermediate layer 13 and the innermost layer can be laminated by dry lamination using a bonding layer 26.

The bonding layer 26 having a thickness in the range of 10 to 50 µm, preferably in the range of 15 to 25 µm and formed of an unsaturated graft olefin, such as an unsaturated carboxylic acid graft polyethylene, an unsaturated carboxylic acid graft polypropylene or an unsaturated carboxylic acid graft poly(methyl pentene) may be formed by extrusion between the innermost layer 14 or the intermediate layer 13, and the barrier layer 12 or the protective layer 15 for sandwich lamination. Bonding films that serve as the bonding layer 26 may be sandwiched between the barrier layer 12 and the intermediate layer 13 and between the intermediate layer 13 and the innermost layer 14, and the barrier layer 12, the intermediate layer 13 and the innermost layer 14 may be laminated sequentially by dry lamination.

To improve and stabilize the film forming property, laminating property and secondary processing property (forming and bonding) of the component layers of the battery packaging laminated structure, i.e., the laminated structure, according to the present invention, the component layers may be subjected to a surface activating or in activating process, such as a corona discharge process, a blasting process, an oxidizing process or an ozonation process, or at least one of organic and inorganic metal additives including a desiccant, a moisture-absorbent agent, a wetting agent, a gas-impermeable and gas-adsorbent agent, a flame retarder, an antistatic agent, such as carbon, a surface-active agent or an inorganic oxide, a conductive material and an electromagnetic shielding material may be added to the component layers or a liquid containing at least one of those materials may be applied in a coat to the component layers.

When fabricating the lithium battery packaging laminated structure according to the present invention films that serve as the component layers of the lithium battery packaging laminated structure may be formed by a T-die extrusion process, a tubular film extrusion process or a coextrusion process, and the films may be laminated by coating, evaporation, ultraviolet curing, electron beam curing, dry lamination, extrusion coating, coextrusion lamination, or thermal lamination using bonding layers 26a. The following are three representative laminating methods.

(1) A method that laminates the outermost layer 11 and the barrier layer 12 to form a first substructure, laminates the intermediate layer 13 and the innermost layer 14 to form a second substructure, and laminates the first and the second substructures by thermal lamination.

2) A method that laminates the outermost layer 11 and the barrier layer 12 to form a first substructure and laminates part of the intermediate layer 13 and the innermost layer 14 to form a second substructure or forms only the outermost layer 11, and carries out extrusion coating (or coextrusion) using the intermediate layer 13. When necessary, the laminated structure is subjected to a thermal lamination process.

3) A method that laminates the outermost layer 11, the barrier layer 12 and the innermost layer 14 by dry lamination.

The packaging laminated structure according to the present invention can be used not only for forming packages for packaging lithium battery modules but also for forming general-purpose pouches and laminated tubes.

EXAMPLES

Laminated structures according to the present invention were fabricated and pouches and embossed cases were formed from the laminated structures. The quality and performance of the laminated structures, the pouches and the embossed cases were evaluated.

Appearance of lithium batteries having packages formed from packaging laminated structures in examples and comparative examples was examined, the packages were searched for pinholes, sections of sealed parts including terminals of the lithium batteries were inspected for contact between the terminals and the barrier layers. The following properties of sample batteries were examined after storing the sample batteries for ten days in an environment (1) of 40° C. and 90% RH and an environment (2) of 60° C. and 85% RH (dry).

Moisture impermeability: Moisture contained in the battery was measured by Karl Fischer's method to see whether an increase in moisture contained in the battery is 50% or below and the packages were inspected for delamination.

1. Pouch type batteries: Pouches of 30 mm×60 mm were made, battery modules of 4 mm in thickness having nickel terminals of 100 μm in thickness were put in the pouches, respectively, and three sides of each pouch including a side through which the terminals extend outside were sealed by heat-sealing. Heat of a temperature of 200° C. and a pressure of 1 kgf/cm² were applied for 1 s to the pouches for heat-sealing to form sealed parts of 10 mm in width.

Laminated structures of the following construction were fabricated and used for fabricating the pouches of lithium batteries in Examples 1 to 6 and Comparative examples 11 to 13.

PET16/DL/AL20/TL/PEA20/DL/PET16/DL/PPA50

In this symbolic representation, DL and TL denote dry lamination and thermal lamination, respectively. Table 2-1 shows properties of aluminum foils and those of laminated structures and pouches formed from those laminated structures.

TABLE 2-1

| | Aluminum foil | | Pinholes | | Laminated structure | |
|---|---|---|---|---|---|---|
| | Thickness (μm) | Iron content (%) | Laminated structure | Pouch | Elongation (%) | Tensile strength (N/mm²) |
| Example 1 | 15 | 0.3 | None | None | 5 | 78 |
| Example 2 | 15 | 9.0 | None | None | 8 | 102 |
| Example 3 | 20 | 0.7 | None | None | 7 | 80 |
| Example 4 | 20 | 2.0 | None | None | 10 | 95 |
| Example 5 | 80 | 0.3 | None | None | 17 | 105 |
| Example 6 | 80 | 9.0 | None | None | 25 | 107 |

TABLE 2-1-continued

| | Aluminum foil | | Pinholes | | Laminated structure | |
|---|---|---|---|---|---|---|
| | Thickness (μm) | Iron content (%) | Laminated structure | Pouch | Elongation (%) | Tensile strength (N/mm²) |
| Comparative example 11 | 12 | 0 | 1 | 2 | 4 | 65 |
| Comparative example 12 | 20 | 0.2 | 0 | 1 | 5 | 72 |
| Comparative example 13 | 12 | 2.0 | 1 | None | 10 | 95 |

2. Embossed package type batteries: Embossed packages each having a container of 30 mm×60 mm×4 mm having a flange of 7 mm in width were made by press forming, battery modules of 4 mm in thickness having nickel terminals of 100 μm in thickness were put in the containers of the embossed cases, respectively, and covers were bonded to the flanges of the containers, respectively, by heat-sealing to seal the battery modules in the embossed cases.

Laminated structures of the following construction:
CPET16/EC/PE20/EC/AL/TL/PPA20/DL/CPET16/DL/PEA50 were fabricated and used for fabricating the embossed cases employed in Examples 1 to 6 and Comparative examples 1 to 4. Table 2-2 shows properties of aluminum foils and those of embossed cases.

TABLE 2-2

| | Aluminum foil | | | Number of |
|---|---|---|---|---|
| | Thickness (μm) | Iron content (%) | Drawing ratio (Depth/length) | pinholes of 5 μm or above in container |
| Example 1 | 15 | 0.3 | 1/40 | None |
| Example 2 | 15 | 9.0 | 5/40 | None |
| Example 3 | 20 | 0.7 | 5/40 | None |
| Example 4 | 20 | 2.0 | 5/40 | None |
| Example 5 | 80 | 0.3 | 1/20 | None |
| Example 6 | 80 | 9.0 | 5/20 | None |
| Comparative example 1 | 12 | 0 | 1/40 | 2 |
| Comparative example 2 | 20 | 0.2 | 5/40 | 1 |
| Comparative example 3 | 12 | 2.0 | 5/40 | 2 |
| Comparative example 4 | 80 | 0 | 1/20 | None* |

*Although any pinholes were not found, the laminated structure was creased when pressed.

Any pinholes were not formed in the embossed cases of the batteries in Examples 1 to 6. Peel strength of the bonded parts was 100 g/m² or above. The laminated structures forming the embossed cases of Comparative examples 1 to 4 had pinholes and pinholes were formed therein when the laminated structures were pressed.

When aluminum foils having an iron content in the range of 0.3 to 2.0%, preferably, in the range of 0.5 to 1.2% were used, formation of pinholes in the side walls of the pouches could be prevented, peripheral parts of the laminated structure were satisfactorily ductile and could be satisfactorily drawn, and the embossed cases could be formed in a rectilinear shape. The protective layer covering the surface of the barrier layer on the side of the innermost layer prevented the corrosion of the surface of the aluminum foil by an acid or a carbonate solvent and the delamination of the laminated structure. The laminated structures having an outermost layer or an intermediate layer of a polyethylene terephthalate copolymer or polybutylene terephthalate copolymer had satisfactory workability.

Third Embodiment

Examples of laminated structures in a third embodiment according to the present invention will be described. Third embodiment differs from the first embodiment in the construction of laminated structures and is substantially the same as the first embodiment shown in FIGS. 1 to 6. Therefore, the third embodiment will be described with reference to FIGS. 1 to 6, in which parts like or corresponding to those previously described with reference to FIGS. 1 to 6 are denoted by the same reference characters and the description thereof will be omitted.

An outermost layer 11 included in a laminated structure 10 according to the present invention is an oriented polyester or oriented nylon film. Possible polyester resins for forming the outermost layer 11 are polyethylene terephthalate resins, polybutylene terephthalate resins, polyethylene naphthalate resins, polybutylene naphthalate resins, polyester copolymers, polycarbonate resins and the like. Possible nylon resins for forming the outermost layer 11 are polyamide resins including nylon 6, nylon 66, nylon 66-nylon 6 copolymers, nylon 610, polymethaxylilene adipamide (MXD6) and the like.

When the lithium battery is used on a device (hardware), the outermost layer 11 touches the device. Therefore, it is desirable to form the outermost layer 11 of an insulating resin. Since a film forming the outermost layer 11 has pinholes and pinholes will be formed in the film during working, the thickness of the outermost layer 11 must be 6 µm or above. preferably, the thickness of the outermost layer 11 is in the range of 12 to 25 µm.

The outermost layer 11 may be formed from a laminated film in view of providing the outermost layer 11 with a high pinhole-resistant property and an improved insulating ability.

Preferably, the outermost layer 11 includes at least one resin layer consisting of two or more layers each having a thickness of 6 µm or above, preferably, in the range of 12 to 25 µm. The following laminated structures 1) to 6) are examples of the outermost layer 11 of laminated construction.

1) Oriented polyethylene terephthalate film/Oriented nylon film

2) Oriented polyethylene terephthalate film/Polyethylene film

It is preferable to form the outermost layer in multilayer construction or to coat the surface of the outermost layer with a layer of a fluorocarbon resin, an acrylic resin or a silicone resin to improve the mechanical properties (stability in movement on packaging machines and processing machines) and the protective properties (heat resistance and electrolyte resistance) of the packaging laminated structure and to reduce friction between the outermost layer and a die when the packaging laminated structure is subjected to a forming process using the die to form embossed cases.

3) Fluorocarbon resin film/oriented polyethylene terephthalate film

The fluorocarbon resin film may be a film or a coat formed by spreading a coating liquid containing a fluorocarbon resin in a film and drying the same.

4) Silicone resin film/oriented polyethyleneterephthalate film The silicone resin film may be a film or a coat formed by spreading a coating liquid containing a silicone resin in a film and drying the same.

5) Fluorocarbon resin film/oriented polyethylene terephthalate resin/oriented nylon resin 6) Silicone resin/oriented polyethylene terephthalate resin/oriented nylon resin 7) Acrylic resin/oriented nylon resin The acrylic resin film may be a film or a coat formed by spreading a coating liquid containing an acrylic resin in a film and drying the same.

The outermost layer 11 is bonded to the barrier layer 12 by dry lamination using a bonding film or by extrusion coating.

The barrier layer 12 prevents the penetration of moisture into a lithium battery 1. To avoid the adverse effect of pinholes that may be formed in the barrier layer 12, to stabilize the workability (ease of fabricating pouches or forming) and to provide the barrier layer 12 with pinhole resistance, the barrier layer 12 is formed from a foil of a metal, such as aluminum or nickel, or a film of an inorganic compound, such as silicon dioxide or alumina. Preferably, the barrier layer 12 is an aluminum foil having a thickness in the range of 15 to 80 µm.

The inventors of the present invention made studies to inhibit the formation of pinholes more effectively and to inhibit the formation of cracks in an embossed part of a embossed case for a lithium battery and found that an aluminum foil for forming the barrier layer 12 having an iron content in the range of 0.3 to 9.0%, preferably in the range of 0.76 to 2.0% is superior in ductility to an aluminum foil not containing iron, and a laminated structure provided with a barrier layer of such an aluminum foil is less subject to pinhole formation when bent and can be easily embossed to form a container having side walls. An aluminum foil having an iron content less than 0.3% has no effect on inhibiting pinhole formation and improving formability. An aluminum foil having an iron content exceeding 9.0% is stiff and deteriorates the workability of the laminated structure when making pouches.

The flexibility, firmness and hardness of the aluminum foil are dependent on conditions for annealing the aluminum foil formed by cold rolling. It is more preferable to use a flexible, soft aluminum foil processed by annealing than to use an unannealed hard aluminum. The flexibility, firmness and hardness of an aluminum foil and annealing conditions may be selectively determined taking into consideration workability (ease of fabricating pouches or forming). A slightly or perfectly annealed soft aluminum foil is more desirable than an unannealed hard aluminum foil in view of inhibiting pinhole formation and creasing when embossing a laminated structure.

The inventors of the present invention found that it is very effective in preventing the dissolution particularly of an aluminum oxide film coating the surface of the aluminum foil and the corrosion of the aluminum foil by hydrofluoric acid produced by the interaction of the electrolyte of a lithium battery module and moisture, in improving the adhesive property (wettability) of the surface of the aluminum foil and in stabilizing adhesive strength between the aluminum foil and the innermost layer to coat the surface of the aluminum foil with an acid-resistant film TR, to finish the surface of the aluminum foil by a coupling property improving process and coating the same with a protective layer 15 or to employ those techniques in combination for treating the surface of the aluminum foil (FIG. 3).

It is preferable to remove oxides and oils from the surface of the aluminum foil by cleaning the surface of the aluminum foil with an acid solution and an alkali solution. Suitable acids for cleaning are inorganic acids including sulfuric acid, hydrochloric acid, nitric acid, phosphoric acid, hydrofluoric acid and chromic acid, and organic acids including sulfamine acid, oxalic acid, tartaric acid, citric acid, formic acid, lactic acid, glycolic acid, acetic acid, gluconic acid, succinic acid and malic acid. A cleaning liquid can be prepared by mixing one of those acids as a principal component and suitable additives. Suitable alkalis for cleaning are hydroxides including sodium hydroxide, carbonates including sodium carbonate and sodium bicarbonate, phosphates including sodium secondary phosphate and sodium tertiary phosphate, polyphosphates including sodium pyrophosphate, sodium tripolyphosphate and sodium tetra polyphosphate, and silicates including sodium orthosilicate and sodium metasilicate. Although sodium salts are enumerated above, potassium salts and ammonium salts can be also used. An alkali cleaning liquid can be prepared by mixing one of those alkalis and suitable additives.

Materials suitable for forming the acid-resistant film TR to be formed over the surface of the aluminum foil are phosphates including zinc phosphate, iron phosphate, manganese phosphate, calcium phosphate, chromium phosphate, titanium phosphate, tin phosphate and silica phosphate, chromates including chromium chromate and silica chromate, and fluorides including titanium fluoride and zinc fluoride.

An adhesive property improving process (herein after referred to as "coupling property improving process") includes a coupling property improving treatment that treats the surface of the aluminum foil with a coupling agent and/or a surface roughening treatment. Possible materials for the coupling property improving treatment are silane coupling agents, organic titanium coupling agents and organic aluminum coupling agents.

Organic titanium coupling agents include tetraalkoxy titanium, titanium acylate, titanium chelate or the like. The organic aluminum coupling agents include trialkoxy aluminum, aluminum chelate, aluminum acylate or the like.

Roughening of the surface of the aluminum foil is an effective adhesive property improving process. The surface of the aluminum foil is etched and cleaned with an acid solution or an alkali solution to improve the adhesive property of the surface of the aluminum foil by removing aluminum oxide ($Al_2O_3$) film formed on the surface of the aluminum foil, roughening the surface of the aluminum foil, increasing the surface are a of the aluminum foil and providing the surface with an anchoring effect.

The surface of the barrier layer 12 on the side of the innermost layer 14 may be subjected to an anodizing process and a subsequent sealing process using a sulfuric acid solution, an oxalic acid solution, chromic acid solution or a phosphoric acid solution to improve the acid resistance of the barrier layer 12.

The acid resistance and organic solvent resistance of the surface of the barrier layer 12 on the side of the innermost layer 14 can be further improved by adding silicon dioxide, calcium carbonate, zinc, minium, lead suboxide, zinc oxide lead cyanamide, zinc chromate, barium potassium chromate or barium zinc chromate to the surface of the barrier layer 12 on the side of the innermost layer 14, the acid-resistant film TR or interior of the barrier layer 12.

Silicon dioxide, calcium carbonate, zinc chromate, barium potassium chromate and barium zinc chromate are capable of reacting with hydrogen fluoride (HF) produced by the interaction of an electrolyte and moisture to absorb and adsorb hydrogen fluoride and of preventing the corrosion of the barrier layer (aluminum foil) by hydrogen fluoride.

A process of forming the acid-resistant film on the surface of the barrier layer 12 on the side of the innermost layer 14, an adhesive property improving process and a process of forming a layer for absorbing and adsorbing corrosive substances will be described herein after. These processes may be individually used or may be used in combination.

After decreasing the surface of the barrier layer 12 on the side of the innermost layer 14 or removing an oxide formed on the same surface, a film containing at least one of silicon dioxide, calcium carbonate, zinc, minium, lead suboxide, zinc oxide lead cyanamide, zinc chromate, barium potassium chromate or barium zinc chromate (herein after referred to as "corrosive substance absorbing film") may be formed over the surface.

After degreasing the surface of the barrier layer 12 on the side of the innermost layer 14 or removing an oxide formed on the same surface, the acid-resistant film may be formed over the same surface and the corrosive substance absorbing film may be formed over the acid-resistant film.

After degreasing the surface of the barrier layer 12 on the side of the innermost layer 14 or removing an oxide formed on the same surface, the acid-resistant film may be formed on the same surface and at least one of silicon dioxide, calcium carbonate, zinc, minium, lead suboxide, zinc oxide lead cyanamide, zinc chromate, barium potassium chromate and barium zinc chromate may be added to the acid-resistant film.

An acid-resistant film may be formed on the surface of the barrier layer 12 on the side of the innermost layer 14 and a corrosive substance absorbing film may be formed over the acid-resistant film.

An acid-resistant film may be formed on the surface of the barrier layer 12 on the side of the innermost layer 14 and at least one of silicon dioxide, calcium carbonate, zinc, minium, lead suboxide, zinc oxide lead cyanamide, zinc chromate, barium potassium chromate and barium zinc chromate may be added to the acid-resistant film.

A film containing at least one of a silane coupling substance, an organic titanium coupling substance and an organic aluminum coupling substance, and at least one of silicon dioxide, calcium carbonate, zinc, minium, lead suboxide, zinc oxide lead cyanamide, zinc chromate, barium potassium chromate and barium zinc chromate may be formed on the surface of the barrier layer 12 on the side of the innermost layer 14.

An acid-resistant film may be formed on the surface of the barrier layer 12 on the side of the innermost layer 14, and a film containing at least one of a silane coupling substance, an organic titanium coupling substance and an organic aluminum coupling substance, and at least one of silicon dioxide, calcium carbonate, zinc, minium, lead suboxide, zinc oxide lead cyanamide, zinc chromate, barium potassium chromate and barium zinc chromate may be formed over the acid-resistant film.

An acid-resistant film may be formed on the surface of the barrier layer 12 on the side of the innermost layer 14, and at least one of a silane coupling substance, an organic titanium coupling substance and an organic aluminum coupling substance, and at least one of silicon dioxide, calcium carbonate, zinc, minium, lead suboxide, zinc oxide lead cyanamide, zinc chromate, barium potassium chromate and barium zinc chromate may be added to the acid-resistant film.

After degreasing the surface of the barrier layer 12 on the side of the innermost layer 14 or removing an oxide formed on the surface, a corrosive substance absorbing film may be formed and an acid-resistant film may be formed over the corrosive substance absorbing film.

After degreasing the surface of the barrier layer 12 on the side of the innermost layer 14 or removing an oxide formed on the surface, an acid-resistant film may be formed on the same surface and a corrosive substance absorbing film may be formed over the acid-resistant film.

After degreasing the surface of the barrier layer 12 on the side of the innermost layer 14 or removing an oxide formed on the surface, an acid-resistant film may be formed on the same surface and at least one of silicon dioxide, calcium carbonate, zinc, minium, lead suboxide, zinc oxide lead cyanamide, zinc chromate, barium potassium chromate and barium zinc chromate may be added to the acid-resistant film.

After degreasing the surface of the barrier layer 12 on the side of the innermost layer 14 or removing an oxide formed on the surface, a coupling film of the coupling substance may be formed on the same surface and a corrosive substance absorbing film may be formed over the coupling film.

After degreasing the surface of the barrier layer 12 on the side of the innermost layer 14 or removing an oxide formed on the surface, an acid-resistant film may be formed on the same surface, a coupling film of a coupling substance may be formed over the acid-resistant film and a corrosive substance absorbing film may be formed over the coupling film.

After degreasing the surface of the barrier layer 12 on the side of the innermost layer 14 or removing an oxide formed on the surface, an acid-resistant film may be formed on the same surface and a corrosive substance absorbing film may be formed over the acid-resistant film.

An acid-resistant film may be formed on the surface of the barrier layer 12 on the side of the innermost layer 14, and a film containing at least one of a silane coupling substance, an organic titanium coupling substance and an organic aluminum coupling substance, and at least one of silicon dioxide, calcium carbonate, zinc, minium, lead suboxide, zinc oxide lead cyanamide, zinc chromate, barium potassium chromate and barium zinc chromate may be formed over the acid-resistant film.

An acid-resistant film may be formed on the surface of the barrier layer 12 on the side of the innermost layer 14, at least one of a silane coupling substance, an organic titanium coupling substance and an organic aluminum coupling substance may be added to the acid-resistant film, and a film containing at least one of silicon dioxide, calcium carbonate, zinc, minium, lead suboxide, zinc oxide lead cyanamide, zinc chromate, barium potassium chromate and barium zinc chromate may be formed over the acid-resistant film.

After degreasing the surface of the barrier layer 12 on the side of the innermost layer 14 or removing an oxide formed on the surface, an acid-resistant film may be formed on the same surface, and a film containing at least one of a silane coupling substance, an organic titanium coupling substance and an organic aluminum coupling substance, and at least one of silicon dioxide, calcium carbonate, zinc, minium, lead suboxide, zinc oxide lead cyanamide, zinc chromate, barium potassium chromate and barium zinc chromate may be formed over the acid-resistant film.

After degreasing the surface of the barrier layer 12 on the side of the innermost layer 14 or removing an oxide formed on the surface, and a film including at least one of a phosphate film, a chromate film, a fluoride film and a triazinethiol compound film and containing at least one of silicon dioxide, calcium carbonate, zinc, minium, lead suboxide, zinc oxide lead cyanamide, zinc chromate, barium potassium chromate and barium zinc chromate may be formed on the same surface.

The protective layer 15 is a resin film to prevent the corrosion of the barrier layer 12 and the deterioration of adhesive property by a solvent. The protective layer 15 is formed so as to cover the surface of the barrier layer 12 on the side of the innermost layer 14. The protective layer 15 may contain the acid resistance modifier and/or the coupling agent. Possible resins for forming the protective layer 15 are epoxy resins, phenolic resins, melamine resins, alkyd resins, polyimide resins, unsaturated polyester resins, polyurethane resins, unsaturated carboxylic acid graft polyolefin resins, copolyester resins including polyester terephthalate copolymers and polybutylene terephthalate copolymers, metal ion crosslinked polyethylene resins, ethylene-vinyl acetate copolymers, ethylene-acrylate copolymers, ethylene-methacrylate copolymers, poly(ether urethane) resins and resins containing 30% or above of at least one of derivatives of the above resins.

The protective layer 15 may contain a film forming phosphate (zinc phosphate, iron phosphate, manganese phosphate, calcium phosphate, chromium phosphate, silica phosphate), a film forming fluoride (titanium fluoride, zinc fluoride), an adhesive property improving substance for improving the adhesive property of the surface of an aluminum foil, i.e., a coupling agent, such as a silane coupling agent, an organic titanium coupling agent or an organic aluminum coupling agent.

Addition of silicon dioxide, calcium carbonate, zinc, minium, lead suboxide, zinc oxide lead cyanamide, zinc chromate, barium potassium chromate or barium zinc chromate to the protective layer 15 is effective in further enhancing the chemical resistance and solvent resistance of the protective layer 15. Silicon dioxide, calcium carbonate, zinc, minium, lead suboxide, zinc oxide lead cyanamide, zinc chromate, barium potassium chromate and barium zinc chromate are capable of reacting with hydrogen fluoride (HF) produced by the interaction of an electrolyte and moisture to absorb and adsorb hydrogen fluoride and are effective in preventing the corrosion of the layers, particularly, the corrosion of the barrier layer (aluminum foil) by hydrogen fluoride.

The foregoing surface treatment processes may be used in combination to treat the surface of the barrier layer 12 on the side of the innermost layer 14 of the laminated structure 10 according to the present invention. The following are examples of possible combinations.

(1) Al foil/surface roughening/acid-resistant film formation (2) Al foil/surface roughening/coupling property improving treatment (3) Al foil/surface roughening/protective layer formation (4) Al foil/acid resistance modifying film formation/protective layer formation (5) Al foil/acid-resistant film formation/coupling property improving treatment (6) Al foil/surface roughening/acid-resistant film formation/protective layer formation (7) Al foil/surface roughening/acid-resistant film formation/coupling property improving treatment According to the present invention, a second protective layer 15a of a resin, such as an epoxy resin, a phenolic resin, a melamine resin, an olefin resin or an unsaturated carboxylic acid graft polyolefin resin, not containing the acid resistance modifying agent and/or the coupling property improving agent may be formed in addition to the resin layer containing the acid resistance modifying agent and/or the coupling property improving agent.

The following are examples of manners in which the second protective layer 15a are formed.

(1) Al foil/acid resistance modifying film formation/second protective layer formation (2) Al foil/coupling property improving treatment/second protective layer formation (3) Al foil/surface roughening/second protective layer formation (4) Al foil/surface roughening/protective layer formation/second protective layer formation (5) Al foil/surface roughening/acid-resistant film formation/second protective layer formation (6) Al foil/surface roughening/coupling property improving treatment/second protective layer formation (7) Al foil/acid resistance modifying film formation/protective layer formation/second protective layer formation (8) Al foil/acid-resistant film formation/coupling property improving treatment/second protective layer formation (9) Al foil/surface roughening/acid resistance modifying film formation/protective layer formation/second protective layer formation

(10) Al foil/surface roughening/acid-resistant film formation/coupling property improving treatment/second protective layer formation The acid-resistant film formed on the surface of the barrier layer 12 on the side of the innermost layer 14, the protective layer, the coupling property improving layer and the second protective layer may contain one or some of phosphate film forming substances (zinc phosphate, iron phosphate, manganese phosphate, calcium phosphate and chromium phosphate), chromate film forming substances (chromium chromate and silica chromate), fluoride film forming substances (titanium fluoride and zinc fluoride) and adhesive property improving substances (coupling agents: silane coupling agent, organic titanium coupling agent and organic aluminum coupling agent). Addition of silicon dioxide, calcium carbonate, zinc, minium, lead suboxide, zinc oxide lead cyanamide, zinc chromate, barium potassium chromate or barium zinc chromate to the layer is effective in further enhancing the chemical resistance and solvent resistance of the layer. Silicon dioxide, calcium carbonate, zinc, minium, lead suboxide, zinc oxide lead cyanamide, zinc chromate, barium potassium chromate and barium zinc chromate are capable of reacting with hydrogen fluoride (HF) produced by the interaction of an electrolyte and moisture to absorb and adsorb hydrogen fluoride and are effective in preventing the corrosion of the layers, particularly, the corrosion of the barrier layer (aluminum foil) by hydrogen fluoride.

According to the present invention, an intermediate layer 13 may be sandwiched between the barrier layer 12 and the innermost layer 14 or between the protective layer 15 and the innermost layer 14. The intermediate layer 13 protects the barrier layer 12 and prevents contact (short circuit) between the terminals 3 and the aluminum barrier layer 12 due to the thinning of the innermost layer 14, i.e., a heat-adhesive layer, by heat and pressure applied thereto in a heat-sealing process for forming a pouch. The intermediate layer 13 is added to stabilize the environmental suitability (heat resistance and cold resistance) of the lithium battery. Preferably, the intermediate layer 13 includes at least one layer of a thickness in the range of 12 to 25 µm formed of a resin having a melting point of 80° C. or above, such as a polyester resin, a polyolefin resin, a fluorocarbon resin, a derivative of one of those resins or a resin produced by mixing those resins.

Possible polyester resins are polyethylene terephthalate resins, polybutylene terephthalate resins, polyethylene naphthalate resins, polybutylene naphthalate resins, polycarbonate resins, copolymers of some of those resins and derivatives of those resins.

Possible polyolefin resins are polypropylene resins, ethylene-propylene copolymers, low-density polyethylene resins, medium-density polyethylene resins, high-density polyethylene resins, linear low-density polyethylene resins, ethylene-α-olefin copolymers produced by polymerization using a single-site catalyst, polyethylene resins containing metal ions, ethylene-methacrylic acid derivative and ethylene-acrylic acid derivative copolymers, polybutene resins, unsaturated carboxylic acid graft polyethylene resins, unsaturated carboxylic acid graft polypropylene resins, unsaturated carboxylic acid graft poly(methyl pentene) resins and derivatives of those resins.

Possible fluorocarbon resins are tetrafluoroethylene resins, trifluoroethylene resins, polyvinylidene fluoride resins, polyvinyl fluoride resins, ethylene tetrafluoroethylene copolymers, ethylene-chlorofluoroethylene copolymers and tetrafluoroethylene-hexafluoropropylene copolymers. Either oriented or unoriented films of those resins may be used.

The intermediate layer 13 may be of single-layer construction or of multilayer construction. For example, the intermediate layer 13 may consists of a first intermediate layer 13a and a second intermediate layer 13b. The intermediate layer 13 of multilayer construction may be formed by coextrusion, dry lamination or extrusion lamination. For example, when forming the intermediate layer 13 by coextrusion, the intermediate layer 13 consists of two or more sublayers and each sublayer has a thickness in the range of 10 to 100 µm, preferably, in the range of 15 to 25 µm.

The laminated structure for packaging a lithium battery module has an innermost layer 14. The innermost layers 14 of the laminated structures can be bonded together by heat-sealing. As shown in FIG. 4(e), the innermost layer 14 can be bonded to the metal terminals 3 by heat-sealing. Experiments showed that the innermost layer 14 formed from a film having a thickness of 10 µm or above, preferably in the range of 50 to 100 µm and formed of a material having a melting point of 80° C. or above and a Vicat softening point of 70° C. is satisfactory. The innermost layer contains at least one of unsaturated carboxylic acid graft polyolefin resins including unsaturated carboxylic acid graft polyethylene resins, unsaturated carboxylic acid graft polypropylene resins and unsaturated carboxylic acid graft poly(methyl pentene) resins, metal ion cross linked polyethylene resins, ethylene-acrylic acid derivative copolymers, propylene-acrylic acid derivative copolymers, ethylene-methacrylic acid derivative copolymers, propylene-methacrylic acid derivative copolymers, derivatives of those polymers.

The innermost layer 14 may be formed of a polyolefin resin 14' that cannot be bonded to metals. When the innermost layer 14 is formed of the polyolefin resin 14', the terminals 3 are coated with heat-adhesive tabs 16 of 15 µm or above in thickness formed of an unsaturated graft polyolefin, a metal ion crosslinked polyethylene, an ethylene-acrylic acid derivative copolymer, a propylene-acrylic acid derivative copolymer, an ethylene-methacrylic acid derivative copolymer or a propylene-methacrylic acid derivative copolymer. The tabs 16 and the package can be perfectly bonded together to seal the package. More concretely, portions of the terminals 3 of a lithium battery module 2 to be packaged in a battery package are sandwiched between heat-adhesive tabs 16 of a width greater than that of the terminals 3 as shown in FIG. 4(b), the lithium battery module 2 is put in the battery package, and the battery package is sealed. FIG. 4(d) is a typical sectional view taken on line $X_4$-$X_4$ in FIG. 4(a). In FIG. 4(d), the outermost layer 11, the barrier layer 12, and the intermediate layer 13 are represented by a single layer. FIG. 4(c) shows a lithium battery module 2 provided with terminals 3 having portions wrapped in heat-adhesive tabs 16 to be covered with the battery package. The lithium battery module 2 is sealed in a battery package. FIG. 4(e) is a typical sectional view taken on line $X_4$-$X_4$ in FIG. 4(a) when the lithium battery module 2 shown in FIG. 4(c) is sealed in the battery package.

The innermost layer 14 may be a single-layer structure consisting of a single film of the foregoing possible resin or a multilayer structure consisting of two or more films of the foregoing possible resins.

The unsaturated carboxylic acid graft polyolefin resins are satisfactory in adhesion to the terminals 3, heat resistance, cold resistance and workability (ease of fabricating pouches or forming). When the thickness of the innermost layer 14 is less than 20 μm, gaps are formed between the battery package and the terminals 3 and the battery package loses the barrier property. The adhesive strength between heat-sealed innermost layers 14 does not increase even if the thickness of the innermost layers is increased beyond 100 μm and the thickness of the laminated structure increases and a package formed from the laminated structure needs an increased space for installation if the thickness of the innermost layer 14 is increased.

Innermost layers 14 of a material having an excessively low melting point and an excessively low Vicat softening point are not heat-resistant and not cold-resistant, adhesive strength between the innermost layers 14 and the terminals 3 are low and the package may be broken. Although the foregoing unsaturated graft polymers may be individually used, a material produced by blending some of those unsaturated graft polymers have satisfactory properties.

To improve and stabilize the film forming property, laminating property and secondary processing property (forming and bonding) of the component layers of the laminated structure 10 according to the present invention, the component layers may be subjected to a surface activating process, such as a corona discharge process, a blasting process, an oxidizing process or an ozonation process.

The outermost layer 11, the barrier layer 12, the intermediate layer 13 and the innermost layer 14 of the laminated structure 10 according to the present invention may be formed and laminated by a T-die extrusion process, a tubular film extrusion process or a coextrusion process. When necessary, a secondary film may be formed by a coating process, an evaporation process, an ultraviolet curing process or an electron beam curing process.

The adjacent layers may be bonded together by a dry lamination process, an extrusion coating process, a coextrusion lamination process or a thermal lamination process.

Possible adhesives for dry lamination are polyester adhesives, polyethylene-imine adhesives, polyether adhesives, cyanoacrylate adhesives, urethane adhesives, organic titanium compound adhesives, polyether-urethane adhesives, epoxy adhesives, polyester-urethane adhesives, imide adhesives, isocyanate adhesives, polyolefin adhesives and silicone adhesives. At least one of silicon dioxide, calcium carbonate, zinc, minium, zinc suboxide, zinc oxide, lead cyanamide, zinc chromate, barium potassium chromate and barium zinc chromate may be added to the adhesive for dry lamination for the further improvement of chemical resistance and organic solvent resistance. Silicon dioxide, calcium carbonate, zinc, minium, zinc suboxide, zinc oxide, lead cyanamide, zinc chromate, barium potassium chromate and barium zinc chromate are capable of reacting with hydrogen fluoride (HF) produced by the interaction of an electrolyte and moisture to absorb and adsorb the hydrogen fluoride and of preventing the corrosion of the layers, particularly the barrier layer (aluminum foil) by hydrogen fluoride.

An adhesive film having a thickness of about 1 μm and formed of one of polyester adhesives, polyethylene-imine adhesives, polyether adhesives, cyanoacrylate adhesives, urethane adhesives, organic titanium compound adhesives, polyether-urethane adhesives, epoxy adhesives, polyester-urethane adhesives, imide adhesives, isocyanate adhesives, polyolefin adhesives, silicone adhesives, derivatives of those adhesives and mixtures of some of those adhesives may be used when laminating the adjacent layers by extrusion lamination to stabilize the adhesive strength between the layers or the layers may be subjected to an ozonation process for surface activation.

An unsaturated carboxylic acid graft polyolefin resin used for coextrusion lamination or thermal lamination improves adhesive property and resistance to the adverse effect of the package filler.

EXAMPLES

Examples of the foregoing laminated structures according to the present invention for forming pouches and embossed cases will be described herein after.

The examples used the following adhesives and dry lamination films having the following components.

Film sandwiched between the outermost layer and the barrier layer for dry lamination: Takerakku A969V/A-5 (Takeda Yakuhin Kogyo K.K.) Adhesive containing polyether resin as a principal component Film sandwiched between the barrier layer and the intermediate layer for dry lamination: A polyester polyurethane resin as a principal component containing a carboxylic acid, such as sebacic acid, isophthalic acid or terephthalic acid, a glycol, such as ethylene glycol or hexadiol, isocyanate (IPDI) and an epoxy resin containing bisphenol A, and an accelerator, such as trimethylolpropane, a glycol, such as propylene glycol, dipropylene glycol, glycerin or 1,3-butanediol, isocyanate (TDI) or TDA.

The following symbols (acronyms, initial words and abbreviations) are used in the following description.

Surface Treatment of Barrier Layer

Tr-w: Degreasing or oxide removal (55° C., degreasing in NaOH solution for 1 min, pickling using 35% nitric acid solution)

Tr-Cou: Coupling property improvement

Tr-Ac: Phosphate treatment

Tr-POa: Coating with unsaturated graft polyolefin and baking

Tr-Co-PAc-cr: Treatment with a chromium phosphate solution containing calcium carbonate Symbols specified in the description of the first embodiment will be used to represent laminated structures.

Example 1

A 20 μm thick aluminum foil was decreased and oxides formed thereon was removed. A 12 μm thick biaxially oriented polyester film was bonded to the aluminum foil by dry lamination using an adhesive film DL-1 to form a laminate A. A 12 μm thick biaxially oriented polyester film and a 50 μm thick unsaturated carboxylic acid graft polypropylene film were laminated sequentially to the aluminum foil of the laminate A by dry lamination using an adhesive film DL-2 to obtain a laminated structure (1).

Laminated Structures for Forming Pouches

Laminated Structure (1)

PET12/DL-1/AL20/Tr-W/DL-2/PET12/DL-2/PPA50

Example 2

A 20 μm thick aluminum foil was decreased and oxides formed thereon was removed, the aluminum foil was subjected to a phosphate treatment to form an acid-resistant film on the aluminum foil, and a coupling property improving film was formed on the acid-resistant film. A 12 μm thick biaxially oriented polyester film was laminated to the surface of the aluminum foil coated with the coupling property improving film with an adhesive film DL-1 to form a laminate A. A 20 μm thick unsaturated carboxylic acid graft polypropylene film, a 12 μm thick biaxially oriented polyester film and a 50 μm thick unsaturated carboxylic acid graft polypropylene film were laminated by dry lamination using adhesive films DL-1 to obtain a laminate B. The 20 μm thick unsaturated carboxylic acid graft polypropylene film of the laminate B was bonded to the aluminum foil of the laminate A by a thermal lamination process to obtain a laminated structure (2). Conditions for the thermal lamination process were temperature: 220° C., pressure: 0.3 MPa and line speed: 20 m/min.

Laminated Structure (2)

PET12/DL-1/AL20/Tr-Ac/Tr-Cou/TL/PPA20/DL-2/PET12/DL-2/PPA50

Example 3

A 20 μm thick aluminum foil was decreased, oxides formed there on was removed and the aluminum foil was subjected to a chromate treatment to form an acid-resistant film on the aluminum foil. A 12 μm thick biaxially oriented polyester film was laminated to a surface of the aluminum foil by dry lamination using an adhesive film DL-1 to form a laminate A. A protective layer of an epoxy resin was formed on the other surface of the aluminum foil. A coextruded film of a random polypropylene film and a homopolypropylene film was formed by coextrusion, and the random polypropylene film of the coextruded film was bonded to the protective layer of the laminate A by dry lamination using an adhesive film DL-2 to obtain a laminated structure (3).

Laminated Structure (3)

PET12/DL-1/AL20/Tr-Cr/P-EP/DL-2/PR5/PH25

Laminated Structures for Forming Embossed Packages

Example 4

A 50 μm thick aluminum foil was decreased, oxides formed thereon was removed, unsaturated graft polyolefin coatings are formed on the opposite surfaces of the aluminum foil and the unsaturated graft polyolefin coatings are baked. A 12 μm thick biaxially oriented polyester film was laminated to one of the surfaces of the aluminum foil and a 52 μm thick biaxially oriented polyester film was laminated to the 12 μm thick biaxially oriented polyester film by dry lamination using adhesive films DL-1 to obtain a laminate A. A 16 μm thick polyester film was laminated to the other surface of the aluminum foil of the laminate A and a 50 μm thick unsaturated carboxylic acid graft polyethylene film was laminated to the 16 μm thick polyester film by dry lamination using adhesive layers DL-2 to obtain a laminated structure (4).

Laminated Structure (4)

PET12/DL-1/NY15/DL-1/AL20/Tr-POa/DL-2/PET16/DL-2/PEA50

Example 5

A 50 μm thick aluminum foil was decreased and oxides formed thereon was removed, the aluminum foil was subjected to a phosphate treatment to form an acid-resistant film on the aluminum foil. A 5 μm thick unsaturated carboxylic acid graft polyethylene film was formed on the surface of the acid-resistant film formed on one of the surfaces of the aluminum foil by a coating method. A 15 μm thick biaxially oriented nylon film was laminated to the other surface of the aluminum foil and a 12 μm thick biaxially oriented polyester film was laminated to the 15 μl thick biaxially oriented nylon film by dry lamination using adhesive films DL-1 to obtain a laminate A. A 16 μm thick biaxially oriented copolyester film and a 50 μm thick unsaturated carboxylic acid graft polyethylene film were laminated by dry lamination using an adhesive film DL-2 to obtain a laminate B. The surface of the aluminum foil of the laminated A and the 16 μm thick biaxially oriented copolyester film of the laminate B were bonded together by an extrusion coating method (EC method) using a 20 μm thick polyethylene film to obtain a laminated structure (5)

Laminated Structure (5)

PET12/DL-1/NY15/DL-1/AL50/Tr-Ac/PEA5/PE20/PET16/DL-2/PEA50

Example 6

A 50 μm thick aluminum foil was decreased and oxides formed thereon was removed, the aluminum foil was subjected to a surface treatment using a chromium phosphate containing calcium carbonate to form an acid-resistant film on the aluminum foil. A 12 μm thick biaxially oriented polyester film was laminated to one of the surfaces of the aluminum foil and a 15 μm thick biaxially oriented NY film was laminated to the 12 μm thick biaxially oriented polyester film by dry lamination using adhesive films DL-1 to obtain a laminate A. A coextruded film of a random polypropylene film and a homopolypropylene film was formed by coextrusion. The random polypropylene film of the coextruded film was bonded to the aluminum foil of the laminate A by dry lamination using an adhesive layer DL-2 to obtain a laminated structure (6).

Laminated Structure (6)

PET12/DL-1/NY15/DL-1/AL50/Tr-Co-PAc-cr/DL-2/PR5//PH 25

Lithium battery packages were fabricated from the laminated structures (1) to (6) and lithium battery modules were sealed in the lithium battery packages to obtain sample lithium batteries. The sample lithium batteries were subjected to tests. The laminated structures met requirements for lithium battery packages satisfactorily.

The laminated structures of the present invention and the lithium battery packages formed from those laminated structures were effective in preventing the corrosion of the surface of the barrier layer on the side of the innermost layer and the delamination of the laminated structure by hydrofluoric acid. The lithium battery packages were excellent in barrier property, capable of maintaining satisfactory barrier property for a long time and excellent in heat resistance, cold resistance, resistance to the adverse effect of the package filler and the like.

Fourth Embodiment

A fourth embodiment of the present invention will be described herein after. The fourth embodiment is substantially the same as the second embodiment illustrated in FIGS. 7 to 9, except that laminated structures in the fourth embodiment are different from those in the second embodiment only in construction. Therefore, the fourth embodiment will be described with reference to FIGS. 7 to 9, in which parts like or corresponding to those of the second embodiment are denoted by the same reference characters and the description thereof will be omitted.

Referring to FIGS. 7(a) to 7(e), a barrier layer 12 inhibits the penetration of moisture into a lithium battery 1. To avoid the adverse effect of pinholes that may be formed in the barrier layer 12, to stabilize the workability (ease of fabricating pouches or forming) and to provide the barrier layer 12 with pinhole resistance, the barrier layer 12 is formed from a foil of a metal, such as aluminum or nickel, or a film of an inorganic compound, such as silicon dioxide or alumina. Preferably, the barrier layer 12 is a soft aluminum foil having a thickness in the range of 20 to 80 µm.

The inventors of the present invention made studies to inhibit the formation of pinholes more effectively and to inhibit the formation of cracks in an embossed part of a embossed case for a lithium battery and found that an aluminum foil for forming the barrier layer 12 having an iron content in the range of 0.3 to 9.0% is superior in ductility to an aluminum foil not containing iron, and a laminated structure provided with a barrier layer of such an aluminum foil is less subject to pinhole formation when bent and can be easily embossed to form a container having side walls. An aluminum foil having an iron content less than 0.3% has no effect on inhibiting pinhole formation and improving formability. An aluminum foil having an iron content exceeding 9.0% is stiff and deteriorates the workability of the laminated structure when making pouches.

Aluminum foils as a packaging laminated structure having a barrier property are used for forming a laminated film in combination with films of other materials. Aluminum, as compared with other metals, is relatively susceptible to the corrosive action of organic solvents, acids and alkalis. The active materials and polyelectrolytes of most lithium battery modules contain an organic solvent, such as ethylene carbonate, propylene carbonate, diethyl carbonate, dimethyl carbonate or acetone. Hydrogen fluoride (HF), a strong acid, is produced by the interaction of water and a lithium salt contained in the polyelectrolyte. When the surface of an aluminum foil is corroded by such organic solvents and acids, adhesive strength between the aluminum foil and an innermost layer or an intermediate layer decreases and the laminated packaging laminated structure is delaminated and the functions of the packaging laminated structure are lost.

The inventors of the present invention have found that the corrosion of the surface of an aluminum foil can be prevented by coating the aluminum foil with an acid-resistant, solvent-resistant resin layer (herein after referred to as "protective layer 15") as shown in FIG. 7(b). It was also found that the protective layer 15 unexpectedly is adhesive to the intermediate layer 13 as well as effective in protecting the surface of the aluminum foil.

According to the present invention, suitable materials for forming the protective layer 15 coating the aluminum foil are resins containing 30% or above of at least one of epoxy resins (EP), phenolic resins (FN), melamine resins (MR), alkyd resins (AK), polyimide resins (PI), Unsaturated polyesters (U-PET), polyurethane resins (PU), unsaturated carboxylic acid graft polyolefin resins (POa), copolyester resins (CPET), such as polyethylene terephthalate copolymers and polybutylene terephthalate copolymers, ionomers (Io), ethylene-vinyl acetate copolymers (EVA), copolymers of ethylene and acrylic acid and those of ethylene and methacrylic acid (FMA), polyether-urethane resins (PeU), and derivatives of those resins.

An example of a lithium battery packaging laminated structure has the following construction.

PET12/D$_5$/AL20/H/D$_5$/PP100 where D$_5$ stands for a dry lamination film of a polyester-urethane adhesive, H stands for a protective layer and PP stands for polypropylene film.

The protective layer H formed on a surface of the aluminum foil AL may be a single layer, a laminated layer consisting of a multiple sublayers or a layer of a blended material.

Possible materials for forming a single-layer protective layer 15 are EP resins, FN resins, MR resins, PI resins, AK resins, UPET resins U-PET RESINS, PU resins, PEU resins, PeU resins and POa resins.

The following are possible multilayer protective layers.

EMA/EC/EMA, Io/EC/Io, EVA/EC/EVA, POa/TL, EP/POa/EC, EP/EAM/EC/EMA, PI/CPET, U-PET/Io, PU/EVA/EC/EVA and POa/EP/POa/EC The following are possible blended resins for forming the protective layer 15.

EP+FN, EP+CPET, EP+POa/TL, EP+MR+CPET, PU+CPET and EP+MR+FN.

The following are multi layer protective layers 15 including a sublayer of a blended resin.

EP+MR/POa/TL, EP+CPET/EAM/EC, EP+CPET/EAM, EP+CPET/POa/EC and EP+FN/PU+CPET.

The protective layer 15 may be formed of any one of the following blends each prepared by blending some of the foregoing resins and an adhesive for laminating the component layers.

EP+PEU, EP+PaU, EP+MR+PEU and POa+PEU

A coupling layer 27 of a silane coupler as a primer may be formed between the barrier layer 12 and the protective layer 15 as shown in FIG. 7(b).

The protective layer 15 may be formed on the barrier layer 12 by a roll coating method, such as a gravure coating method, a reverse gravure coating method, a blade coating method or a kiss-roll coating method. A film that serves as the protective layer 15 may be extruded through a T-die on the surface of the barrier layer 12 for extrusion coating. A film that serves as the protective layer may be formed by a tubular film extrusion process, a T-die extrusion process or a coextrusion process, and the film may be laminated to the barrier layer 12 by heat bonding. When forming the protective layer 15 by a roll coating method ultraviolet curing or electron beam curing may be used. When necessary, the protective layer 15 may be baked at a temperature in the range of 150 to 250° C. A laminated structure formed by laminating the component layers may be cured to enhance interlayer adhesive strength.

The protective layer 15 may be formed by forming a coat of a thickness in the range of 0.5 to 10 μm, preferably, in the range of 1 to 30 μm of a resin containing 30% or above of at least one of epoxy resins, polyimide resins, unsaturated polyester resins, alkyd resins, phenolic resins, thermosetting acrylic resins, polyamide resins, fluorocarbon resins, unsaturated carboxylic acid graft polyolefin resins, polyethylene terephthalate copolymers, polybutylene terephthalate polymers, polyester-ethylene vinyl acetate copolymers, polyester-polystyrene copolymers, ionomers, copolymers of ethylene and an acrylic acid derivatives, and copolymers of ethylene and methacrylic acid derivatives on a surface of the barrier layer 12 on the side of the innermost layer 14, and curing the coat at 200° C. for 10 s or longer.

The protective layer 15 and the intermediate layer 13, or the protective layer 15 and the innermost layer 14 may be bonded together by dry lamination using a dry lamination layer 26. The dry lamination layer 26 may be a film having a thickness in the range of 1 to 10 μm and formed of a polyether-urethane resin, a polyester-urethane resin, an isocyanate resin, a polyolefin resin, a polyethylene-imine resin, a cyano acylate resin, an organotitanium compound, an epoxy resin, an imide resin or a silicone resin.

The protective layer 15 and the intermediate layer 13, or the protective layer 15 and the innermost layer 14 may be bonded together by thermal lamination using a resin layer having a thickness in the range of 1 to 50 μm, a melting point of 80° C. or above and a Vicat softening point of 70° C. or above, and containing unsaturated carboxylic acid graft polypropylene or unsaturated carboxylic acid graft poly(methyl pentene). Adhesive strength between the barrier layer 12 and the intermediate layer 13, more precisely, between the protective layer 15 and the intermediate layer 13, is enhanced, the heat resistance and cold resistance of the laminated structure are improved and the delamination of the laminated structure in a secondary process can be prevented.

The adhesive strength between the barrier layer 12 and the protective layer 15 can be enhanced by forming a silane coupler layer between the barrier layer 12 and the protective layer 15.

According to the present invention, an intermediate layer 13 may be sandwiched between the barrier layer 12 and the innermost layer 14. The intermediate layer 13 protects the barrier layer 12 and prevents contact between the terminals of a battery module and the barrier layer 12 of aluminum due to the thinning of the innermost layer 14, i.e., a heat-adhesive layer, by heat and pressure applied thereto in a heat-sealing process for forming a pouch. The intermediate layer 13 stabilizes the environmental capabilities (heat resistance and cold resistance) of the battery. The intermediate layer 13 has a thickness of 10 μm or above and a melting point of 80° C. or above. Preferably, the intermediate layer 13 includes at least one film of a polyester resin, a polyolefin resin, a fluorocarbon resin. a derivative of one of those resins or a blended resin of some of those resins. The polyester resin for forming the intermediate layer 13 is polyethylene terephthalate, polybutylene terephthalate, polyethylene naphthalate, polybutylene naphthalate, polycarbonate, a copolymer of some of those polymers or a derivative of one of those polymers. The polyolefin resin for forming the intermediate layer 13 is polypropylene, an ethylene-propylene copolymer, low-density polyethylene, medium-density polyethylene, high-density polyethylene, linear low-density polyethylene, an ethylene-α-olefin copolymer produced through polymerization using a single-site catalyst, polyethylene containing metal ions, a copolymer of ethylene and a methacrylic acid derivative, a copolymer of ethylene and an acrylic acid derivative, polybutene, unsaturated carboxylic acid graft poly(methyl pentene) or a derivative of one of those polymers. The fluorocarbon resin for forming the intermediate layer 13 is a tetrafluoroethylene resin, a trifluoroethylene resin, a polyvinylidene fluoride resin, a polyvinyl fluoride resin, an ethylene-tetrafluoroethylene resin, a polychlorotri-fluoroethylene resin, an ethylene-chlo fluoroethylene copolymer or a tetrafluoroethylene-hexafluoropropylene copolymer. Films of those resins may be oriented or unoriented.

Sometimes, the intermediate layer 13 or the outermost layer 11 formed of a polyester resin makes the formation of an embossed case for a lithium battery difficult. The use of a polystyrene terephthalate copolymer or a polybutylene terephthalate copolymer instead of the polyester resin facilitate the formation of an embossed case for a lithium battery.

When a laminated structure 10 provided with an intermediate layer 13 is used for packaging a lithium battery module, the intermediate layer 13 may consist of two or three sublayers each having a thickness in the range of 10 to 100 μm, preferably, in the range of 15 to 25 μm. For example, the following multilayer structures may be used as an intermediate layer 13.

(1) PEA/HD (2) PPA/PP (melting point: 120° C. or above, preferably, 135° C. or above)

(3) PMa/TPX (melting point: 120° C. or above, preferably, 135° C. or above), HD or PP (4) PEA or PPA/PMa (Two layers)

(5) PEA or PPA/PMa/PEA or PPA (Three layers)

(6) PEA or PPA/PMa/PMa (Three layers)

(7) PEA or PPA/PMa/TPX/PMa (Four layers)

(8) PEA or PPA/PMa/TPX/PMa/PEA or PPA (Five layers)

(9) PEA or PPA/PMa/PEA or PPA (Three layers)

The following intermediate layers 13 each consisting of three or more sublayers including an adhesive layer or adhesive layers may be used.

(1) Unsaturated carboxylic acid graft polyethylene, unsaturated carboxylic acid graft polypropylene or unsaturated carboxylic acid graft poly(methyl pentene)/HD (2) Unsaturated carboxylic acid graft polyethylene, unsaturated carboxylic acid graft polypropylene or unsaturated carboxylic acid graft poly(methyl pentene)/PP (melting point: 120° C. or above, preferably, 135° C. or above)

(3) Unsaturated carboxylic acid graft polyethylene, unsaturated carboxylic acid graft polypropylene or unsaturated carboxylic acid graft poly(methyl pentene)/poly(methyl pentene)

(4) Unsaturated carboxylic acid graft polyethylene, unsaturated carboxylic acid graft polypropylene or unsaturated carboxylic acid graft poly(methyl pentene)/unsaturated carboxylic acid graft poly(methyl pentene) (melting point: 135° C. or above, Vicat softening point: 110° C.)

(5) Unsaturated carboxylic acid graft polyethylene, unsaturated carboxylic acid graft polypropylene or unsaturated carboxylic acid graft poly(methyl pentene)/oriented polyethylene terephthalate (6) Unsaturated carboxylic acid graft polyethylene, unsaturated carboxylic acid graft polypropylene or unsaturated carboxylic acid graft poly(methyl pentene)/polybutylene terephthalate (7) Unsaturated carboxylic acid graft polyethylene, unsaturated carboxylic acid graft polypropylene or unsaturated carboxylic acid graft poly(methyl pentene)/polyethylene naphthalate (8) Unsaturated carboxylic acid graft polyethylene, unsaturated carboxylic acid graft polypropylene or unsaturated carboxylic acid graft poly(methyl pentene)/fluorocarbon resin (9) Unsaturated carboxylic acid graft polyethylene, unsaturated carboxylic acid graft polypropylene or unsaturated carboxylic acid graft poly(methyl pentene)/HD, PP, poly (methyl pentene), unsaturated carboxylic acid graft poly (methyl pentene), oriented polyethylene terephthalate or fluorocarbon resin/unsaturated carboxylic acid graft polyethylene, unsaturated carboxylic acid graft polypropylene or unsaturated carboxylic acid graft poly(methyl pentene)

Adhesives layers represented by the symbol/for bonding together the sublayers of the multilayer intermediate layer may be those of polyether-urethane resins, polyester-urethane resins, isocyanate resins, polyolefin resins, polyethylene-imine resins, cyanoacrylate resins, organotitanium compounds, epoxy resins, imide resins, and/or silicone resins.

Preferably, the innermost layer 14 of the lithium battery packaging laminated structure according to the present invention is suitable for heat-sealing and is adhesive when heated, can be bonded to the metal terminals 3 by heat-sealing and capable of withstanding quality deteriorating actions of the filler of a package formed from the lithium battery packaging laminated structure. Preferable materials for forming the innermost layer 14 meeting such requirements are films having a thickness of 10 µm or above, preferably, in the range of 50 to 100 µm, a melting point of 80° C. or above and a Vicat softening point of 70° C. or above, and formed of an unsaturated carboxylic acid graft polyolefin resin, such as an unsaturated carboxylic acid graft polyethylene resin, an unsaturated carboxylic acid graft polypropylene resin or an unsaturated carboxylic acid graft poly(methyl pentene) resin.

Unsaturated carboxylic acid graft polyolefin resins are satisfactory in adhesion to terminals 3, heat resistance, cold resistance and workability (ease of fabricating pouches or forming).

When the thickness of the innermost layer 14 is less than 10 µm, gaps are formed between the battery package and the terminals 3 when the battery package is heat-sealed and the battery package is unable to prevent the penetration of moisture into the battery package. When the melting point and Vicat softening point of the innermost layer 14 are excessively low, the innermost layer 14 is not heat-resistant and not cold-resistant, adhesive strength between the innermost layers 14 and the terminals 3 are low and the package may break. The adhesive strength between heat-sealed innermost layers 14 does not increase even if the thickness of the innermost layers is increased beyond 100 µm and the thickness of the laminated structure increases and a package formed from the laminated structure needs an increased space for installation if the thickness of the innermost layer 14 is increased. Although the foregoing unsaturated graft polymers may be individually used, a material produced by blending some of those unsaturated graft polymers have satisfactory properties.

Suitable materials other than the foregoing unsaturated graft polymers suitable for forming the innermost layer 14 are polyethylene resins, polypropylene resins, ethylene-vinyl acetate copolymers, ionomers, copolymers of ethylene and an acrylic acid derivative, copolymers of ethylene and a methacrylic acid derivative, copolymers of propylene and an acrylic acid derivative and copolymers of propylene and a methacrylic acid derivative.

Preferably, a protective layer 15 having a thickness in the range of 10 to 50 µm, preferably, in the range of 15 to 25 µm and formed of an unsaturated carboxylic acid graft polyolefin resin, such as an unsaturated carboxylic acid graft polyethylene resin, an unsaturated carboxylic acid graft polypropylene resin or an unsaturated carboxylic acid graft poly(methylpentene) resin is sandwiched between the innermost layer 14 and the barrier layer 12. The protective layer 15 of the unsaturated carboxylic acid graft polyolefin resin improves the heat resistance and cold resistance of the lithium battery packaging laminated structure.

A film of the unsaturated carboxylic acid graft polyolefin resin as an intermediate layer 13 may be formed between the barrier layer 12 and the innermost layer 14 by extrusion lamination or thermal lamination or a film of the unsaturated carboxylic acid graft polyolefin resin may be sandwiched between another intermediate layer 13 and the barrier layer 12 for sandwich lamination. The unsaturated carboxylic acid graft polyolefin resin has high adhesive strength and prevents the delamination of the laminated structure attributable to the injurious effect of the package filler or a substance produced by the interaction of the package filler and moisture.

The component layers of the laminated structure 10, i.e., the lithium battery packaging laminated structure according to the present invention, may be processed by a surface activating or in activating process, such as a corona discharge process, a blasting process, an oxidizing process or an ozonation process, to stabilizing qualities needed for film formation, lamination and secondary processing for making final products (pouches or embossed cases). Materials forming the layers of the lithium battery packaging laminated structures may contain at least one of a moisture absorbing substance, such as a desiccant, a gas-adsorbent substance that adsorbs gases such as oxygen gas and nitrogen gas, a flame retarder, an antistatic agent, such as carbon, a surface-active agent or an inorganic oxide, a conductive substance, an electromagnetic shielding substance, oxidation inhibitor, an ultraviolet absorber, an antistatic agent, an antiblocking agent, a lubricant, such as a fatty acid amide, an inorganic or organic filler, a die and a pigment. The layers may be coated with a liquid containing at least one of those substances.

When manufacturing the lithium battery packaging laminated structure according to the present invention, films serving as the component layers may be formed by a T-die extrusion process, a tubular film extrusion process or a coextrusion process, and the films may be coated with an ultraviolet curable or electron be am curable films by a coating process or an evaporation process. The component layers may be laminated by dry lamination, extrusion lamination, coextrusion lamination or thermal lamination.

EXAMPLES

The following laminated structures as examples of the lithium battery packaging laminated structure according to the present invention and as comparative examples.

In the following description, materials of films and processes will be represented by the following symbols (acronyms, initial words and abbreviations).

Symbols

Processes

DL: Dry lamination, EC: Extrusion lamination, COEC: Coextrusion lamination, TL: Thermal lamination Materials OPET: Oriented polyester film, ON: Oriented nylon film, CPET: Copolyester film, AL: Aluminum foil, POa: Unsaturated graft polyolefin film (film of a polypropylene resin, a polyethylene resin, or a poly(methyl pentene) resin), EVA: Ethylene-vinyl acetate copolymer film, EAM: Film of a copolymer of ethylene and an acrylic acid derivative or a methacrylic acid derivative (EMA, EMAA, EAA, EMMA), Io: Ionomer film, EP: Epoxy resin film, FN: Phenolic resin film, MR: Melamine resin film, AK: Alkyd resin film, PI: Polyimide film, PU: Polyurethane film, U-PET: Unsaturated polyester film, PEU: Polyester-urethane film, PeU: Polyether-urethane film, F: fluorine.

Unsaturated graft polymers include unsaturated carboxylic acid graft polyethylene resins, unsaturated carboxylic acid graft polypropylene resins and unsaturated carboxylic acid graft poly(methyl pentene) resins. Those three kinds of unsaturated graft polymers were comparable in effect and hence the same are called inclusively unsaturated graft polymers in the following description. Unless otherwise specified, unsaturated graft polymers used for forming laminated structures in examples are those having molting points not lower than 80° C. and Vicat softening points not lower than 75° C.

1) Formation of Laminated Structures in Examples and Comparative Examples

Example 1

PET12/DL/AL20/EP/DL/PET12/DL/POa20

The following adhesives for dry lamination DL were tested. Structures employing adhesives other than those shown herein as examples are not mentioned herein.

$D_1$: Polyester resin, $D_2$: Polyether resin, $D_3$: Urethane resin, $D_4$: Polyether-urethane resin, $D_5$: Polyester-urethane resin, $D_6$: Unsaturated polyester-urethane resin, $D_7$: Polyurethane resin, $D_8$: Polyethylene-imine resin, $D_9$: Cyanoacrylate resin, $D_{10}$: Organotitanium compound, $D_{11}$: Epoxy resin, $D_{12}$: Copolymer of ethylene and acrylic acid and methacrylic acid derivative, $D_{13}$: Polyether resin Example 2

PET12/$D_5$/ON15/$D_5$/AL20/EP/$D_5$/PET12/$D_5$/POa50

Example 3

PET12/$D_5$/AL20/EP/$D_5$/PET12/$D_5$/POa50

Example 4

PET12/$D_5$/AL20/EP+MR/TL/POa/EC/PET12/$D_5$/POa70

Example 5

ON15/$D_5$/AL20/EP+FE/TL/POa/PET12/$D_5$/POa50

Example 6

CPET16/EC/PE20/EC/AL50/EP+MR/POa/TL/POa20/$D_5$//CPET16/$D_5$/POa

Example 7

ON25/$D_5$/AL40/EP+POa/TL/POa20/PP20/POa10/COEC

Example 8

ON25/$D_5$/AL40/EP+PEU/TL/POa20/EC/CPET16/$D_5$/PP50

Coating on the Side of the Terminal

Example 9

ON25/$D_5$/AL80/EP+PeU/POa/TL/PE20/EC/HD50

POa Coating on the Surface on the Side of the Terminal

Example 10

PET12/$D_5$/ON15/$D_5$/AL10/PE+MR/TL/EAM20/EC/PET12/$D_5$/Io50

Example 11

ON15/$D_5$/AL20/COPET+Io+EVA/TL/POa20/$D_5$/PET12/EC/EAM12

Example 12

PET12/$D_5$/AL20/EP+MR/POa20/TL/POa20/Insulating film PP10/$D_5$/PET12/$D_5$/POa30

Example 13

ON15/$D_5$/AL20/EP+POa/TL/PP or HD20 Insulating film POa20/EC/PET12/EC/POa20

Example 14

CPET12/EC/AL50/EP+PEU/EC/PP or HD Insulating film POa20/EC/PET12/EC/POa20

Example 15

ON25/$D_5$/AL50/EP+EVA+CPET/$D_5$/POa Insulating film PP10/$D_5$/PET12/$D_5$/POa30

Example 16

PET12/$D_5$/PE20/EC/AL20 Phosphate treatment/EP+MR/TL/POa Insulating film POa20/EC/PET12/EC/POa20

Comparative Example 1

PET12/DL/ON15/DLAL20/DL/PET12/DL/POa50

Comparative Example 2

PET12/DL/ON15/DL/AL20/DL/PET12/DL/PE or PP50

(Any adhesive resin film, such as a POa, EVA, Io or EMA film is not sandwiched between the terminal and the innermost layer.)

2) Evaluation Method

Pouches of 30 mm×60 mm were made from the laminated structures in Examples 1 to 16 and Comparative examples 1 and 2, 4 mm thick batteries provided with 100 μm thick nickel terminals were put in the pouches, respectively, and three open sides of the pouches were heat-sealed together with the terminals. Heat of 200° C. and pressure of 1 kgf/cm² were applied for 1 s to form 10 mm wide sealed parts in the peripheral parts of the pouches by heat-sealing to complete sample batteries.

Embossed packages each having a container having an embossed part of 30 mm×60 mm×4 mm and a 7 mm wide flange were formed by press forming. Batteries of 4 mm in thickness provided with 100 μm thick nickel terminals were put in the containers of the embossed cases and covers were hermetically bonded to the flanges of the containers to seal the batteries in the embossed cases, respectively, to complete sample batteries.

The sample batteries were subjected to the following tests.

a) Appearance: The appearance of the pouches and the embossed cases was examined. The pouches and the embossed cases were searched for pinholes, sections of sealed parts including terminals of the batteries were inspected for contact between the terminals and the barrier layers.

b) The following properties of sample batteries were examined after storing the sample batteries for ten days in an environment (1) of 40° C. and 90% RH and an environment (2) of 60° C. and 85% RH (dry).

Moisture impermeability: Moisture contained in the battery was measured by Karl Fischer's method to see whether an increase in moisture contained in the battery is 50% or below.

Delamination: The packages were inspected for delamination.

3) Results of Tests

Neither pinholes nor unbonded parts were found in the batteries having the pouches and embossed cases formed from the laminated structures in Examples 1 to 16. Bonded parts had a peel strength of 100 g/m² or above.

The peel strength of the aluminum foil and the pet film of each of the laminated structures in Comparative examples 1 and 2 provided with an untreated aluminum foil was 80 g/m².

In the battery having the pouch or the embossed case formed from the laminated structure having the innermost layer formed from only a polyethylene resin film or a polypropylene resin film, and not provided with any layer of POa, EVM, Io or EMA between the terminals and the innermost layer, the innermost layer was not bonded satisfactorily to the terminals and gaps were formed between the innermost layer and the terminals.

Corrosion of the surface of the aluminum foil by an acid produced by the interaction of the electrolyte and moisture penetrated the laminated structure and the resultant delamination of the laminated structure could be prevented by the acid-resistant film formed on the surface on the side of the innermost layer of the aluminum foil, i.e., the barrier layer.

Fifth Embodiment

A fifth embodiment of the present invention will be described herein after. The fifth embodiment is substantially the same as the second embodiment illustrated in FIGS. 7 to 9, except that laminated structures in the fifth embodiment are different from those in the second embodiment only in construction. Therefore, the fifth embodiment will be described with reference to FIGS. 7 to 9, in which parts like or corresponding to those of the second embodiment are denoted by the same reference characters and the description thereof will be omitted.

Referring to FIGS. 7(a) to 7(e), an outermost layer 11 is an oriented polyester film or a nylon film. Suitable polyester resins for forming the oriented polyester film are polyethylene terephthalate resins, polybutylene terephthalate resins, polyethylene naphthalate resins, polybutylene naphthalate resins and polycarbonate resins. Suitable polyamide resins for forming the nylon film are nylon 6 and nylon 66. The outermost layer 11 has at least one oriented polyethylene terephthalate or oriented nylon film of a thickness of 6 μm or above, preferably, in the range of 12 to 25 μm. When a lithium battery provided with a battery package made from the laminated structure is used on a device (hardware), the outer most layer 11 touches the device. Therefore, it is desirable to form the outermost layer 11 of an insulating resin. Since a film forming the outermost layer 11 has pinholes and pinholes will be formed in the film during processing, the thickness of the outermost layer 11 must be 6 μm or above, preferably, in the range of 12 to 25 μm.

The outermost layer 11 may be formed from a laminated film in view of providing the outermost layer 11 with a high pinhole-resistant property and an improved insulating ability. Preferably, the outermost layer 11 includes at least one resin layer consisting of two or more layers each having a thickness of 6 μm or above, preferably, in the range of 12 to 25 μm. The following laminated structures 1) to 6) are examples of the outermost layer 11 of laminated construction.

1) Oriented polyethyleneterephthalate film/oriented nylon film

2) Oriented polyethylene terephthalate film/polyethylene film

It is preferable to form the outermost layer in multilayer construction or to coat the surface of the outermost layer with a layer of a fluorocarbon resin or a silicone resin to improve the mechanical properties of the packaging laminated structure (stability in movement on packaging machines and processing machines) and to reduce friction between the outermost layer and a die when the packaging laminated structure is subjected to a forming process using the die to form embossed cases.

3) Fluorocarbon resin film/oriented polyethylene terephthalate film (The fluorocarbon resin film is bonded to the oriented polyethylene terephthalate film or is formed on the oriented polyethylene terephthalate film by spreading liquid fluorocarbon resin over the surface of the oriented polyethylene terephthalate film and drying the same.)

4) Silicone resin film/oriented polyethylene terephthalate film (The silicone resin film is bonded to the oriented polyethylene terephthalate film or is formed on the oriented polyethylene terephthalate film by spreading liquid silicone resin over the surface of the oriented polyethyleneterephthalate film and drying the same.)

5) Fluorocarbon resin film/oriented polyethylene terephthalate film/oriented nylon film 6) Silicone resin film/oriented polyethylene terephthalate film/oriented nylon film Adhesive layers for laminating the component sublayers of the outermost layer 11 are formed of polyester resins, polyether resins, urethane resins, polyether-urethane resins, polyester-urethane resins, isocyanate resins, polyolefin resins, polyethylene-imine resins, cyanoacrylate resins, organotitanium compounds, epoxy resins, imide resins, silicone resins, mixtures of some of those resins and derivatives of those resins.

A barrier layer 12 prevents the penetration of moisture and gases into a lithium battery 1. To avoid the adverse effect of pinholes that may be formed in the barrier layer 12, to stabilize the workability (ease of fabricating pouches or forming) and to provide the barrier layer 12 with pinhole resistance, the barrier layer 12 is formed from a foil of a metal, such as aluminum or nickel, or a film of an inorganic compound, such as silicon dioxide or alumina. Preferably, barrier layer 12 is a soft aluminum foil of a in the range of 20 to 80 μm.

The inventors of the present invention made earnest studies to reduce pinholes and to prevent the formation of cracks in an embossed battery package and found that aluminum having an iron content in the range of 0.3 to 9.0% is superior in ductility to aluminum not containing any iron, pinholes are less liable to be formed in a film of such aluminum when a laminated structure including the film of such aluminum is folded and walls of an embossed battery package can be easily formed. Aluminum having an iron content less than 0.3% is unable to form a satisfactorily pinhole-resistant film and does not have improved formability. Aluminum having an iron content exceeding 9.0% is unsatisfactory in flexibility and affects adversely to the workability of the laminated structure in forming a pouch.

To improve the chemical resistance, and organic solvent resistance of the surface of the aluminum foil, the aluminum foil may be subjected to chemical conversion treatment, such as chromate treatment or phosphate treatment, or to sealing treatment after anodic treatment using sulfuric acid, oxalic acid, chromic acid or phosphoric acid.

A solvent-resistant, acid-resistant resin layer, i.e., a protective layer 15, not shown, may be formed on the surface of the aluminum foil. The protective layer 15 is effective not only in protecting the surface of the aluminum foil but also in bonding the aluminum foil to an intermediate layer 13. The protective layer 15 contains at least one of epoxy reins, phenolic resins, melamine resins, alkyl resins, polyimide resins, unsaturated polyester resins, polyurethane resins, unsaturated carboxylic acid graft polyolefin resins, polyester resins including polyethylene terephthalate copolymers and polybutylene terephthalate copolymers, ionomers, ethylene-vinyl acetate copolymers, copolymers of ethylene and acrylic acid derivatives, copolymers of ethylene and methacrylic acid derivatives, polyether resins and derivatives of those resins. At least one layer of the resin is formed on the surface of an aluminum foil.

A protective layer 15 having a thickness in the range of 10 to 50 μm, preferably, in the range of 15 to 25 μm and formed of an unsaturated carboxylic acid graft polyolefin resin, such as an unsaturated carboxylic acid graft polyethylene resin, an unsaturated carboxylic acid graft polypropylene resin or an unsaturated carboxylic acid graft poly(methyl pentene) resin, may be formed on a surface of the barrier layer 12 on the side of an innermost layer 14. The protective layer 15 of the unsaturated carboxylic acid graft polyolefin resin improves the heat resistance, cold resistance, chemical resistance and organic solvent resistance of the laminated structure as a lithium battery packaging laminated structure.

The unsaturated carboxylic acid graft polyolefin resin film may be formed on the barrier layer 12 by extruding a unsaturated carboxylic acid graft polyolefin resin on the barrier layer 12 or may be formed by coating the surface of the barrier layer 12 with a coating film of a liquid unsaturated carboxylic acid graft polyolefin resin and baking the coating film, for example, at 150° C. for 10 s.

The intermediate layer 13 is formed between the barrier layer 12, and the protective layer 15 or the innermost layer 14 to protect the barrier layer 12 and to prevent contact (short circuit) between the terminals 3 and the aluminum barrier layer 12 due to the thinning of the innermost layer 14, i.e., a heat-adhesive layer, by heat and pressure applied thereto in a heat-sealing process for forming a pouch. The intermediate layer 13 is added to stabilize the environmental suitability (heat resistance and cold resistance) of the lithium battery. The intermediate layer 13 has a thickness of 10 μm or above and a melting point of 80° C. or above. Preferably, the intermediate layer 13 includes at least one layer of a thickness in the range of 12 to 25 μm formed of a polyester resin, a polyolefin resin, a fluorocarbon resin, a derivative of one of those resins or a resin produced by mixing some of those resins.

Suitable polyester resins for forming the intermediate layer 13 are polyethylene terephthalate resins, polybutylene terephthalate resins, polyethylene naphthalate resins, polybutylene naphthalate resins, polycarbonate resins, copolymers of some of those polymers and derivatives of those polymers.

Suitable polyolefin resins are polypropylene resins, ethylene-propylene copolymers, low-density polyethylene resins, medium-density polyethylene resins, high-density polyethylene resins, linear low-density polyethylene resins, ethylene-α-olefin copolymers produced through polymerization using a single-site catalyst, polyethylene resins containing metal ions, copolymers of ethylene and acrylic acid derivatives, copolymers of ethylene and methacrylic acid derivatives, polybutene resins, unsaturated carboxylic acid graft polyethylene resins, unsaturated carboxylic acid graft polypropylene resins, unsaturated carboxylic acid graft poly(methyl pentene) resins and derivatives of those polymers. Suitable fluorocarbon resins are tetrafluoroethylene resins, trifluoroethylene resins, polyvinylidene fluoride resins, polyvinyl fluoride resins, ethylene tetrafluoroethylene resins, polychlorotrifluoroethylene resins, ethylene chlorotrifluoroethylene copolymers and tetrafluoroethylene-hexafluoropropylene copolymers. Films of these resins may be either oriented or unoriented.

The intermediate layer 13 may be either a single-layer structure or a multilayer structure. A multilayer structure as the intermediate layer 13 may be formed by a coextrusion process or an extrusion lamination process. For example, when forming a multilayer intermediate layer 13 consisting of two or more sublayers, the thickness of each sublayer is in the range of 10 to 100 μm, preferably, in the range of 15 to 25 μm. The following multilayer structures 1) to 9) are examples of intermediate layers 13. In the following symbolic representations of multilayer intermediate layers 13, sublayers nearer to the barrier layer are nearer to the left end.

1) PEA/HD
2) PPA/PP (melting point: 120° C. or above, preferably, 135° C. or above)
3) PMa/TPX (melting point: 120° C. or above, preferably, 135° C. or above), HD or PP
4) PEA or PPA/PMa (two layers)
5) PEA or PPA/PMa/PEA or PPA (three layers)
6) PEA or PPA/PMa/PMa (three layers)
7) PEA or PPA/PMa/TPX/PMa (four layers)
8) PEA or PPA/PMa/TPX/PMa/PEA or PPA (five layers)
9) PEA or PPA/PMa/PEA or PPA (three layers)

When a multilayer intermediate layer 13 is formed by a dry lamination process, the intermediate layer 13 consists of three or more sublayers including and adhesive layer or layers and the thickness of each sublayer is in the range of 10 to 100%, preferably, in the range of 15 to 25 μm. The following multilayer structures 1) to 9) are examples of intermediate layers 13 formed by dry lamination. In the following symbolic representations, the symbol "/" represents an adhesive layer employed in dry lamination.

1) Sublayer 1 (layer of PEA, PPA or PMa)/HD
2) Sublayer 1/PP (melting point: 120° C. or above, preferably 135° C. or above)
3) Sublayer 1/TPX
4) Sublayer 1/PMa (melting point: 135° C. or above, Vicat softening point: 110° C. or above)
5) Sublayer 1/oriented polyethylene terephthalate 6) Sublayer 1/polybutylene terephthalate
7) Sublayer 1/polyethylene naphthalate
8) Sublayer 1/fluorocarbon
9) PEA, PPA or PMa/HD, PP, TPX, PMa, oriented polyethylene terephthalate, polybutylene terephthalate, polyethylene naphthalate or fluorocarbon/PEA, PPA or PMa Possible adhesives for bonding together the component sublayers of the foregoing intermediate layers 13 by dry lamination are polyester adhesives, polyether adhesives, urethane adhesives, polyether-urethane adhesives, polyester-urethane adhesives, isocyanate adhesives, polyolefin adhesives, polyethylene-imine adhesives, cyanoacrylate adhesives, organotitanium compounds, epoxy adhesives, imide adhesives, silicone adhesives, derivatives of those adhesives and mixtures of some of those adhesives.

The innermost layer 14 of the lithium battery packaging laminated structure according to the present invention forming a package for containing a lithium battery module must be heat-adhesive, must be adhesive to the terminals 3 of the lithium battery module, i.e., metal members, and must be unsusceptible to the adverse effect of the lithium battery module. It was known through studies made to find materials suitable for forming the innermost layer 14 that a resin layer having a thickness of 10 µm or above, preferably, in the range of 50 to 100 µm and formed of any one of resins having a melting point of 80° C. or above and a Vicat softening point of 70° C. or above, such as unsaturated carboxylic acid graft polyolefin resins including unsaturated carboxylic acid graft polyethylene resins, unsaturated carboxylic acid graft polypropylene resins and unsaturated graft methyl pentene resins, and mixtures of some of the unsaturated carboxylic acid graft polyolefin resins, is satisfactory. Unsaturated carboxylic acid graft polyolefin resins are excellent in adhesion to the terminals 3, heat resistance, cold resistance, workability (ease of fabricating pouches or forming).

When the thickness of the innermost layer 14 is less than 10 µm, gaps are formed between the battery package and the terminals 3 when the battery package is heat-sealed and the battery package is unable to prevent the penetration of moisture into the battery package. When the melting point and Vicat softening point of the innermost layer 14 are excessively low, the innermost layer 14 is not heat-resistant and not cold-resistant, adhesive strength between the innermost layers 14 and the terminals 3 are low and the package may break. The adhesive strength between heat-sealed innermost layers 14 does not increase even if the thickness of the innermost layers is increased beyond 100 µm and the thickness of the laminated structure increases and a package formed from the laminated structure needs an increased space for installation if the thickness of the innermost layer 14 is increased. Although the foregoing unsaturated graft polymers may be individually used, a material produced by blending some of those unsaturated graft polymers have satisfactory properties.

Sometimes, a tray-type embossed case as shown in FIG. 8(b) is formed from the packaging laminated structure according to the present invention. The embossed case has a container 6 having an embossed part 8 for containing a battery module and a flange 9, and a cover 7 to be bonded hermetically to the flange 9. Basically, the container 6 is formed from a five-layer laminated structure as shown in FIG. 8(a). A polyester resin forming the outermost layer 11 and/or the intermediate layer 13 is a polyethylene terephthalate copolymer or a polybutylene terephthalate copolymer. It is preferable that the film forming the outermost layer 11 and/or the intermediate layer 13 is oriented at a low draw ratio. When such a copolymer is used, the container 6 can be formed in a rectilinear shape. The container can be easily formed in a shape in which a ratio d/T is 1/50 or greater, where T is the width of the open end of the container 6 and d is the depth of the container 6, and the side wall is inclined at an inclination of 130° or below. The embossed case is able to contain the battery module snug. Since the cover 7 to be attached to the container 6 is not embossed, a battery packaging laminated structure for forming the cover 7 need not be the copolymer film.

The intermediate layer 13 of the unsaturated carboxylic acid graft polyolefin resin may be sandwiched between the barrier layer 12 and the innermost layer 14 in addition to the protective layer 15 formed on the surface of the aluminum foil by bonding the intermediate layer 13 to the barrier layer 12 and the innermost layer 14 by extrusion lamination or by bonding a film of the unsaturated carboxylic acid graft polyolefin resin to the barrier layer 12 and the innermost layer by thermal lamination. The unsaturated carboxylic acid graft polyolefin resin may be extruded between another intermediate layer 13 and the barrier 12 for sandwich lamination. Such sandwich lamination may be used in combination with the formation of the protective layer 15 of an unsaturated carboxylic acid graft polyolefin resin on a surface of the barrier layer 12 on the side of the innermost layer 14. When the layers are laminated by extrusion coating, the adhesive strength between the layers can be increased by coating the bonding surface of the layer to be bonded to another with an about 1 µm thick film of any one of polyester resins, polyether resins, urethane resins, polyether-urethane resins, polyester-urethane resins, isocyanate resins, polyolefin resins, polyethylene-imine resins, cyanoacrylate resins, organotitanium compounds, epoxy resins, imide resins, silicone resins, derivatives of those resins and mixtures of some of those resins. This film is a bonding layer 1 of the laminated structure 10.

A bonding surface of the intermediate layer 13, the barrier layer 12 or the protective layer may be finished by an ozonation process.

The intermediate layer may be bonded to the barrier layer 12 or the protective layer 15 by dry lamination or by coextrusion or thermal lamination using an unsaturated carboxylic acid graft polyolefin resin. The adhesive strength between the layers bonded together by coextrusion or thermal lamination is high and prevents the delamination of the laminated structure caused by the package filler or by a substance produced by the interaction of the package filler and moisture.

The outermost layer 11, the barrier layer 12, the intermediate layer 13 and the innermost layer 14 of the laminated structure 10 as a lithium battery packaging laminated structure according to the present invention may be formed and laminated by a T-die extrusion process, a tubular film extrusion process or a coextrusion process. When necessary, a secondary film may be formed by a coating process, an evaporation process, an ultraviolet curing process or an electron beam curing process. The adjacent layers may be bonded together by a dry lamination process, an extrusion coating process, a coextrusion lamination process or a thermal lamination process.

Possible adhesives for dry lamination are polyester adhesives, polyethylene-imine adhesives, polyether adhesives, cyanoacrylate adhesives, urethane adhesives, organic titanium compound adhesives, polyether-urethane adhesives, epoxy adhesives, polyester-urethane adhesives, imide adhesives, isocyanate adhesives, polyolefin adhesives and silicone adhesives.

An adhesive film having a thickness of about 1 μm and formed of one of polyester resins, polyether resins, urethane resins, organotitanium compounds, polyether-urethane resins, polyester-urethane resins, isocyanate resins, polyolefin resins, polyethylene-imine resins cyanoacrylate resins, epoxy adhesives, imide resins, silicone resins, derivatives of those resins and mixtures of some of those resins may be used when laminating the adjacent layers by extrusion lamination to stabilize the adhesive strength between the layers or the layers may be subjected to an ozonation process for surface activation.

An unsaturated carboxylic acid graft polyolefin resin used for coextrusion lamination or thermal lamination improves adhesive property and resistance to the injurious effect of the package filler.

EXAMPLES

Examples of lithium battery packaging laminated structures according to the present invention will be described herein after. Laminated structures of the foregoing types of construction were made and applied to lithium battery packages. Performance of the laminated structures was satisfactory.

In the following description, are designated inclusively as unsaturated graft polymers. Unsaturated carboxylic acid graft polyethylene, unsaturated carboxylic acid graft polypropylene and unsaturated carboxylic acid graft poly (methyl pentene) three were comparable in effect and hence those unsaturated graft polymers are designated inclusively as unsaturated graft polymers in the following description. Unless otherwise specified, unsaturated graft polymers used for forming laminated structures in examples are those having melting points not lower than 80° C. and Vicat softening points not lower than 75° C.

Laminated Structures for Forming Pouches

Example 1

OPET12/$D_2$/AL20/$D_5$/PET12/$D_5$/Unsaturated graft polymer film50

The following adhesives were tested. Structures employing adhesives other than those shown herein as examples are not mentioned herein.

$D_1$: Polyester resin, $D_2$: Polyether resin, $D_3$: Urethane resin, $D_4$: Polyether-urethane resin, $D_5$: Polyester-urethane resin, $D_6$: Isocyanate resin, $D_7$: Polyolefin resin, $D_8$: Polyethylene-imine resin, $D_9$: Cyanoacrylate resin, $D_{10}$: Organotitanium compound, $D_{11}$: Epoxy resin, $D_{12}$: Imide resin, $D_{13}$: Silicone resin Laminated structures were formed by substituting the intermediate layers formed of OPET of Example 1 and the following examples by PP, HD, LDPE, LLDPE, MDPE, a fluorocarbon resin, PBT and a biaxially oriented EVOH and the performance thereof was tested.

Example 2

PET12/$D_2$/EC/PE15/EC/AL20/$D_5$/OPET12/$D_5$/Unsaturated graft polymer film50

Example 3

OPET12/$D_2$/AL20/$D_2$/OPET12/$D_5$/Unsaturated graft polymer film50

Example 4

N6/$D_2$/AL15/DL/OPET12/$D_5$/Unsaturated graft polymer film50

Laminated Structures for Forming Embossed Packages

Example 5

Polyethylene terephthalate copolymer film16/$D_2$/N15/$D_2$/AL20(acid-proofing treatment: chromating)/$D_5$/Polyethylene terephthalate copolymer16/$D_5$/Unsaturated graft polymer film50

Example 6

Polyethylene terephthalate copolymer film16/EC/PE15/EC/AL20(acid-proofing treatment: phosphating)/$D_5$/Polyethylene terephthalate copolymer16/$D_5$/Unsaturated graft polymer film50

Laminated Structures with Different Outermost Layers

Example 7

ON25/$D_2$/AL40/$D_5$/Polyethylene terephthalate copolymer film16/$D_5$/Unsaturated graft polymer film50

Example 8

ON25/EC/AL40/$D_5$/Polyethylene terephthalate copolymerchandise film20/$D_5$/OPET12/$D_5$/Unsaturated graft polymer film50

Example 9

OPET12/$D_5$/AL20/TL/Unsaturated graft polymer film20/$D_5$/OPET12/$D_5$/Unsaturated graft polymer film50

The OPET film of this structure and the following structures serving as an intermediate layer may be PP, HD, fluorocarbon resin film, PBT or a biaxially oriented EVOH.

Example 10

OPET12/DL/AL20/TL/(Epoxy-melamine) unsaturated graft polymer film20/EC/OPET12/$D_5$/Unsaturated graft polymer film20

Example 11

ON15/$D_5$/AL20/TL/Unsaturated graft polymer film20/EC/OPET12/EC/Unsaturated graft polymer film50

The OPET film of this structure serving as an intermediate layer may be PP, an unsaturated carboxylic acid graft poly(methyl pentene) film or HD. If PP is instead of OPET for forming the intermediate layer, the unsaturated graft polymer film is an unsaturated carboxylic acid graft polypropylene film. If HD is used instead of OPET as the intermediate layer, the unsaturated graft polymer film is an unsaturated carboxylic acid graft polyethylene film.

Example 12

OPET12/$D_5$/ON15/$D_5$/AL20/Baked unsaturated graft polypropylene film5/TL/PP20/$D_5$/Unsaturated graft polymer film50

The intermediate layer of PP may be PE or a poly(methyl pentene) film. When PE is used as the intermediate layer, an unsaturated carboxylic acid graft polyethylene film is used instead of the unsaturated carboxylic acid graft polypropylene film coating the aluminum foil. If the intermediate layer is a poly(methyl pentene) film, an unsaturated carboxylic acid graft poly(methyl pentene) film is used instead of the unsaturated carboxylic acid graft polypropylene film coating the aluminum foil.

The intermediate layer may be a multilayer film formed by coextrusion.

Example 13

ON15/$D_5$/AL20/TL/Unsaturated graft polymer film20/Unsaturated poly(methylpentene)film20/Unsaturated graft polymer film50/COEC

Example 14

OPET12/$D_5$/AL20(acid-proofing treatment: epoxy•melamine)/TL/Unsaturated graft polymer film20/$D_5$/OPET12/Unsaturated graft polymer film50
Laminated Structures for Forming Embossed Packages

Example 15

Polyethylene terephthalate copolymer film15/$D_5$/AL40/TL/Unsaturated graft polymer film20/$D_5$/Polyethylene terephthalate copolymer film16/$D_5$/Unsaturated graft polymer film50

The intermediate layer may be PP, HD, a fluorocarbon resin film, OPET or EVOH (ethylene-vinyl alcohol copolymer) instead of the polyethylene terephthalate copolymer.

Example 16

ON25/$D_5$/AL50/TL/Unsaturated graft polymer film20/EC/Polyethylene terephthalate copolymer film16/DL/Unsaturated graft polymer film50

Example 17

ON25/DL/AL80/TL/Unsaturated graft polymer film15/PP15/Unsaturated graft polymer film10/COEC

Example 18

Silicone resin film/Polyethylene terephthalate copolymer film25/EC/PE20/EC/AL20(Silane coupling treatment)/TL/Unsaturated graft polymer film20/$D_5$/Polyethylene terephthalate copolymer film16/$D_5$/Unsaturated graft polymer film100

Example 19

OPET12/$D_5$/AL20/TL/PP20/$D_5$/OPET12/$D_5$/Unsaturated graft polymer film50

Example 20

OPET12/$D_5$/AL20/TL/Unsaturated graft polymer film20/$D_5$/PET12/$D_5$/Unsaturated graft polymer film50

Example 21

OPET12/$D_5$/AL10/TL/Unsaturated graft polymer film20/$D_5$/OPET12/$D_5$/Unsaturated graft polymer film50
Laminated Structures for Forming Embossed Packages

Example 22

OPET16/$D_5$/AL40/$D_5$/OPET6/$D_5$/Unsaturated graft polymer film50

Laminated structures in Comparative examples 1 to 3 were made and the ability thereof was evaluated. Unless otherwise specified, unsaturated graft polymers in the following structures are those having a melting point of 80° C. or above and a Vicat softening point of 70° C. or above.
Laminated Structures for Forming Pouches

Comparative Example 1

OPET12/$D_5$/AL20/$D_5$/PP50/Unsaturated graft polymer film50

Comparative Example 2

OPET12/$D_5$/AL20/$D_5$/HD50

Comparative Example 3

OPET12/$D_5$/AL20/TL/Unsaturated graft polymer20/$D_5$/OPET12/$D_5$/Unsaturated graft polymer film50

Unsaturated graft polymer having a melting point of 75° C. and a Vicat softening point of 65° C. was used.

Pouch type batteries: Pouches of 30 mm×60 mm were made, battery modules of 4 mm in thickness having nickel terminals of 100 μm in thickness were put in the pouches, respectively, and three sides of each pouch including a side through which the terminals extend outside were sealed by heat-sealing. Heat of a temperature of 200° C. and a pressure of 1 kgf/cm² were applied for 1 s to the pouches for heat-sealing to form sealed parts of 10 mm in width.

Embossed package type batteries: Embossed packages each having a container of 30 mm×60 mm×4 mm having a flange of 7 mm in width were made by pressing, battery modules of 4 mm in thickness having nickel terminals of 100 μm in thickness were put in the containers of the embossed cases, respectively, and covers were bonded to the flanges of the containers, respectively, by heat-sealing to seal the battery modules in the embossed cases.

Appearance of the batteries having packages formed from packaging laminated structures in examples and comparative examples was examined, the packages were searched for pinholes, sections of sealed parts including terminals of the lithium batteries were inspected for contact between the terminals and the barrier layers.

The following properties of sample batteries were examined after storing the sample batteries for ten days in an environment (1) of 40° C. and 90% RH and an environment (2) of 60° C. and 85% RH (dry).

Moisture impermeability: Moisture contained in the battery was measured by Karl Fischer's method to see whether an increase in moisture contained in the battery is 50% or below.

Delamination: The packages were inspected for delamination

The laminated structures in Examples 1 to 18 were satisfactory. The laminated structures in Examples 19 to 23 and Comparative examples 1 to 3 had problems tabulated in Table 5-1.

TABLE 5-1

| Samples | Problems |
|---|---|
| Example 19 | AL/PP was delaminated |
| Example 20 | The outermost layer of OPET was excessively thin, pinholes were formed during processes for forming a pouch, AL was exposed to nullify the insulating property of the pouch. |
| Example 21 | Pinholes of sizes on the order of 10 μm were formed in AL10 and moisture impermeability was nullified. |
| Example 22 | Sometimes, pinholes were formed in during a forming process because PET16 is not a copolymer film. |
| Example 23 | The intermediate layer was excessively thin and contact between the terminals and the barrier layer occurred in some samples during heat-sealing. |
| Comparative example 1 | The innermost layer could not be bonded to the terminals and the packages could not be sealed hermetically. |
| Comparative example 2 | The innermost layer could not be bonded to the terminals and the packages could not be sealed hermetically. |
| Comparative example 3 | Heat sealed parts were not heat-resistant, were not heat-sealed satisfactorily and opened. |

Lithium batteries formed by sealing lithium battery modules in the packages formed from the lithium battery packaging laminated structures according to the present invention are flexible, and are lightweight and thin as compared with lithium batteries formed by sealing lithium battery modules in metal cans. Therefore, the lithium batteries according to the present invention can be installed in a small space. The lithium battery packaging laminated structures according to the present invention are excellent in gas-barrier property, are capable of maintaining satisfactory gas-barrier property for a long time, and are excellent in heat resistance, cold resistance and resistance to the injurious effect of fillers contained in the packages formed from the lithium battery packaging laminated structures.

Sixth Embodiment

A sixth embodiment of the present invention will be described herein after. The sixths embodiment is substantially the same as the first embodiment illustrated in FIGS. 1 to 6, except that laminated structures in the sixth embodiment are different from those in the first embodiment only in construction. Therefore, the sixth embodiment will be described with reference to FIGS. 1 to 6, in which parts like or corresponding to those of the first embodiment are denoted by the same reference characters and the description thereof will be omitted.

As shown in FIGS. 1 to 6, the outermost layer 11 of a laminated structure forming a package containing a lithium battery module of a lithium battery touches a device hardware) when the lithium battery is used on a device. Therefore, it is desirable to form the outermost layer 11 of a basically insulating resin. Since a film has pinholes and pinholes will be formed in the film during processing, the thickness of the outermost layer 11 must be 6 μm or above, preferably, in the range of 12 to 25 μm. The outermost layer 11 may be any one of the following multilayer structures 1) to 7), not shown.

1) Oriented polyethylene terephthalate film/ON
2) ON/Oriented polyethylene terephthalate film It is preferable to form the outermost layer 11 in multi-layer construction or to coat the surface of the outermost layer 11 with a layer of a fluorocarbon resin, an acrylic resin or a silicone resin to improve the mechanical properties of the packaging laminated structure (stability in movement on packaging machines and processing machines) and to reduce friction between the outermost layer 11 and a die when the packaging laminated structure is subjected to a forming process, i.e., a secondary process, using the die to form embossed cases.

3) Fluorocarbon resin film/Oriented polyethylene terephthalate film (The fluorocarbon resin film is bonded to the oriented polyethylene terephthalate film or is formed on the oriented polyethylene terephthalate film by spreading a liquid fluorocarbon resin over the surface of the oriented polyethylene terephthalate film and drying the same.)

4) Silicone resin film/Oriented polyethylene terephthalate film (The silicone resin film is bonded to the oriented polyethylene terephthalate film or is formed on the oriented polyethylene terephthalate film by spreading a liquid silicone resin over the surface of the oriented polyethylene terephthalate film and drying the same.)

5) Fluorocarbon resin film/Oriented polyethylene terephthalate film/Oriented nylon film 6) Silicone resin film/Oriented polyethylene terephthalate film/Oriented nylon film 7) Acrylic resin film/Oriented nylon film (The acrylic resin film is bonded to the oriented nylon film or is formed on the oriented nylon film by spreading a liquid acrylic resin over the surface of the oriented nylon film and drying the same.)

The outermost layer 11 is bonded to a barrier layer 12 by dry lamination or extrusion lamination.

The barrier layer 12 prevents the penetration of moisture into a lithium battery 1. To avoid the adverse effect of pinholes that may be formed in the barrier layer 12, to stabilize the workability (ease of fabricating pouches or forming) and to provide the barrier layer 12 with pinhole resistance, the barrier layer 12 is formed from a foil of a metal, such as aluminum or nickel, or a film of an inorganic compound, such as silicon dioxide or alumina. Preferably, the thickness of the barrier layer 12 is in the range of 10 to 80 μm.

It is desirable to form the barrier layer from an aluminum foil made of aluminum having an iron content in the range of 0.3 to 9.0%, preferably, in the range of 0.7 to 2.0% to reduce pinholes and to prevent the formation of cracks in an embossed battery package. Aluminum having an iron content less than 0.3% is unable to form a satisfactorily pinhole-resistant film and does not have improved formability. Aluminum having an iron content exceeding 9.0% is unsatisfactory in flexibility and affects adversely to the workability of the laminated structure in forming a pouch.

The flexibility, firmness and hardness of an aluminum foil formed by cold rolling are dependent on conditions for annealing the aluminum foil. It is more preferable to use a flexible, soft aluminum foil processed by annealing than to use an unannealed hard aluminum foil. The flexibility, firmness and hardness of the aluminum foil and annealing conditions may be selectively determined taking into consideration workability (ease of fabricating pouches or forming). A slightly or perfectly annealed soft aluminum foil is more desirable than an unannealed hard aluminum foil in view of inhibiting pinhole formation and creasing when embossing a laminated structure.

A surface of an aluminum foil is corroded by the chemical interaction of an aluminum oxide formed on the surface of the aluminum foil, and hydrogen fluoride (HF) produced by the interaction of an electrolyte and moisture. It is preferable to remove oxides and oils from the surface of the aluminum foil by cleaning the surface of the aluminum foil with an acid solution and an alkali solution. Suitable acids for cleaning are inorganic acids including sulfuric acid, hydrochloric acid, nitric acid, phosphoric acid, hydrofluoric acid and chromic acid, and organic acids including sulfamine acid, oxalic acid, tartaric acid, citric acid, formic acid, lactic acid, glycolic acid, acetic acid, gluconic acid, succinic acid and malic acid. A cleaning liquid can be prepared by mixing one of those acids as a principal component and suitable additives. Suitable alkalis for cleaning are hydroxides including sodium hydroxide, carbonates including sodium carbonate and sodium bicarbonate, phosphates including sodium secondary phosphate and sodium tertiary phosphate, polyphosphates including sodium pyrophosphate, sodium tripolyphosphate and sodium tetra polyphosphate, and silicates including sodium orthosilicate and sodium metasilicate. Although sodium salts are enumerated above, potassium salts and ammonium salts can be also used. An alkali cleaning liquid can be prepared by mixing one of those alkalis and suitable additives.

A surface finishing layer of a phosphate, a chromate, a fluoride, an organic silicon compound, an organic titanium compound or an organic aluminum compound may be formed on a surface of the aluminum foil on the side of an innermost layer to improve the chemical resistance and organic solvent resistance of the aluminum foil.

The chemical resistance and organic solvent resistance can be further improved by properly adding silicon dioxide ($SiO_2$), calcium carbonate, zinc, minium, lead suboxide, zinc oxide lead cyanamide, zinc chromate, barium potassium chromate or barium zinc chromate to the surface finishing layer formed on the surface of the aluminum foil.

The surface of the aluminum foil may be roughened by a chemical or physical method to enhance adhesive strength between the aluminum foil and a layer bonded to the aluminum foil.

Aluminum foils are often laminated to layers of other materials as barrier layers of packaging laminated structures. Aluminum, as compared with other metals, is relatively susceptible to the corrosive action of organic solvents, acids and alkalis. The active materials and polyelectrolytes of most lithium battery modules contain an organic solvent, such as ethylene carbonate, propylene carbonate, diethyl carbonate, dimethyl carbonate or acetone. Hydrofluoric acid (HF), a strong acid, is produced by the interaction of water and a lithium salt contained in the polyelectrolyte. When the surface of an aluminum foil is corroded by such organic solvents and acids, adhesive strength between the aluminum foil and an innermost layer or an intermediate layer decreases and the laminated packaging laminated structure is delaminated and the functions of the packaging laminated structure are lost.

The inventors of the present invention found through experiments that the corrosion of the surface of an aluminum foil can be prevented by coating the surface finishing layer TR with an acid-resistant, solvent-resistant resin layer (herein after referred to as "protective layer 15"). It was also found that the protective layer 15 unexpectedly is effective in bonding an intermediate layer 13 to the aluminum foil as well as effective in protecting the surface of the aluminum foil. According to the present invention, suitable materials for forming the protective layer 15 coating the surface of the barrier layer or the surface of the surface finishing layer are resins including epoxy resins, phenolic resins, melamine resins, alkyd resins, polyimide resins, unsaturated polyester resins, polyurethane resins, unsaturated carboxylic acid graft polyolefin resins, polyester copolymers including polyethylene terephthalate copolymers and polybutylene terephthalate copolymers, metal ion crosslinked polyethylene resins, ethylene-vinyl acetate copolymers, ethylene-acrylic acid copolymers, ethylene-methacrylic acid copolymers and polyether-urethane resins and derivatives of those resins. The protective layer 15 is formed of a material containing 30% or above of at least one of those resins. The protective layer 15 may contain one of the compounds for surface finishing, i.e., the phosphate, the chromate and the fluoride, an organic silicon compound an organic titanium compound or an organic aluminum compound.

The protective layer 15 may contain a phosphate film forming substance (zinc phosphate, iron phosphate, manganese phosphate, calcium phosphate, chromium phosphate, titanium phosphate, tin phosphate or silica phosphate), a chromate film forming substance (chromium chromate or silica chromate), fluoride film forming substance (titanium fluoride or zinc fluoride) and/or a substance for improving the adhesive property of the surface of an aluminum foil (coupling agent, a silane coupling agent, an organic titanium coupling agent or an organic aluminum coupling agent).

The chemical resistance and organic solvent resistance of the protective layer 15 can be further enhanced by properly adding silicon dioxide ($SiO_2$), calcium carbonate, zinc, minium, lead suboxide, zinc oxide lead cyanamide zinc chromate, barium potassium chromate or barium zinc chromate.

According to the present invention, an intermediate layer 13 may be sandwiched between the barrier layer 12 or the protective layer 15, and an innermost layer 14. The intermediate layer 13 protects the barrier layer 12 and prevents contact (short circuit) between the terminals 3 and the barrier layer 12 of aluminum due to the thinning of the innermost layer 14, i.e., a heat-adhesive layer, by heat and pressure applied thereto in a heat-sealing process for forming a pouch.

The intermediate layer 13 may be a multilayer film to stabilize the environmental capabilities of the battery. The multilayer intermediate layer 13 includes at least one sublayer having a thickness of 10 μm or above, preferably in the range of 12 to 25 μm and a melting point of 80° C. or above. The intermediate layer 13 includes at least one sublayer having a thickness in the range of 12 to 25 μm and formed of a polyester resin, a polyolefin resin, a fluorocarbon resin, a derivative of one of those resins or a mixture of some of those resins.

Possible polyester resins are polyethylene terephthalate resins, polybutylene terephthalate resins, polyethylene naphthalate resins, polybutylene naphthalate resins, polycarbonate resins, copolymers of some of those resins or derivatives of those resins. Possible polyolefin resins are polypropylene resins, ethylene-propylene copolymers, low-density polyethylene resins, medium-density polyethylene resins, high-density polyethylene resins, linear low-density polyethylene resins, ethylene-α-olefin copolymers produced by polymerization using a single-site catalyst, polyethylene resins containing metal ions, ethylene-methacrylic acid derivative copolymers, ethylene-acrylic acid derivative copolymers, polybutene resins, unsaturated carboxylic acid graft polyethylene resins, unsaturated carboxylic acid graft polypropylene resins, unsaturated carboxylic acid graft poly(methyl pentene) resins and derivatives of those resins.

Possible fluorocarbon resins are tetrafluoroethylene resins, trifluoroethylene resins, polyvinylidene fluoride resins, polyvinyl fluoride resins, ethylene-tetrafluoroethylene copolymers, polychlorotrifuluoroethylene resins, ethylene-chlorofluoroethylene copolymers, and tetrafluoroethylene-hexafluoropropylene copolymers. Either oriented or unoriented films of those resins may be used.

The intermediate layer 13 may be of single-layer construction or of multilayer construction. For example, the intermediate layer 13 may consists of a first intermediate layer 13a and a second intermediate layer 13b. The intermediate layer 13 of multilayer construction may be formed by coextrusion, dry lamination or extrusion lamination.

FIG. 3 shows an intermediate layer formed by laminating a first intermediate layer 13a and a second intermediate layer 13b by dry lamination.

For example, when forming the intermediate layer 13 by coextrusion, the intermediate layer 13 consists of two or more sublayers and each sublayer has a thickness in the range of 10 to 100 μm, preferably, in the range of 15 to 25 μm.

The following multilayer structures 1) to 9) are examples of intermediate layers 13 formed by coextrusion. In the following symbolic representations of multilayer intermediate layers 13, sublayers nearer to the barrier layer are nearer to the left end.

1) PEA/HD
2) PEA/PP (melting point: 120° C. or above, preferably, 135° C. or above)
3) PMa/TPX (melting point: 120° C. or above, preferably, 135° C. or above), HD or PP
4) PEA or PPA/PMa (two layers)
5) PEA or PPA/PMa/PEA or PPA (three layers)
6) PEA or PPA/PMa/PMa (three layers)
7) PEA or PPA/PMa/TPX/PMa (four layers)
8) PEA or PPA/PMa/TPX/PMa/PEA or PPA (five layers)
9) PEA or PPA/PMa/PEA or PPA (three layers) The following multilayer structures 1) to 9) are examples of intermediate layers 13 formed by dry lamination and having three or more sublayers including adhesive layers, and the thickness of each sublayer is in the range of 10 to 100 μm, preferably, in the range of 15 to 25 μm. The following additional symbols are used for represent ing the multilayer structures.

Symbols
PET: Polyethylene terephthalate film, PBT: Polybutylene terephthalate film, PEN: Polyethylene naphthalate film, FR: Fluorocarbon resin film 1) PEA, PPA or PMa/HD
2) PEA, PPA or PMa/PP (melting point: 120° C. or above, preferably 135° C. or above)
3) PEA, PPA or PMa/TPX
4) PEA, PPA or PMa/PMa (melting point: 135° C. or above, Vicat softening point: 110° C. or above)
5) PEA, PPA or PMa/PET
6) PEA, PPA or PMa/PBT
7) PEA, PPA or PMa/PEN
8) PEA, PPA or PMa/FR
9) PEA, PPA or PMa/HD, PP, TPX, PMa, PET, PBT, PEN or FR/PEA, PPA or PMa The adhesive layers for laminating the sublayers of the intermediate layers 13 of the foregoing multilayer construction by dry lamination are those used on the side of the inner layer relative to the barrier layer.

An innermost layer 14 included in a lithium battery packaging laminated structure according to the present invention must be heat-adhesive, must be capable of being welded to the metal terminals 3 of a lithium battery module by heat-sealing as shown in FIG. 4(e) and must be unsusceptible to the injurious effect of a filler contained in a package formed from the lithium battery packaging laminated structure. It was known through studies that materials for forming the innermost layer 14 meeting such requirements are unsaturated carboxylic acid graft polyolefin resins, metal ion crosslinked polyethylene resins, copolymers of ethylene or propylene and acrylic acid derivatives, copolymers of ethylene or propylene and methacrylic acid derivatives, derivatives of those resins and mixtures of some of those resins.

Preferably, the innermost layer 14 has a thickness in the range of 10 to 100 am, and formed of a material having a melting point of 70° C. or above and a Vicat softening point of 60° C. is satisfactory. Unsaturated carboxylic acid graft polyolefin resins are particularly satisfactory in adhesion to the terminals 3, heat resistance, cold resistance and workability (ease of forming pouches and emboss forming).

When the thickness of the innermost layer 14 is less than 10 μm, gaps are formed between the battery package and the terminals 3 and the battery package loses the barrier property. The adhesive strength between heat-sealed innermost layers 14 does not increase even if the thickness of the innermost layers is increased beyond 100 μm and the thickness of the laminated structure increases and a package formed from the laminated structure needs an increased space for installation if the thickness of the innermost layer 14 is increased.

Innermost layers 14 of a material having an excessively low melting point and an excessively low Vicat softening point are not heat-resistant and not cold-resistant, adhesive strength between the innermost layers 14 and the terminals 3 are low and the package may be broken.

The followings are possible resins for forming the innermost layer 14 of the lithium battery packaging laminated structure according to the present invention.

Polypropylene Resins
(1) Homopolypropylene resins (melting point: 150° C. or above, Vicat softening point: 140° C. or above)
(2) Ethylene-propylene copolymers (melting point: 110° C. or above, Vicat softening point: 100° C. or above)
Random propylene resins
Graft propylene resins Polyethylene Resins
(3) Low-density polyethylene resins, medium-density polyethylene resins, high-density polypropylene resins, linear low-density polyethylene resins, ethylene-propylene-diene copolymers, ethylene-propylene-butene copolymers and ethylene-α-olefin copolymers (melting point: 90° C. or above, Vicat softening point: 80° C. or above)
(4) Acid-modified polyolefin resins (melting point: 90° C. or above, Vicat softening point: 80° C. or above)
 a) Ethylene-vinyl acetate copolymers
 b) Metal ion crosslinked polyethylene resins and metal ion crosslinked polypropylene resins
 c) Unsaturated carboxylic acid graft polyolefin resins and derivatives of those resins
  Unsaturated carboxylic acid graft polyethylene resins
  Unsaturated carboxylic acid graft polypropylene resins
  Unsaturated carboxylic acid graft poly(methyl pentene) resins
 d) Copolymers of ethylene or propylene and methacrylic acid derivatives and copolymers of ethylene or propylene and acrylic acid derivatives
  Ethylene-methyl methacrylate copolymers (EMAA)
  Ethylene-ethyl methacrylate copolymers (EMA)
  Ethylene-methyl acrylate copolymers (EMAA)
  Ethylene-ethyl acrylate copolymers (EEA)
  Ethylene-acrylic acid copolymers (EAA)

Propylene-ethyl methacrylate (PMA)
Propylene-ethyl acrylate (PAA)

The innermost layer 14 may be either a single-layer film of one of various resins, derivatives of those resins or mixtures of those resins or a multilayer film.

The outermost layer 11, the barrier layer 12, the intermediate layer 13 and the innermost layer 14 of the laminated structure 10 according to the present invention may be formed and the adjacent layers of the laminated structure 10 may be bonded together by a T-die extrusion coating process, a tubular film extrusion process or a coextrusion process. When necessary, a secondary film may be formed by a coating process, an evaporation process, an ultraviolet curing process or an electron beam curing process. The adjacent layers may be bonded together by a dry lamination process, an extrusion coating process, a coextrusion lamination process or a thermal lamination process.

The layers on the outer side of the barrier layer 12 may be laminated by dry lamination using an ordinary adhesive for dry lamination. Preferably, adhesives of compositions, which will be described below, are used for laminating the layers on the inner side of the barrier layer 12.

When the laminated structure 10 for forming a lithium battery package is formed by a dry lamination process, it is possible that the layers are separated by the agency of a polycarbonate solvent contained in the electrolyte of the lithium battery module and the layer bonded to the inner surface of the barrier layer 12 is separated by the agency of hydrofluoric acid produced by the interaction of the lithium salt and water. The inventors of the present invention found through earnest studies that the separation of the layers and the separation of the layer from the surface of the barrier layer can be prevented and a laminated structure having excellent heat resistance can be formed by laminating the layers on the inner side of the barrier layer 12 of the laminated structure 10 by dry lamination using an adhesive of the following composition.

The adhesive is a two-part adhesive including a resin and an accelerator. The resin is a blended resin of a polyester resin consisting of an acid component containing at least two of sebacic acid, isophthalic acid, terephthalic acid, octanedioic acid, nonanedioic acid, undecanedioic acid and palmitic acid, and an alcohol component containing at least one of ethylene glycol, hexanediol and diethylene glycol, and a bisphenol A-type epoxy resin. The accelerator contains a polyisocyanate component (TDI, MDI, IPDI, HDI or XDI). The chemical resistance and organic solvent resistance of the adhesive can be further enhanced by the proper addition of silicon dioxide, calcium carbonate, zinc, minium, lead suboxide, zinc oxide lead cyanamide, zinc chromate, barium potassium chromate and/or barium zinc chromate to the adhesive.

The following are two representative methods of forming the laminated structure 10 of the present invention consisting of the three layers.

1) A method that forms a laminated structure of the outermost layer 11 and the barrier layer 12 as a first substructure by extrusion coating or thermal lamination, and laminates the first and the barrier layer by dry lamination.

2) A method that laminates the outermost layer 11, the barrier layer 12 and the innermost layer 14 by dry lamination.

Adhesives of compositions according to the present invention are used for dry lamination.

The following are two representative methods of forming the laminated structure 10 of the present invention consisting of the four layers.

(1) A method that forms a laminated structure of the outermost layer 11 and the barrier layer 12 as a first substructure and a laminated structure of the intermediate layer 13 and the innermost layer 14 as a second substructure separately by optional methods, and laminates the first and the second substructures by dry lamination. An adhesive of a composition according to the present invention is used for laminating the intermediate layer 13 and the innermost layer 14 by dry lamination.

2) A method that laminates the outermost layer 11, the barrier layer 12, the intermediate layer 13 and the innermost layer 14 by dry lamination. Adhesives of compositions according to the present invention are used for laminating the barrier layer 12 and the intermediate layer 13, and the intermediate layer and the innermost layer 14 by dry lamination.

Either method may be used.

The intermediate layer 13 may be coated with a thin film impermeable to gases, liquids and ions to prevent the permeation of the components of the electrolyte through the barrier layer 12 and to secure stable adhesive strength. The thin film may be a metal thin film, such as an aluminum film, or a metal oxide film, such as an aluminum oxide or a tin oxide film, formed by a sputtering process, a chemical vapor deposition process or a physical vapor deposition process or a resin film, such as a vinylidene chloride film, formed by a coating process.

EXAMPLES

Examples of laminated structures according to the present invention for forming pouches and embossed cases will be described. In the following description, films and processes will be represented by the symbols specified in the description of the foregoing embodiments and the following symbols.

Addition al Symbols
RAM-PP: Random polypropylene film

Numeral appended to a symbol standing for a layer of the laminated structure indicates the thickness (µm) of the layer and a symbol // stands for coextrusion.

The following are adhesives for dry lamination.

DL-1: Takerakku A969V/A-5 (Takeda Yakuhin Kogyo K.K.), an adhesive containing a polyether resin as a principal component DL-2: A polyester polyurethane resin as a principal component containing a carboxylic acid, such as sebacic acid, isophthalic acid or terephthalic acid, a glycol, such as ethylene glycol or hexadiol, isocyanate (IPDI) and an epoxy resin containing bisphenol A, and an accelerator, such as trimethylolpropane, a glycol, such as propylene glycol, dipropylene glycol, glycerin or 1,3-butanediol, isocyanate (TDI) or TDA.

Laminated Structures for Pouches

Example 1

A 12 µm thick biaxially oriented polyester film and a 20 µm thick aluminum foil were laminated by dry lamination using the adhesive DL-1. A 12 µm thick biaxially oriented polyester film was laminated to the aluminum foil by dry lamination using the adhesive DL-2. A 50 µm thick unsaturated graft propylene film was laminated to the biaxially oriented polyester film by dry lamination using the adhesive DL-2 to complete a laminated structure (1) in Example 1.

Laminated structure (1)
OPET12/DL-1/AL20/DL-2/OPET12/DL-2/PPA50

Example 2

A 12 μm thick biaxially oriented polyester film and a 20 μm thick aluminum foil were laminated by dry lamination using the adhesive DL-1 to form a laminate A. A 20 μm thick unsaturated carboxylic acid graft polypropylene film, a 12 μm thick biaxially oriented polyester film and a 50 μm thick unsaturated carboxylic acid graft polypropylene film were laminated by dry lamination using the adhesive DL-2 to form a laminate B. The aluminum foil of the laminate A and the 20 μm thick unsaturated carboxylic acid graft polypropylene film of the laminate B were bonded together by thermal lamination to complete a laminated structure (2) in Example 2. Conditions for the thermal lamination process were temperature: 220° C., pressure: 0.5 MPa and line speed: 30 m/min.

Laminated Structure (2)
OPET12/DL-1/AL20/TL/PPA20/DL-2/OPET12/DL-2/PPA50

Example 3

An acid-resistant film was formed on a 20 μm thick aluminum foil by a phosphating process. A 12 μm thick biaxially oriented polyester film was laminated to the aluminum foil by dry lamination using the adhesive DL-1 to form a laminate A. A two-layer film of a random polypropylene film and a homopolypropylene film was formed by coextrusion and the random polypropylene film of the two-layer film formed by coextrusion was bonded to the aluminum foil of the laminate A by dry lamination using the adhesive DL-2 to complete a laminated structure (3).

Laminated Structure (3)
OPET12/DL-1/AL20/Tr-Ac/DL-2/RAM-PP5//PH55

Laminated Structures for Embossed Packages

Example 4

A 12 μm thick biaxially oriented polyester film, and a 15 μm thick biaxially oriented nylon film and a 50 μm thick aluminum foil were laminated in that order by dry lamination using the adhesive DL-1 to form a laminate A. A 16 μm thick polyester film was laminated to the aluminum foil of the laminate A by dry lamination using the adhesive DL-2, a 50 μm thick unsaturated carboxylic acid graft polyethylene film was laminated to the polyester film by dry lamination using the adhesive DL-2 to complete a laminated structure (4).

Laminated Structure (4)
OPET12/DL-1/ON15/DL-1/AL50/DL-2/PET16/DL-2/PEA50

Example 5

A 12 μm thick biaxially oriented polyester film, a 15 μm thick biaxially oriented nylon film and a 50 μm thick aluminum foil were laminated in that order by dry lamination using the adhesive DL-1 to form a laminate A. A 20 μm thick unsaturated carboxylic acid graft polyethylene film, a 16 μm thick biaxially oriented copolyester film and a 50 μm thick unsaturated carboxylic acid graft polyethylene film were laminated in that order by dry lamination using the adhesive DL-2 to form a laminate B. The aluminum foil of the laminate A and the 20 μm thick graft polyethylene film of the laminate B were bonded together by a thermal lamination process to complete a laminated structure (5). Conditions for the thermal lamination process were temperature: 230° C., pressure: 0.3 MPa and line speed: 25 m/min.

Laminated Structure (5)
PET12/DL-1/ON15/DL-1/AL50/TL/PEA20/DL-2/OPET16/DL-2/PEA50

Example 6

A 6 μm thick polyester film, a 15 μm thick biaxially oriented nylon film and a 50 μm thick aluminum foil processed by a treatment using a chromic-phosphoric solution containing calcium carbonate were laminated in that order by dry lamination using the adhesive DL-1 to form a laminate A. A two-layer film of a random polypropylene film and a homopropylene film was formed by coextrusion and the random polypropylene film of the two-layer film was bonded to the aluminum foil of the laminate A by dry lamination using the adhesive DL-2 to form a laminated structure (6).

Laminated Structure (6)
OPET12/DL-1/ON15/DL-1/AL50/Tr-Co-PAc-cr/DL-2/PR5//PH25

The PET16 as an intermediate layer in the laminated structures (4) and (5) is a polyethylene terephthalate copolymer.

The adhesive DL-2 having a composition according to the present invention was used for bonding together the layers on the side of the innermost layer 14 with respect to the barrier layer 12 in the laminated structures (1) to (6) and the adhesive DL-1 of an ordinary composition was used for bonding together the layers on the outer side of the barrier layer.

Pouches and embossed cases were made from the laminated structures (1) to (6), and lithium battery modules were sealed in the pouches and the embossed cases, respectively, to form lithium batteries and the lithium batteries were tested. The laminated structures satisfied all the requirements of the lithium battery package.

The laminated structures formed by using the adhesive of the composition according to the present invention were used as lithium battery packaging laminated structures. The laminated structures were not delaminated by the agency of a polycarbonate solvent contained in the lithium battery modules and each of the layers bonded to the surface of the barrier layer on the side of the innermost layer was not separated by the adverse effect of hydrofluoric acid produced by the interaction of a lithium salt contained in the lithium battery module and moisture penetrated into the lithium battery. The lithium battery formed by sealing a lithium battery module in a pouch formed from the lithium battery packaging laminated structure of the present invention was flexible, was lighter than a lithium battery employing a metal can, could be formed in a small thickness and reduced space necessary for containing a battery. The battery packaging laminated structure of the present invention had a high barrier property, was capable of maintaining the barrier property for a long time and was excellent in heat resistance, cold resistance and chemicals unsusceptibility.

Seventh Embodiment

A seventh embodiment of the present invention will be described herein after. The seventh embodiment is substantially the same as the sixth embodiment previously described with reference to FIGS. 1 to 6, except that laminated structures in the seventh embodiment are different from those in the sixth embodiment only in construction. Therefore, the seventh embodiment will be described with reference to FIGS. 1 to 6, in which parts like or corresponding to those of the sixth embodiment are denoted by the same reference characters and the description thereof will be omitted.

A protective layer 15 may contain a phosphate film forming substance, such as zinc phosphate, iron phosphate, manganese phosphate, calcium phosphate, chromium phosphate or silica phosphate, a fluoride film forming substance, titanium fluoride or zinc fluoride and/or an adhesive property improving substance for improving the adhesive property of an aluminum foil, such as a coupling agent, a silane coupling agent, an organotitanium coupling agent or an organo aluminum coupling agent.

The chemical resistance and organic solvent resistance of the protective layer 15 can be further improved by adding silicon dioxide, calcium carbonate, zinc, minium, lead suboxide, zinc oxide lead cyanamide, zinc chromate, barium potassium chromate or barium zinc chromate to the protective layer 15. Silicon dioxide, calcium carbonate, zinc, minium, lead suboxide, zinc oxide lead cyanamide, zinc chromate, barium potassium chromate and barium zinc chromate are capable of reacting with hydrogen fluoride (HF) produced by the interaction of an electrolyte and moisture to absorb and adsorb hydrogen fluoride and of preventing the corrosion of a barrier layer (aluminum foil) by hydrogen fluoride.

Preferably, an innermost layer 14 included in a lithium battery packaging laminated structure according to the present invention is formed of a resin having a melting point of 70° C. or above and a Vicat softening point of 60° C. or above, such as an olefin resin, an unsaturated carboxylic acid graft polyolefin resin, a metal ion crosslinked polyethylene resin, a copolymer of ethylene or propylene and an acrylic acid derivative, a copolymer of ethylene or propylene and a methacrylic acid derivative, a derivative of one of those resins or a mixture of some of those resins, and has a thickness of 20 µm or above.

When forming a pouch or an embossed case, terminals 3 of a lithium battery module are sandwiched between the innermost layers 14 and the innermost layers 14 are welded together to form a sealed system. However, welded portions of the olefin resin forming the innermost layers becomes brittle and cracks and pinholes are liable to be formed therein. The thickness of the innermost layer is reduced by a value corresponding to the thickness of tabs covering the terminals when the innermost layers are welded to the tabs to prevent forming pinholes. If the innermost layer is formed of a single layer of an olefin resin having a high melting point to enhance the heat resistance of the innermost layer, a high pressure and heat of a high temperature must be applied for a long time to the innermost layers to weld the innermost layers together by welding. Such a welding process deteriorates the characteristic of the lithium battery module and deteriorates the function of the battery package by causing the shrinkage of the other component layer, such as the outermost layer of a polyester resin or a nylon resin, by heat.

The inventors of the present invention made studies to solve such a problem and found that it is effective in solving such a problem to form the innermost layer 14 in a multilayer structure consisting of a first layer 14*a* and a second layer 14*b*. More concretely, the following multilayer structures can be used as the innermost layer.

(1) Film of an olefin resin or a derivative of an olefin resin/Unsaturated graft polyolefin film (2) Film of an olefin resin or a derivative of an olefin resin/film of a copolymer of ethylene and an acrylic acid derivative or a copolymer of ethylene and a methacrylic acid derivative (3) Film of an olefin resin or a derivative of an olefin resin/Metal ion crosslinked polyethylene or metal ion crosslinked polypropylene film The following are representative olefin resins.

a) Polypropylene resins

1) Homopolypropylene (melting point: 150° C. or above, Vicat softening point: 140° C. or above)

2) Ethylene-propylene copolymer (random propylene or graft propylene copolymer having a melting point of 110° C. or above and a Vicat softening point of 100° C. or above)

b) polyethylene resins

3) Low-density polyethylene, medium-density polyethylene, high-density polyethylene, linear low-density polyethylene, ethylene-propylene-diene copolymer ethylene-propylene-butene copolymer and ethylene-α-olefin copolymer produced through polymerization using a single-site catalyst (melting point: 90° C. or above, Vicat softening point: 80° C.)

Acid-denatured polyolefin resins (melting point: 90° C. or above, Vicat softening point: 80° C.)

a) Ethylene-vinyl acetate copolymers b) Metal ion crosslinked polyethylene, metal ion crosslinked polypropylene c) Unsaturated graft polyolefins including unsaturated carboxylic acid graft polyethylene, unsaturated carboxylic acid graft polypropylene and unsaturated carboxylic acid graft poly(methyl pentene), and derivatives of those polymers d) Copolymers of ethylene or propylene and methacrylic acid derivatives or acrylic acid derivatives, including ethylene-methyl methacrylate copolymers (EMMA), ethylene-ethyl methacrylate copolymers (EMA), ethylene-methyl acrylate copolymers (EMAA), ethylene-ethyl acrylate copolymers (EEA), ethylene-acrylate copolymers (EAA), propylene-ethyl methacrylate (PMA) and propylene-ethyl acrylate (PAA)

The following multilayer structures may be used as the multilayer innermost layer 14.

(1) Low-density polyethylene or linear low-density polyethylene/Copolymer of ethylene and a methacrylic acid derivative or an acrylic acid derivative (2) Ethylene-propylene copolymer/Copolymer of propylene and a methacrylic acid derivative or an acrylic acid derivative (3) Low-density polyethylene or linear low-density polyethylene/Metal crosslinked polyethylene (4) Ethylene-propylene copolymer/Metal crosslinked propylene (5) Random propylene/Unsaturated carboxylic acid graft homopropylene (6) Graft propylene/Unsaturated carboxylic acid graft homopropylene (7) Homopropylene/Unsaturated graft random or graft propylene (8) Random or graft propylene/Homopropylene (9) Ethylene-propylene copolymer/Polyethylene/ethylene-propylene copolymer

(10) Ethylene-propylene copolymer/Polyethylene/Unsaturated graft polyethylene

The outermost layer 11, the barrier layer 12, the intermediate layer 13 and the innermost layer 14 of the lithium battery packaging laminated structure according to the present invention may be formed and laminated by a T-die extrusion process, a tubular film extrusion process or a coextrusion process. When necessary, a secondary film may be formed by a coating process, an evaporation process, an ultraviolet curing process or an electron beam curing process.

The adjacent layers may be bonded together by dry lamination, extrusion coating, coextrusion lamination or thermal lamination.

Possible adhesives for dry lamination are polyester adhesives, polyethylene-imine adhesives, polyether adhesives, cyanoacrylate adhesives, urethane adhesives, organic titanium compound adhesives, polyether-urethane adhesives, epoxy adhesives, polyester-urethane adhesives, imide adhesives, isocyanate adhesives, polyolefin adhesives and silicone adhesives. An adhesive of the foregoing composition is used for laminating the layers of a laminated structure on the side of the inner layer with respect to the barrier layer.

When the laminated structure for forming a lithium battery package is formed by a dry lamination process, it is possible that the layers are separated by the agency of a polycarbonate solvent contained in the electrolyte of the lithium battery module and the layer bonded to the inner surface of the barrier layer is separated by the agency of hydrogen fluoride produced by the interaction of the lithium salt and water. The inventors of the present invention found through earnest studies that the delamination of the laminated structure and the separation of the layer from the barrier layer can be prevented by laminating the layers on the inner side of the barrier layer of the laminated structure by dry lamination using an adhesive of the following composition.

The adhesive is a two-part adhesive including a resin as a principal component, and an accelerator. The resin contains a carboxylic acid, such as sebacic acid, isophthalic acid, terephthalic acid, octanedioic acid, nonanedioic acid, undecanedioic acid or palmitic acid, a glycol, such as ethylene glycol, hexanediol or diethylene glycol, and a isocyanate, such as IPDI. The accelerator contains a glycol, such as trimethylolpropane, propylene glycol, dipropylene glycol, glycerin or 1,3-butanediol, isocyanate (TDI), and TDA.

At least one of silicon dioxide ($SiO_2$), calcium carbonate, zinc, minium, zinc suboxide, zinc oxide lead cyanamide, zinc chromate, barium potassium chromate and barium zinc chromate may be added to the adhesive for dry lamination for the further improvement of chemical resistance and organic solvent resistance. Silicon dioxide, calcium carbonate, zinc, minium, zinc suboxide, zinc oxide lead cyanamide, zinc chromate, barium potassium chromate and barium zinc chromate are capable of reacting with hydrogen fluoride (HF) produced by the interaction of an electrolyte and moisture to absorb and adsorb hydrogen fluoride.

An adhesive of the foregoing composition is used for laminating the layers on the inner side of the barrier layer. The layers on the outer side of the barrier layer may be laminated by a dry lamination process using an ordinary adhesive for dry lamination.

An adhesive film having a thickness of about 1 μm and formed of one of polyester adhesives, polyether adhesives, urethane adhesives, polyether-urethane adhesives, polyester-urethane adhesives, isocyanate adhesives, polyolefin adhesives, polyethylene-imine adhesives, cyanoacrylate adhesives, organic titanium compound adhesives, epoxy adhesives, imide adhesives, silicone adhesives, derivatives of those adhesives and mixtures of some of those adhesives may be used when laminating the adjacent layers by extrusion lamination to stabilize the adhesive strength between the layers or the layers may be subjected to a surface activating process, such as an ozonation process.

An unsaturated carboxylic acid graft polyolefin resin used for coextrusion lamination or thermal lamination improves adhesive property and resistance to the injurious effect of the package filler.

EXAMPLES

Examples of laminated structures according to the present invention for forming pouches and embossed cases will be described. In the following description, materials of films and processes will be represented by the symbols specified in the description of the foregoing embodiments.

The following are adhesives for dry lamination.

DL-1: Takerakku A969V/A-5 (Takeda Yakuhin Kogyo K.K.), an adhesive containing a polyether resin as a principal component DL-2: A polyester polyurethane resin as a principal component containing a carboxylic acid, such as sebacic acid, isophthalic acid or terephthalic acid, a glycol, such as ethylene glycol or hexadiol, isocyanate (IPDI) and an epoxy resin containing bisphenol A, and an accelerator, such as trimethylolpropane, a glycol, such as propylene glycol, dipropylene glycol, glycerin or 1,3-butanediol, isocyanate (TDI) and TDA.

Laminated Structures for Pouches

Example 1

A 12 μm thick biaxially oriented polyester film and a 20 μm thick aluminum foil were laminated by dry lamination using the adhesive DL-1 to form a laminate A. A coextruded film of a random polypropylene film and an unsaturated carboxylic acid graft polypropylene film was formed by coextrusion. A 12 μm thick biaxially oriented polyester film was laminated to the aluminum foil of the laminate A by dry lamination sing the adhesive DL-2. The random polypropylene film of the coextruded film was laminated to the 12 μm thick biaxially oriented polyester film by dry lamination using the adhesive DL-2 to complete a laminated structure (1) in Example 1.

Laminated Structure (1)

OPET12/DL-1/AL20/DL-2/OPET12/DL-2/PR30//PPA20

Example 2

A 12 μm thick biaxially oriented polyester film and a 20 μm thick aluminum foil were laminated by dry lamination using the adhesive DL-1 to form a laminate A. A 20 μm thick unsaturated carboxylic acid graft polypropylene film, a 12 μm thick biaxially oriented polyester film and a coextruded film of a random polypropylene film and an unsaturated carboxylic acid graft polypropylene film were laminated by dry lamination using the adhesive DL-2 to form a laminate B. The aluminum foil of the laminate A and the 20 μm thick unsaturated carboxylic acid graft polypropylene film of the laminate B were bonded together by thermal lamination to complete a laminated structure (2) in Example 2. Conditions for the thermal lamination process were temperature: 250° C., pressure: 0.6 MPa and line speed: 20 m/min.

Laminated Structure (2)

OPET12/DL-1/AL20/TL/PPA20/DL-2/OPET12/DL-2/PR25//PPA25

Example 3

An acid-resistant film was formed on a 20 μm thick aluminum foil by a phosphating process. A 12 μm thick biaxially oriented polyester film was laminated to the aluminum foil by dry lamination using the adhesive DL-1 to form a laminate A. A coextruded film of a random polypropylene film and a homopolypropylene film was formed by coextrusion and the random polypropylene film of the two-layer film formed by coextrusion was bonded to the aluminum foil of the laminate A by dry lamination using the adhesive DL-2 to complete a laminated structure (3).

Laminated Structure (3)
OPET12/DL-1/AL20/Tr-Ac/DL-2/RAM-PP5//PH25
Laminated Structures for Embossed Packages

Example 4

A 12 μm thick biaxially oriented polyester film, and a 15 μm thick biaxially oriented nylon film and a 50 μm thick aluminum foil were laminated in that order by dry lamination using the adhesive DL-1 to form a laminate A. A coextruded film of a polyethylene film and an unsaturated carboxylic acid graft polyethylene film was formed by coextrusion. A 16 μm thick polyester film was laminated to the aluminum foil of the laminate A by dry lamination using the adhesive DL-2, and the polyethylene film of the coextruded film was laminated to the 16 μm thick polyester film by dry lamination using the adhesive DL-2 to complete a laminated structure (4).

Laminated Structure (4)
OPET12/DL-1/ON15/DL-1/AL50/DL-2/PET16/DL-2/PE30//PEA20

Example 5

A 12 μm thick biaxially oriented polyester film, a 15 μm thick biaxially oriented nylon film and a 50 μm thick aluminum foil were laminated in that order by dry lamination using the adhesive DL-1 to form a laminate A. A 20 μm thick unsaturated carboxylic acid graft polypropylene film, a 16 μm thick biaxially oriented copolyester film and a 50 μm thick coextruded film of a polyethylene film and an unsaturated carboxylic acid graft polyethylene film were laminated in that order by dry lamination using the adhesive DL-2 to form a laminate B. The aluminum foil of the laminate A and the 20 μm thick graft polyethylene film of the laminate B were bonded together by a thermal lamination process to complete a laminated structure (5). Conditions for the thermal lamination process were temperature: 200 to 250° C., pressure: 0.6 MPa and line speed: 25 m/min.

Laminated Structure (5)
PET12/DL-1/ON15/DL-1/AL50/TL/PPA20/DL-2/PET16/DL-2/PE25//PEA25

Example 6

A 3 μm thick acrylic resin film was formed by a coating process on an outer surface of a 15 μm thick biaxially oriented nylon film. A 50 μm thick aluminum foil surface-treated with a chromium phosphate solution containing calcium carbonate and the 15 μm thick biaxially oriented nylon film were laminated by dry lamination using the adhesive DL-1 to form a laminate A. A coextruded film of a random polypropylene film and a homopropylene film was formed by coextrusion, and the random polypropylene film of the coextruded film was bonded to the aluminum foil of the laminate A by dry lamination using the adhesive DL-2 to form a laminated structure (6).

Laminated Structure (6)
OPET12/DL-1/ON15/DL-1/AL50/Tr-Co-PAc-cr/DL-2/PR5//PH25

The PET16 as an intermediate layer in the laminated structures (4) and (5) is a copolyester film.

Although the adhesive DL-1 may have any composition, the adhesive DL-2 has a composition specified by the present invention. Whereas cracks are formed in the single-layer innermost layer of a resin capable of being bonded to metal members, any cracks were not formed in the multi-layer innermost layer of the laminated structure of the present invention and the innermost layer had a stable sealing property. The lithium battery formed by sealing a lithium battery module in a pouch formed from the lithium battery packaging laminated structure of the present invention was flexible, was lighter than a lithium battery employing a metal can, could be formed in a small thickness and reduced space necessary for containing a battery. The battery packaging laminated structure of the present invention had a high barrier property, was capable of maintaining the barrier property for a long time and was excellent in heat resistance, cold resistance and chemicals unsusceptibility.

Eighth Embodiment

Figure 10:
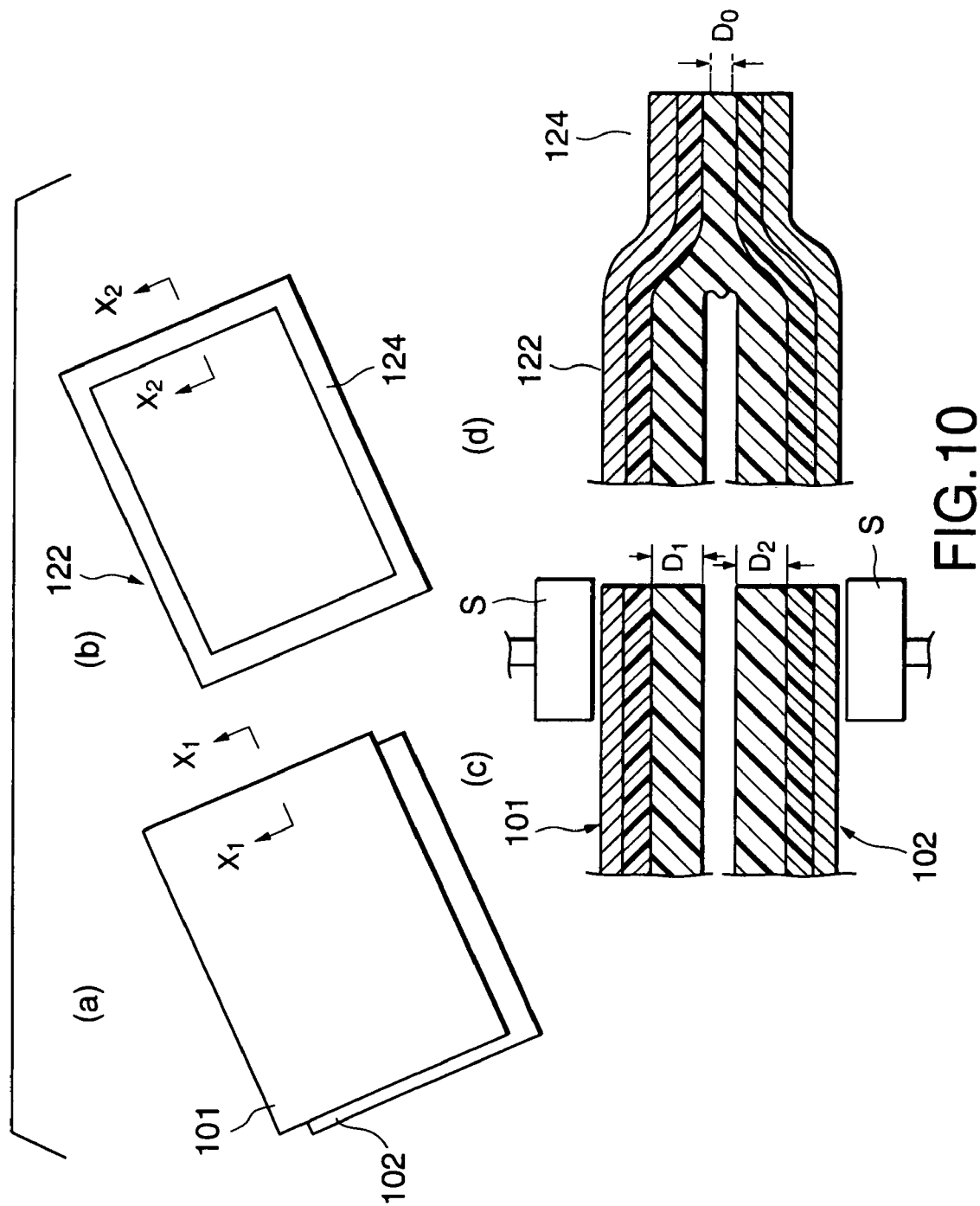
FIG. 10 is a view of a battery packaging laminated structure and a battery pouch in preferred embodiment according to the present invention.
Figure 11:
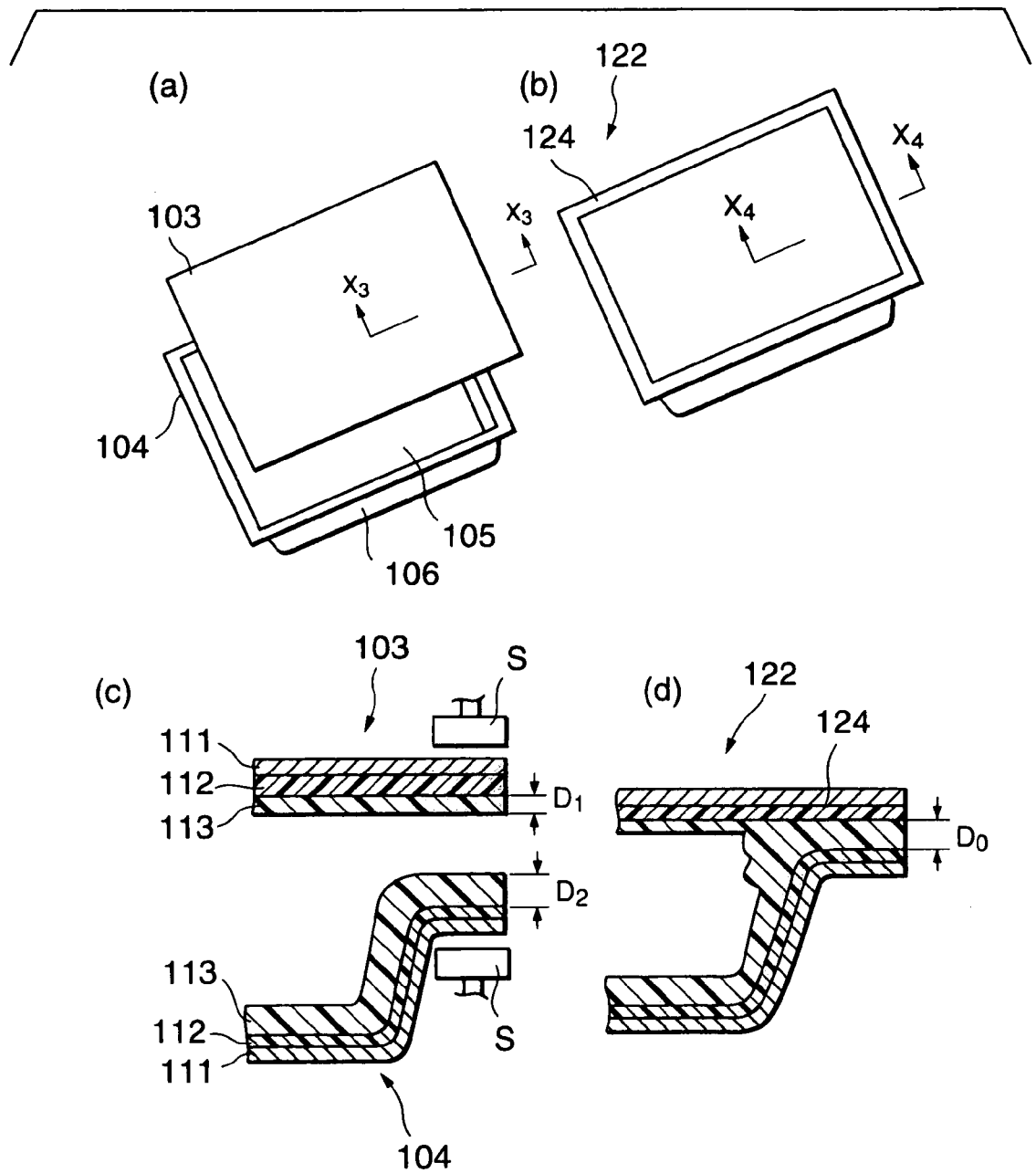
FIG. 11 is a view of a battery packaging laminated structure and a battery pouch in a modifications of the battery packaging laminated structure and the battery pouch according to the present invention.
Figure 12:
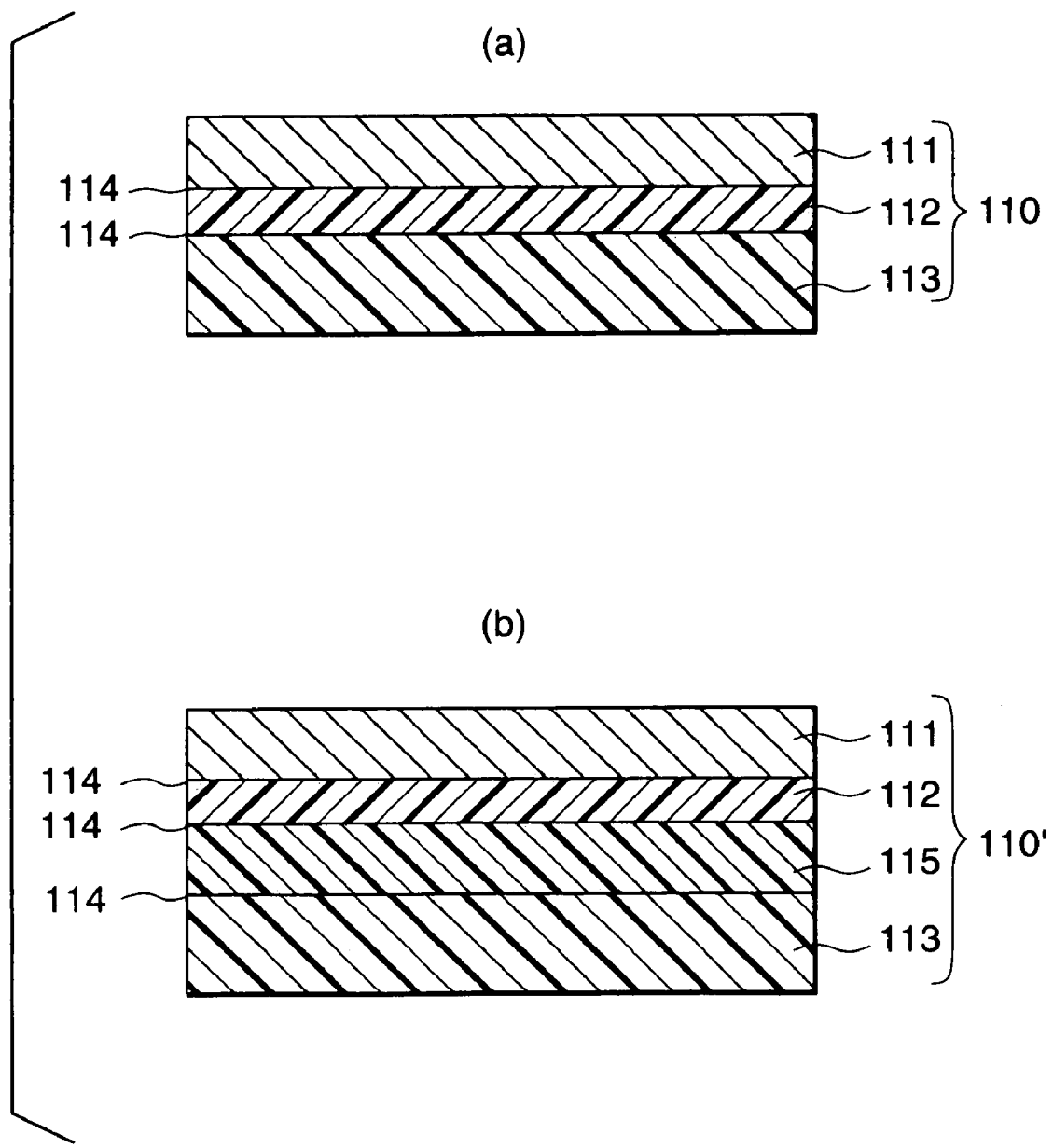
FIG. 12 is a view of battery packaging laminated structure.
Figure 13:
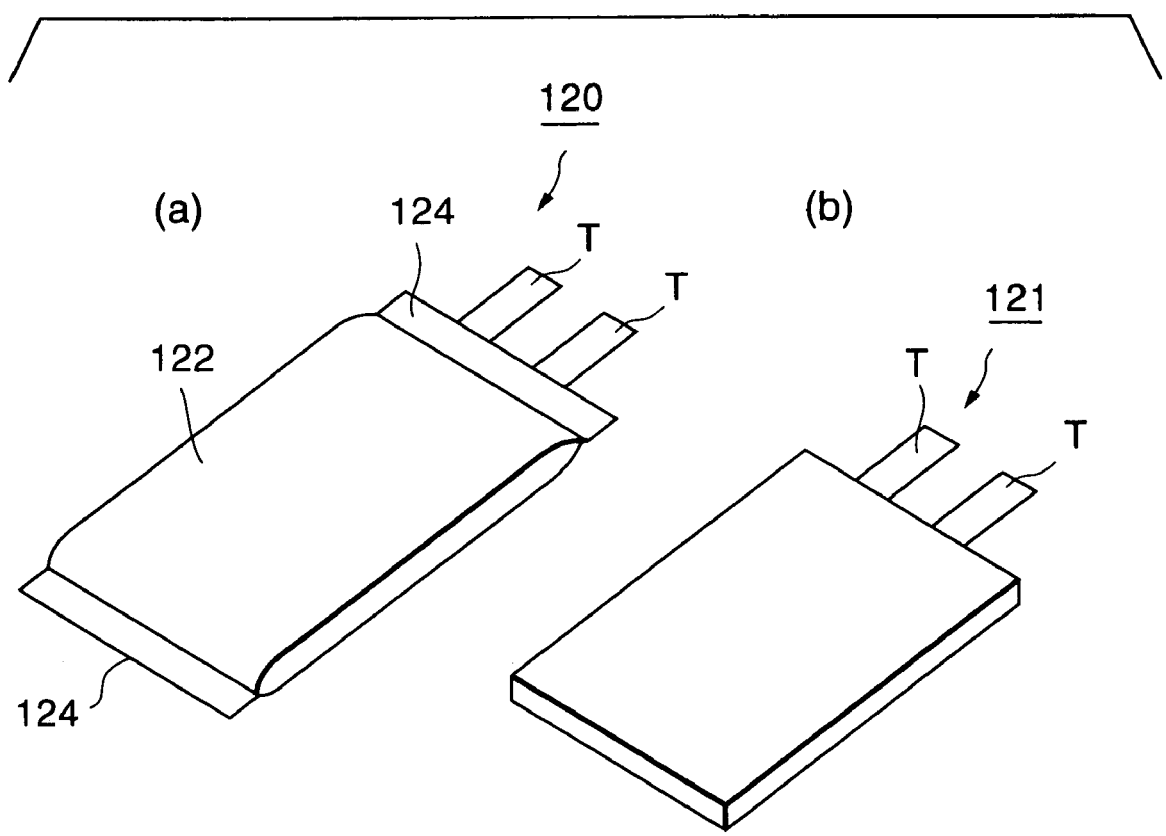
FIG. 13 is a perspective view of lithium batteries employing battery pouches according to the present invention.
Figure 14:
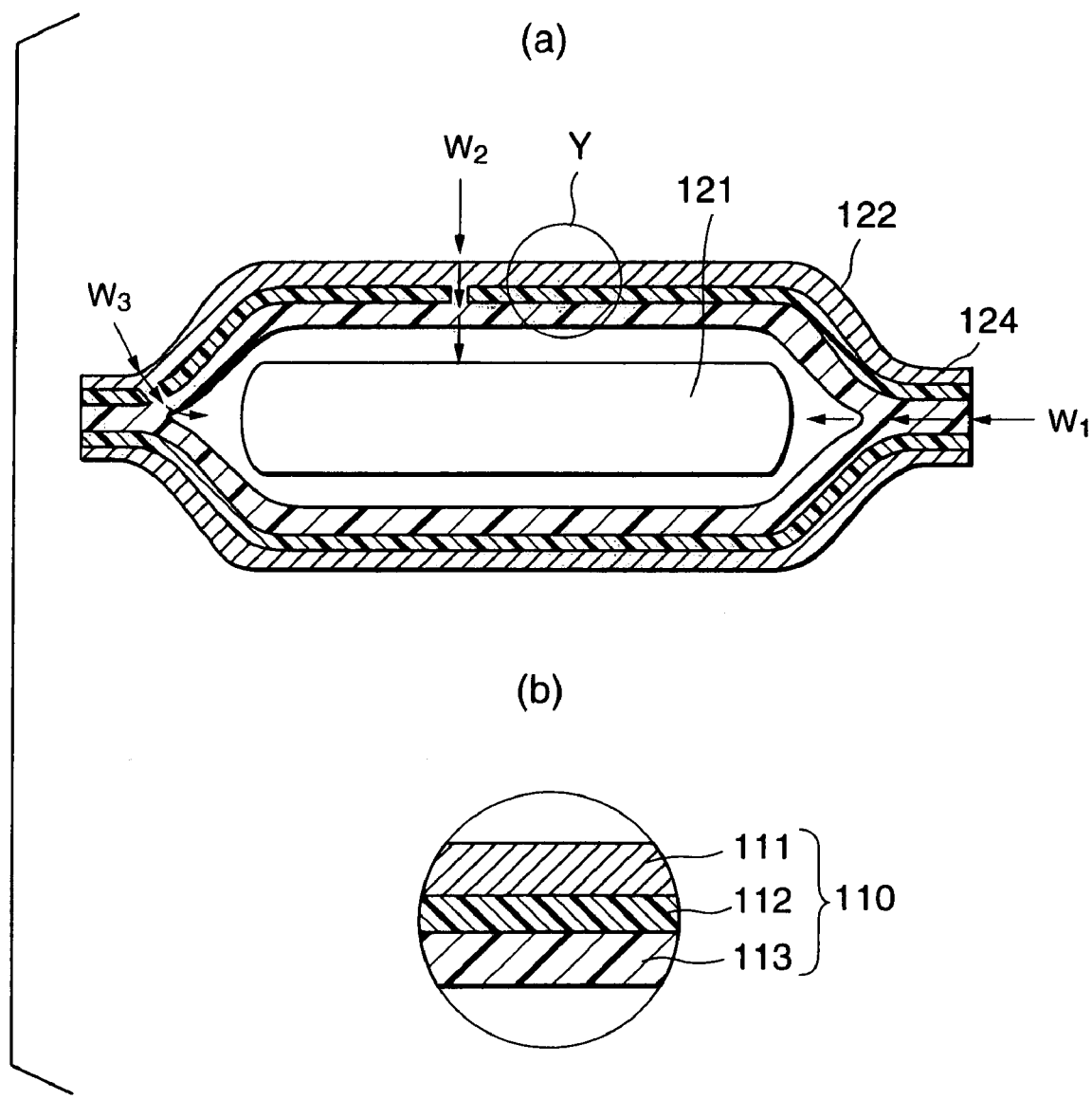
FIG. 14 is a typical view of assistance in explaining the penetration of moisture or the like into a battery pouch.
Figure 15:
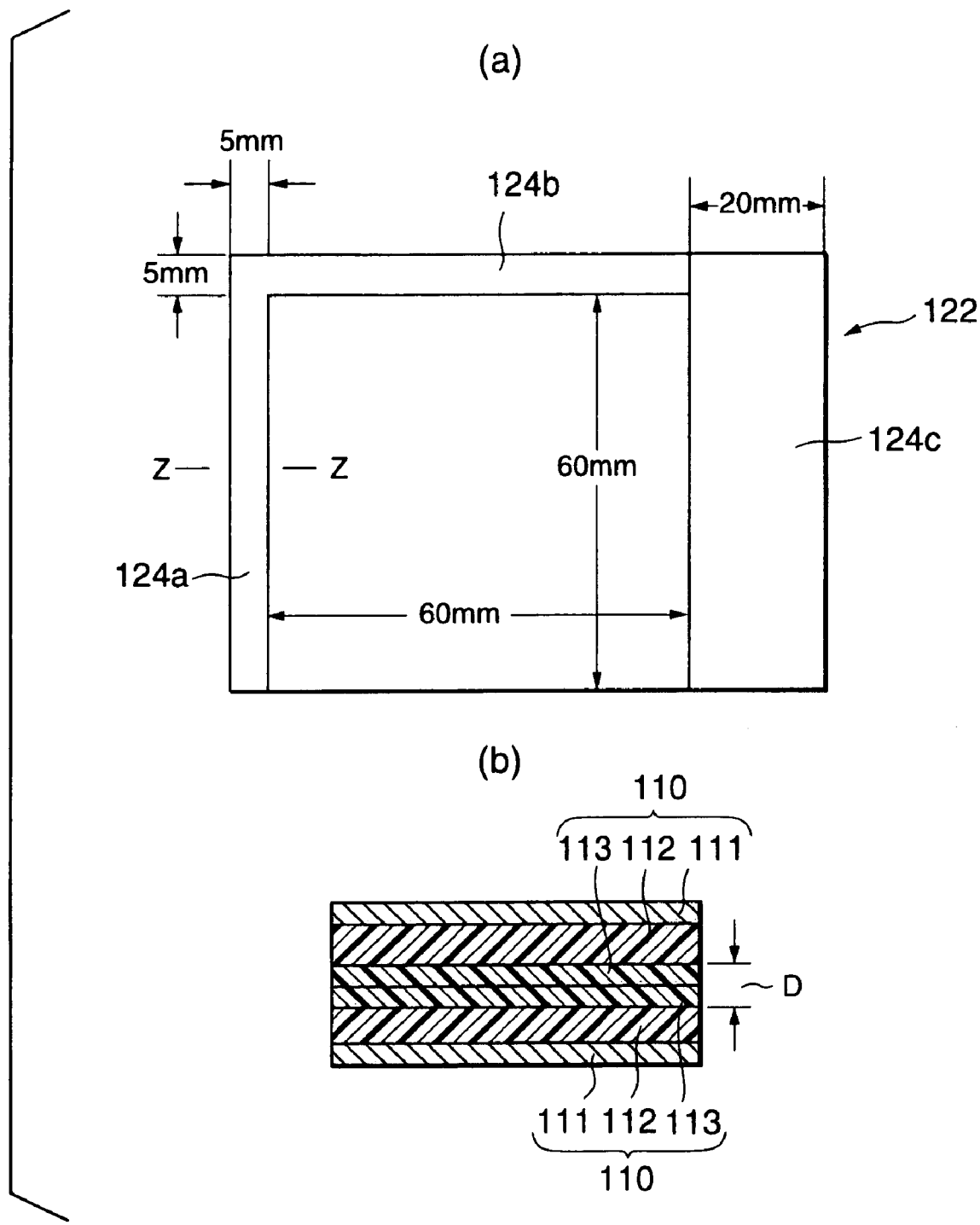
FIG. 15 is a view of a battery pouch according to the present invention subjected to a moisture-proof performance test.
Figure 16:
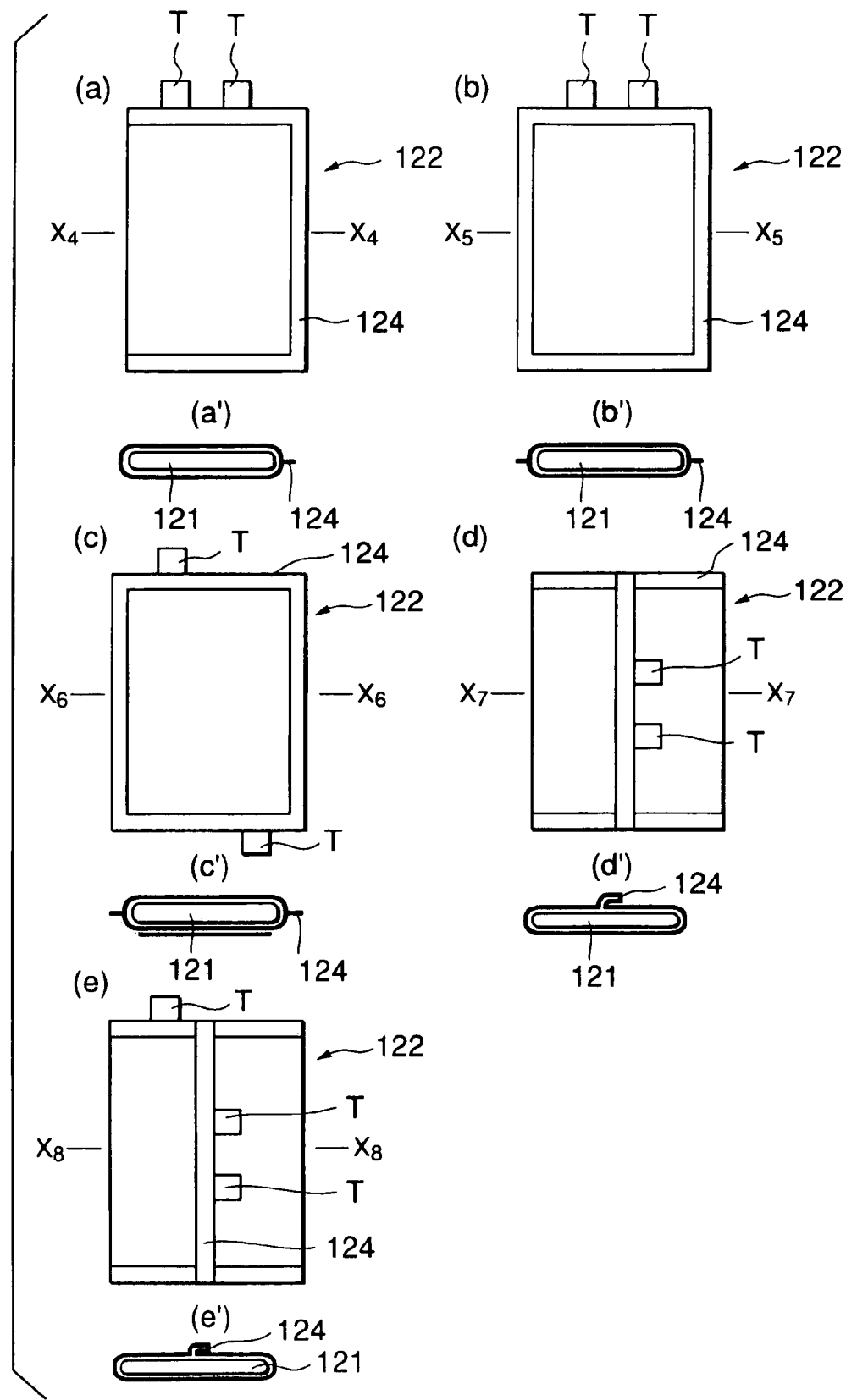
FIG. 16 is a view of battery pouches according to the present invention.
Figure 17:
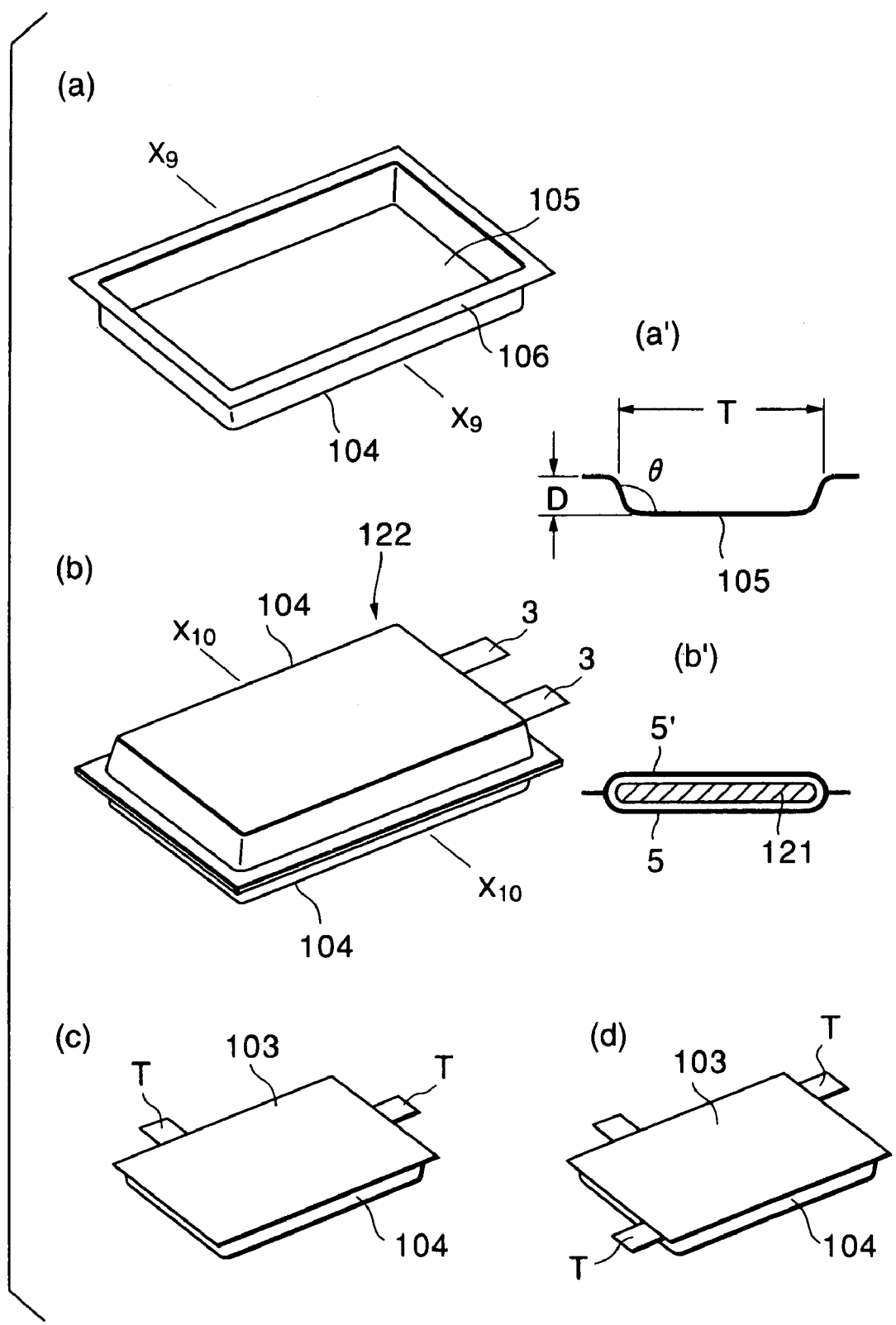
FIG. 17 is a view of embossed battery packages according to the present invention.

An eighth embodiment of the present invention will be described with reference to FIGS. 10 to 17. FIGS. 10(a) to 10(d) show a pouch according to the present invention, in which FIG. 10(a) is a perspective view of two films to be joined together by heat-sealing, FIG. 10(b) is a view of a pouch formed by heat-sealing, FIG. 10(c) is an enlarged sectional view taken on line X$_1$-X$_1$ in FIG. 10(b) and FIG. 10(d) is an enlarged sectional view taken on line X$_2$-X$_2$ in FIG. 10(b). FIGS. 11(a) to 11(c) show an embossed case according to the present invention, in which FIG. 11(a) is a perspective view of an embossed container and a cover to be joined to the embossed container, FIG. 11(b) is an embossed case formed by bonding the cover to the container, FIG. 11(c) is an enlarged sectional view taken on line X$_3$-X$_3$ in FIG. 11(b) and FIG. 11(d) is an enlarged sectional view taken on line X$_4$-X$_4$ in FIG. 11(b). FIG. 12(a) is a typical sectional view of a three-layer laminated structure and 12(b) is a typical sectional view of a four-layer laminated structure. FIGS. 13(a) and 13(b) are perspective views of a lithium battery employing a pouch according to the present invention. FIGS. 14(a) and 14(b) are typical views of assistance in explaining a sealed system having a package formed from an impermeable packaging laminated structure and penetration of moisture into the sealed system, in which FIG. 14(a) is a sectional view of a sealed system and FIG. 14(b) is an enlarged view of a portion Y in FIG. 14(a). FIG. 15(a) is a plan view of a pouch according to the present invention subjected to a moisture-proof test and FIG. 15(b) is sectional view taken on line Z-Z in FIG. 15(a). FIGS. 16(a) to 16(e') are views of lithium batteries employing pouches according to the present invention, in which FIGS. 16(a) and 16(a') are views of a three-sided seal pouch, FIGS. 16(b) and 16(b') are views of a four-sided seal pouch and FIGS. 16(c), 16(c'), 16(d), 16(d'), 16(e) and 16(e') are views of pillow type pouches, FIGS. 17(a) and 17 (a') are views of a container included in an embossed case, FIGS. 17(b) and 17(b') are views of a embossed case formed by joining together a pair of containers, and FIGS. 17(c) and 17(d) are views of batteries having tabs projecting outside from different positions.

A laminated structure 110 according to the present invention shown in FIG. 12(a) has a base layer 111, a barrier layer 112 and a heat-adhesive layer 113, which are superposed and laminated in that order. A laminated structure 110' according to the present invention shown in FIG. 12(b) has a base layer 111, a barrier layer 112, an intermediate layer 115 and a heat-adhesive resin layer 113, which are superposed and laminated in that order. The layers 111, 112, 113 and 115 are bonded together with adhesive layers 114. The laminated structures 110 and 110' are used for forming lithium battery packaging pouches (packages) and the like.

Basically, the base layer 111 is formed of an insulating resin layer because the same touches devices (hardware) in use. Desirably, the base layer 111 is an oriented polyester or nylon film of a thickness of 6 μm or above in view of preventing the formation of pinholes while the laminated structure is processed.

The barrier layer 112 must have a high barrier property. Preferably, the barrier layer 112 is formed from a metal foil, an impermeable resin film or a film coated with a metal film or an inorganic oxide formed by evaporation. A preferable metal foil is an aluminum foil having a thickness of, for example, 15 μm or above and an iron content of 0.5% or above.

Possible films having a barrier property are vinylidene chloride films, acrylonitrile films and fluorocarbon resin films. Films coated with a film of a metal, such as aluminum, or an inorganic oxide, such as aluminum oxide or a silicon dioxide, deposited by evaporation may be used as the barrier layer.

The laminated structure 110' has the intermediate layer 115. Desirably, the intermediate layer 115 includes at least one layer having a thickness of 10 μm or above and formed of a polyester resin, a polyolefin resin, a nylon resin or a fluorocarbon resin to prevent contact (short circuit) between tabs T of a lithium battery module 121 and the barrier layer 112 (metal foil) when a pouch 122 is formed from the laminated structure 110', the lithium battery module 121 is put in the pouch 122 and heat-sealed portions 124 are formed by heat-sealing to form a lithium battery 120. The intermediate layer 115 may be of either single-layer construction or multilayer construction.

When the laminated structure 110 or 110' is used for forming a package for a lithium battery, the heat-adhesive resin layer 113 must be capable of being bonded to the tabs T of a lithium battery module, heat-resistant, cold-resistant and workable (easy to be worked to form pouches or easy to be formed). Desirably, the heat-adhesive resin layer 113 is a film having a thickness of 20 μm or above and formed of an unsaturated carboxylic acid graft polyolefin resin having a melting point of 80° C. or above and a Vicat softening point of 70° C. or above, such as an unsaturated carboxylic acid graft polyethylene resin, an unsaturated carboxylic acid graft polypropylene resin or an unsaturated carboxylic acid graft poly(methyl pentene) resin.

When the thickness of the heat-adhesive resin layer 113 is less than 20 μm, gaps are formed in portions of the battery package near the opposite sides of the tabs T and the battery package loses the barrier property. If the heat-adhesive resin layer 113 is formed of a material having an excessively low melting point and an excessively low Vicat softening point, the heat-adhesive resin layer 113 is not heat-resistant and not cold-resistant, the adhesive strength between the heat-adhesive resin layers 113, and the adhesive strength between the heat-adhesive resin layer 113 and the tabs T are low and the package may break.

The component layers 111, 112, 113 and 115 of the laminated structure according to the present invention may be processed by a surface activating or a surface in activating process, such as a corona discharge process, a blasting process, an oxidizing process or an ozonation process, to improve and stabilize properties needed for film formation, lamination and final product forming (embossing or pouch fabrication) or at least one of organic and inorganic metal additives including a moisture-absorbent substance, such as a desiccant, a gas-impermeable and gas adsorbing agent impermeable to and capable of adsorbing gases, such as oxygen gas and nitrogen gas, a flame retarder, an antistatic agent, such as carbon, a surface-active agent or an inorganic oxide, a conductive material and an electromagnetic shielding material may be added to the component layers or a liquid containing at least one of those materials may be applied in a coat to the component layers.

When the laminated structures 110 and 110' are used for forming packages for lithium batteries, the laminated structures 110 and 110' must be highly moisture-proof. Packages for lithium batteries are expected to meet the following requirements relating to impermeability.

(1) Allowable moisture penetration:
350 ppm/w or below at 60° C. and 95% RH in one month
(2) Adhesive strength between the component layers:
100 g/15 mm or above after storage at 60° C. for one month after electrolyte filling
(3) Electrolyte evaporation:
10 mg or below after storage at 60° C. for one month The requirement (2) specifying an necessary adhesive strength between the component layers must be met to avoid the deterioration of the moisture-proof property due to the separation of the bonded layers caused by a substance produce by the interaction between a component of the electrolyte and moisture penetrated the package and is a requisite condition for the moisture-proof property of the package.

The requirement (3) relates to an ability to suppress the dissipation of the components of the electrolyte, which is one of the effects of the present invention.

The following are causes that allow the penetration of moisture into the pouch (package) 122.

(a) Insufficient moisture-impermeability of the layers of the laminated structure forming the package 122 and pinholes in the layers
(b) Improperly joined heat-bonded portions formed in the package 122 formed from the laminated structure The penetration of moisture into the package 122 attributable to the cause (a) can be perfectly or nearly perfectly prevented by properly determining the material and the thickness of the barrier layers 112 of the laminated structures 110 and 110'. However, slight penetration of moisture into the package 122 attributable to the cause (b) is unavoidable as long as a heat-adhesive resin layer is exposed in a cut edge of the laminated structure forming the package 122.

The inventors of the present invention found through studies to improve the moisture-proof property of a package sealed by heat adhesion that the permeation of moisture through the edge of a sealed part of a package can be greatly reduced when the thickness of bonded portions of the laminated structure is ½ or below that of the same portions before bonding and have made the present invention on the basis of the finding.

In the pouch 122 (package of a lithium battery) formed from the laminated structure 110 or 110', the thickness of the heat-adhesive layer 113, i.e., the innermost layer, is ½ or below of the thickness of the heat-adhesive layer 113 before bonding.

Generally, the heat-adhesive layers 113 of the same thickness and the same material are bonded together by heat adhesion When portions of heat-adhesive layers respectively having different thicknesses are heat-bonded together in a bonded part to form a pouch, moisture is hardly able to permeate through a cut edge of the bonded part and the pouch is highly moisture-proof when the thickness of the bonded part is ½ or below of the sum of the thicknesses of the heat-adhesive layers.

The rate of penetration of moisture into the pouch formed from a laminated structure through an edge of the bonded part is dependent on the volume of the bonded part, particularly, on the volume of the portions of the innermost layers 113 corresponding to the bonded part. According to Fick's law, the rate of permeation of a polymer through a layer is proportional to the thickness of the layer provided that the moving distance of moisture is fixed. In a bonded part having a fixed are a, the smaller the thickness of the innermost layer 113 after bonding, the less is the amount of moisture that penetrates the innermost layer 113. That is, when a sealed package is formed by bonding together the innermost layers of a heat-adhesive resin of laminated structures as packaging laminated structures, the thickness $D_0$ of the innermost layers before bonding and the thickness $D$ of heat-bonded portions of the same innermost layers must meet an inequality: $D_0/2 > D$.

When the heat-adhesive resin layer (innermost layer) 113 has a fixed thickness, the rate of penetration of moisture through the edge of the bonded part and the permeation of moisture into the package 122 can be reduced by so heat-bonding the heat-adhesive layers together that the thickness of the heat-adhesive layers is reduced. Consequently, when the package 122 is used for packaging a lithium battery module, heat generation due to the moisture absorption of the electrolyte of the lithium battery module can be suppressed and stable electromotive force can be maintained.

When the package according to the present invention is a sealed pouch, laminated structures 101 and 102 (the laminated structures 110 or 110') are superposed with the heat-adhesive layers 113 thereof facing each other, and a heat-bonded part 124 is formed by joining together corresponding peripheral portions of the laminated structures 101 and 102 by heat-bonding. Portions of the heat-adhesive layers in the peripheral part of the laminated structures 101 and 102 before heat-bonding have thicknesses $D_1$ and $D_2$, respectively, as shown in FIG. 10(c). Generally, $D_1 = D_2$ in laminated structures for forming pouches. According to the present invention, the portions of the heat-adhesive layers in the peripheral part of the laminated structures 101 and 102 are welded together by heat-bonding in a single layer of a thickness $D_0$ as shown in FIG. 10(d) so that the following inequality is satisfied.

$$D_0 < (D_1 + D_2)/2$$

FIGS. 11(a) and 11(b) show an embossed case 122 formed by bonding a peripheral part of a cover 103 to a flange formed in a container 104 having an embossed part 105 by heat-bonding. Materials for forming the container 104 and the cover 103 of the embossed case are determined selectively taking into consideration necessary conditions. In a embossed case shown in FIG. 11(c), the container 104 and the cover 103 are the same in construction and materials forming the component layers, and are different in the thickness of the heat-adhesive resin layers; the thickness $D_2$ of the heat-adhesive layer 113 of the laminated structure forming the container 104 is far greater than the thickness $D_1$ of the heat-adhesive layer 113 of the laminated structure forming the cover 103.

The present invention is applicable also to the embossed case. When the cover 104 is heat-bonded to the flange 106 of the container 104 to form the bonded part 124 as shown in FIG. 11(d), $$D_0 < (D_1 + D_2)/2$$

where $D_0$ is the thickness of a heat-bonded layer formed by heat-bonding the heat-adhesive layers of the container 104 and the cover 103, and $D_1$ and $D_2$ are the respective thicknesses of the same heat-adhesive layers before bonding.

Differing from the respective heat-adhesive layers of the laminated structures for forming pouches, the respective heat-adhesive layers of the laminated structure for forming the container 104 of the embossed case and the laminated structure for forming the cover 103 of the embossed case, in most cases, have different thicknesses, respectively. When the cover 103 is heat-bonded to the flange 106 of the container 104 to form the bonded part 124 meeting the foregoing condition, the effect of the embossed case is the same as that of the pouch.

The following are possible laminated structures according to the present invention. In the following description, films and processes will be represented by the symbols specified in the description of the foregoing embodiments and the following additional symbols.

Additional Symbols

CCP: Cast polypropylene film, Tr-EP: Acid-proofing treatment with an epoxy resin, Tr-EP-ME: Acid-proofing treatment with an epoxy resin and a melamine resin and Tr-EP+POa: Acid-proofing treatment with a blended resin prepared by blending an epoxy resin and an unsaturated carboxylic acid graft polyolefin resin Laminated Structures formed by Dry Lamination or Coextrusion Lamination Laminated Structures for Forming Pouches
1. PET12/DL/ON15/DL/AL20-Tr-EP/DL/PET12/DL/POa50
2. PET12/EC/PE15/EC/AL20-Tr-EP/DL/PET12/DL/POa50
3. ON15/DL/AL20-Tr-EP/DL/PET12/DL/POa50
4. ON15/3C/PE15/EC/AL20-Tr-EP/DL/PET12/DL/POa50
5. ON12/DL/AL20-Tr-EP-ME/DL/PET12/DL/POa50
6. ON12/DL/AL20-Tr-EP+POa/DL/PET12/DL/POa50

Laminated Structures for Forming Embossed Packages
7. CPET16/DL/ON15/DL/AL20-Tr-EP/DL/CPET16/DL/POa50
8. CPET16/EC/PE15/EC/AL20-Tr-EP/DL/CPET16/DL/POa50
9. ON25/DL/AL40-Tr-EP/DL/CPET16/DL/POa50
10. ON25/EC/PE15/EC/AL40-Tr-EP/DL/CPET16/DL/POa50
11. ON25/DL/AL40-Tr-EP-ME/DL/CPET16/DL/POa50
12. ON25/DL/AL20-Tr-EP+POa/DL/CPET16/DL/POa50

Laminated Structures for Forming Pouches
1. ON15/DL/AL20-Tr-EP/TL/POa20/DL/PET12/DL/POa50
2. ON25/DL/AL20-Tr-EP/TL/POa20/EC/PET12/DL/POa50
3. ON15/DL/AL20-Tr3P/TL/POa20/EC/PET12/EC/PET12/EC/POa50

4. ON15/DL/AL20-Tr-EP/TL/POa20//PMa20//TPX20//PMa20//POa50
5. ON15/DL/AL20-Tr-POa/TL/POa20/DL/PET12/DL/POa50
6. ON15/DL/AL20-Tr-POa/TL/POa15//PP15//POa50
7. ON15/DL/AL20-Tr-EP-ME/TL/POa20/EC/PET12/DL/POa50
8. ON15/DL/AL20-Tr=EP+POa/TL/POa20/EC/PET12/DL/POa50

Laminated Structures for Forming Embossed Packages

Laminated structures for forming embossed cases are similar to the laminated structures for forming pouches, except that CPET is used instead of PET and hence only representative laminated structures will be enumerated.

1. ON25/DL/AL40-Tr-EP/TL/POa20/DL/CPET16/DL/POa50
2. ON25/DL/AL40-Tr-EP/TL/POa20/EC/CPET16/DL/POa50
3. ON25/DL/AL40-Tr-EP/TL/POa15//PP15/POa50

Packages 122 according to the present invention for forming lithium batteries are pouches or embossed cases. The pouch may be a pillow-type pouch, a three-sided seal pouch as shown in FIG. 16(a) or a four-sided seal pouch as shown in FIG. 16(b). Each of those pouches is sealed so that the tabs (terminals) T of the lithium battery project outside from a sealed part of the pouch. As shown in FIGS. 16(c), 16(d) and 16(e), the terminals may extend outside from any optional portions of the sealed part of the package 122.

As shown in FIGS. 11(a), 17(a), 17(a'), 17(c) and 17(d), the embossed case 122 includes a container 104 having an embossed part 105 to contain a lithium battery module 121 and a flange 106, and a cover 103 to be closely bonded to the flange 106 of the container 104. Preferably, the outermost layers 111 and/or the intermediate layers 115 of the laminated structures respectively forming the container 104 and the cover 103 are polyethylene or polybutylene terephthalate copolymer films oriented at a low draw ratio. When such copolymer films are used, the container 104 can be formed in a rectilinear shape. The container can be easily formed in a shape in which the ratio D/T is 1/50 or greater, where T is the width of the open end of the container 104 and D is the depth of the container 104 (FIG. 17 (a')), and side wall is inclined at an inclination θ of 130° or below. It is desirable to use an aluminum foil of 30 μm or above in thickness for forming the barrier layer 112 to prevent the formation of pinholes when the battery packaging laminated structure is worked. Since the cover 103 to be attached to the container 104 is not embossed, the outermost layer 111 and/or the intermediate layer 115 of a laminated structure for forming the cover 103 need not be a polyethylene or polybutylene terephthalate copolymer film. The container 104 having the embossed part 105 is formed from a laminated structure designed for forming the container 104.

A package 122 may be formed of a pair of containers 104 each having an embossed part 105 as shown in FIGS. 17(b) and 17 (b').

The embossed battery package 122 is capable of neatly containing a lithium battery module 121. When the embossed battery package 122 is used, the tabs T may be extended outside from optional positions of the sealed parts 124 of the embossed case 122 as shown in FIGS. 166(c), 16(c'), 16(d) and 16(d').

EXAMPLES

Sample laminated structures respectively provided with heat-adhesive resin layers of different thicknesses were fabricated and pouches were formed from the sample laminated structures. The moisture-proof properties of the laminated structures were examined.

Formation of Laminated Structure

A 25 μm thick biaxially oriented nylon film 111 and a 50 μm thick aluminum foil 112 were laminated by dry lamination. A 30 μm thick heat-adhesive resin layer 113 (a cast polypropylene film) was laminated to the aluminum foil 112 by dry lamination to form a three-layer laminated structure 110 as shown in FIG. 15(b).

Laminated Structure 110
ON25/DL/AL50/DL/CCP30

Pouches

Three-sided seal pouches 122 as shown in FIG. 15(a) were fabricated. Each of the pouches 122 has 5 mm wide heat-sealed parts 124a and 124b. After putting a filler in each pouch 122, an open end portion of the pouch 122 was heat-sealed to form a 20 mm wide sealed part 124c.

The heat-sealed parts 124a and 124b were formed in a set thickness to form the pouch 122, and the heat-sealed part 124c was formed in a thickness of about 20 μm and a width of 20 mm after putting the a filler in the pouch 122 to reduce factors that permit the penetration of moisture through the edges of the heat-sealed parts into the pouch 122.

Samples

When forming the pouches 122 by heat-sealing the peripheral portions of the superposed laminated structures, the temperature of a heat-sealing bar and pressure applied to the heat-sealing bar were varied to form the heat-sealed parts differing from each other in the thickness of the cast polypropylene film. Samples Nos. 1, 2 and 3 having the following thickness of the CCP in the heat-sealed part were prepared.

Sample No. 1: 60 μm
Sample No. 2: 40 μm
Sample No. 3: 20 μm

Conditions for Moisture-Proof Capability Tests and Accelerated Tests

An electrolyte was prepared by mixing DEC (diethyl carbon), DMC (dimethyl carbon) and EC (ethyl carbon) in a mixing ratio of 1:1:1 and the electrolyte was sealed in the sample pouches. The moisture content of the electrolyte contained in the pouches was measured by Karl Fischer's method after keeping the sample pouches for seven days in a thermohygrostat conditioned at 80° C. and 90% RH

| Sample No. | Thickness of CPP (μm) | Moisture content before test (ppm) | Moisture content after test (ppm) |
| --- | --- | --- | --- |
| 1 | 60 | 50 | 450 |
| 2 | 40 | 50 | 350 |
| 3 | 20 | 50 | 250 |

The moisture content of the electrolyte increased by 100 ppm for an increase of 20 μm in the thickness of the CPP.

Generally, gases including moisture penetrate into the pouch 122 having the heat-bonded parts 124 in the following three fashions as shown in FIGS. 14(a) and 14(b). In a fashion $W_2$, moisture penetrates through nonsealed parts of the laminated structure 110 forming the pouch 122 sealing the lithium battery module 121 subject to the influence of moisture therein into the pouch 122. In a fashion $W_3$, moisture penetrates through pinholes and such formed in the heat-bonded parts 124 into the pouch 122. In a fashion $W_1$, moisture penetrates through the heat-adhesive resin layer 113 exposed in the edge of the heat-bonded part 124 into the pouch 122. Most part of moisture penetrates through the heat-adhesive resin layer 113 into the pouch 122.

The pouch 122 according to the present invention is capable of preventing the penetration of moisture through the edge of the heat-bonded part 124 into the pouch 122 because a portion of the heat-adhesive resin layer 113 in the heat-bonded part 124 is formed in the thickness meeting the foregoing condition.

According to the present invention, a sealed package is formed by heat-bonding portions of laminated structures each having at least one surface layer formed of a heat-adhesive resin film in heat-bonded parts so that the portions of the heat-adhesive resin film in the heat-bonded parts have a thickness smaller than that of other portions of the same. Thus, the present invention provides highly moisture-proof packages which can be widely used for packaging foodstuffs, medicines, chemicals and the like. The packages of the present invention as packages of lithium batteries are effective in preventing the reduction of the ability of the lithium batteries due to the penetration of moisture into the lithium batteries and avoiding troubles arising from the delamination of the packages.

Ninth Embodiment

A ninth embodiment according to the present invention will be described with reference to FIGS. 18 to 24. Pouches of the present invention sealing lithium battery modules therein are cases of lithium batteries.

Figure 21:
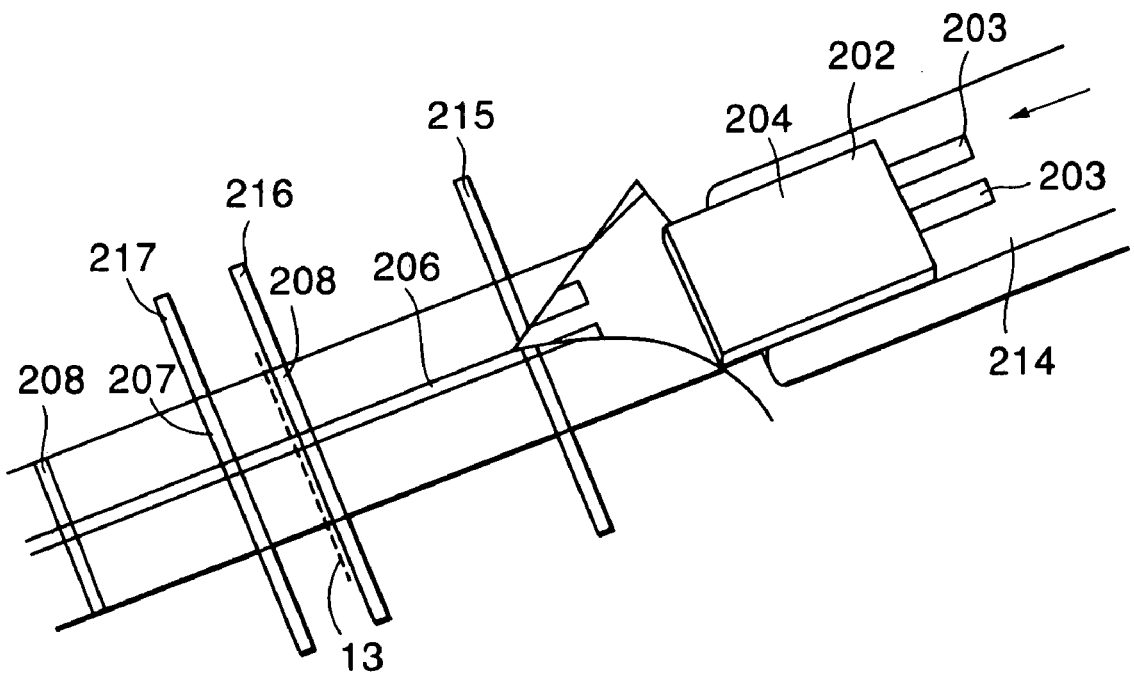
FIG. 21 is a view of assistance in explaining a battery pouch manufacturing method in a modification of the battery pouch manufacturing method according to the present invention.

FIG. 18(a) is a perspective view of a battery pouch and a lithium battery, FIG. 18(b) is a sectional view taken on line $X_1$-$X_1$ in FIG. 18(a), FIG. 18(c) is an enlarge view of a portion $Y_1$ in FIG. 18(b), FIGS. 19(a) and 19(b) are views of assistance in explaining a lithium battery manufacturing method according to the present invention, in which FIG. 19(a) is a perspective view of assistance in putting a lithium battery module in a pouch and FIG. 19(b) is an enlarged view of a portion $Y_2$ in FIG. 19(a), FIG. 20(a) is a sectional view taken on line $X_2$-$X_2$ in FIG. 19(b), FIG. 20(b) is s sectional views taken on line $X_3$-$X_3$ in FIG. 19(b), FIG. 21 is view of assistance in explaining another lithium battery manufacturing method according to the present invention, FIGS. 22(a) to 22(d) are views of battery pouches according to the present invention, and FIGS. 23(a) and 23(b) are typical sectional views of laminated structures according to the present invention.

A pouch 205 included in a lithium battery 201 according to the present invention is formed from a laminated structure 220 having at least one heat-sealable surface and having protective properties necessary for maintaining the functions of the lithium battery 201.

Particularly, moisture that permeates into the lithium battery 201 reacts with the electrolyte or the like of the lithium battery 201 to deteriorate the functions of the lithium battery 201. Therefore, it is preferable that a laminated structure for forming the pouch 205 includes at least an aluminum foil 222 of a thickness of 20 µm or above.

Figure 18:
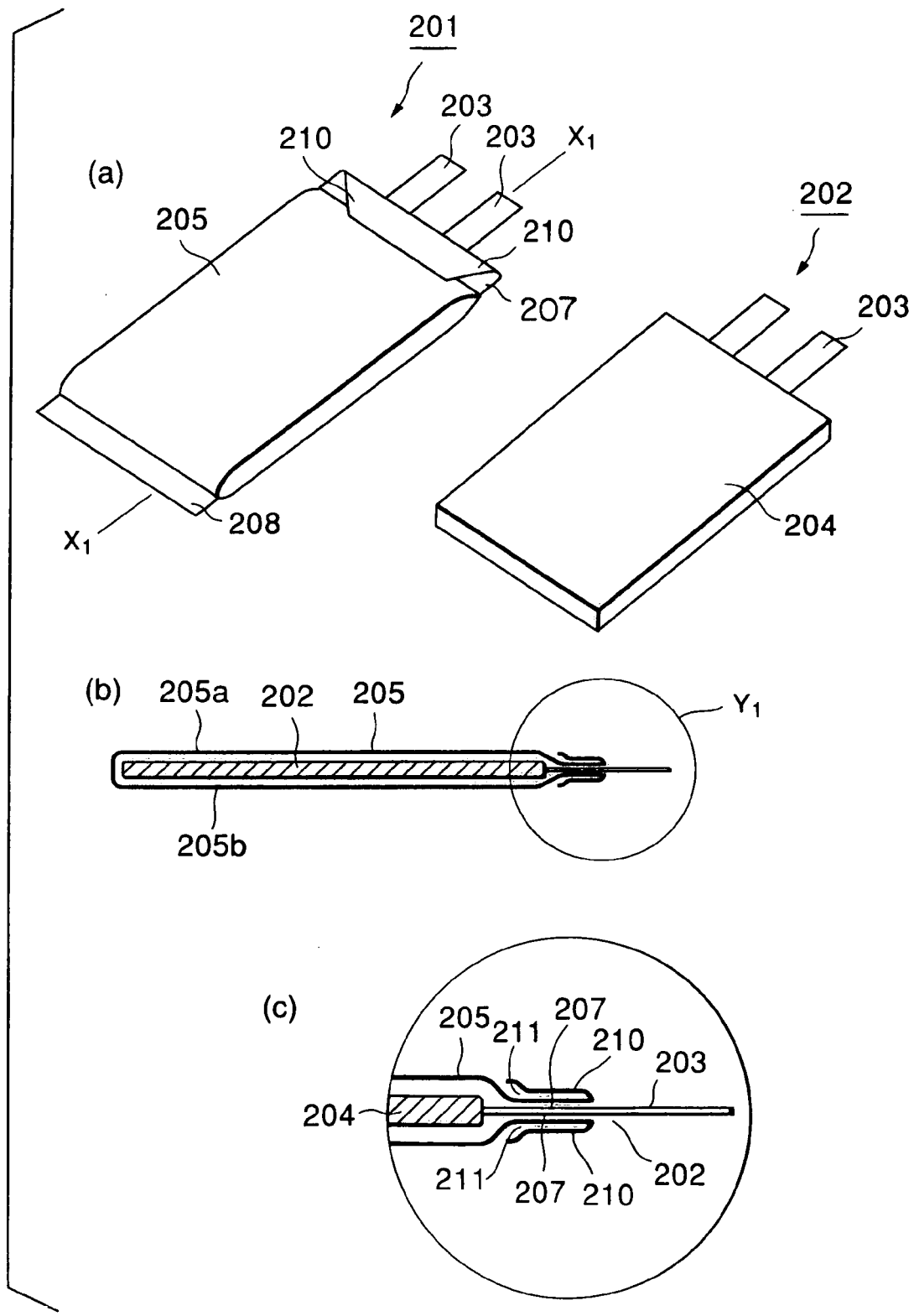
FIG. 18 is a view of a battery pouch according to the present invention and a lithium battery.
Figure 19:
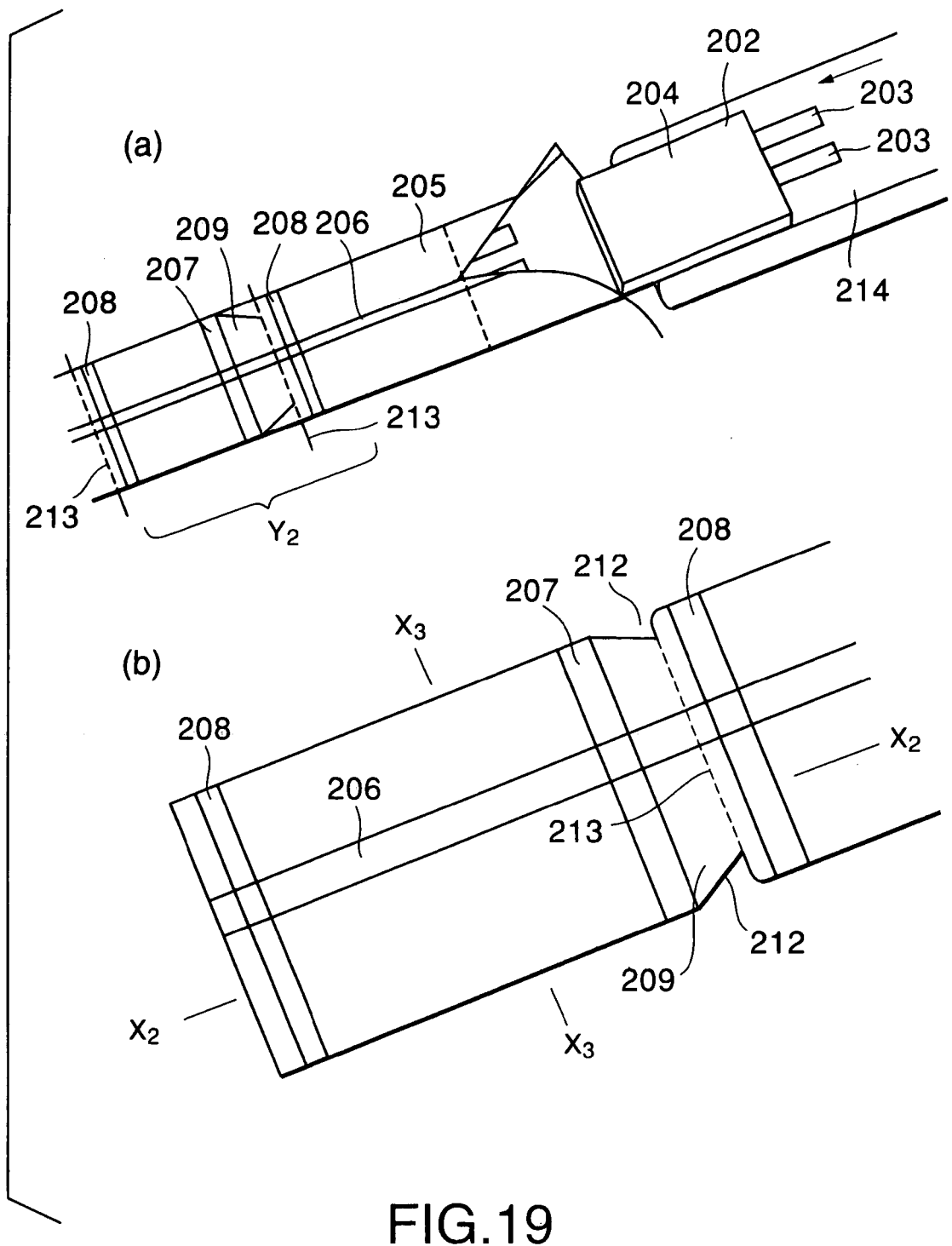
FIG. 19 is a view of assistance in explaining a lithium battery manufacturing method according to the present invention.
Figure 20:
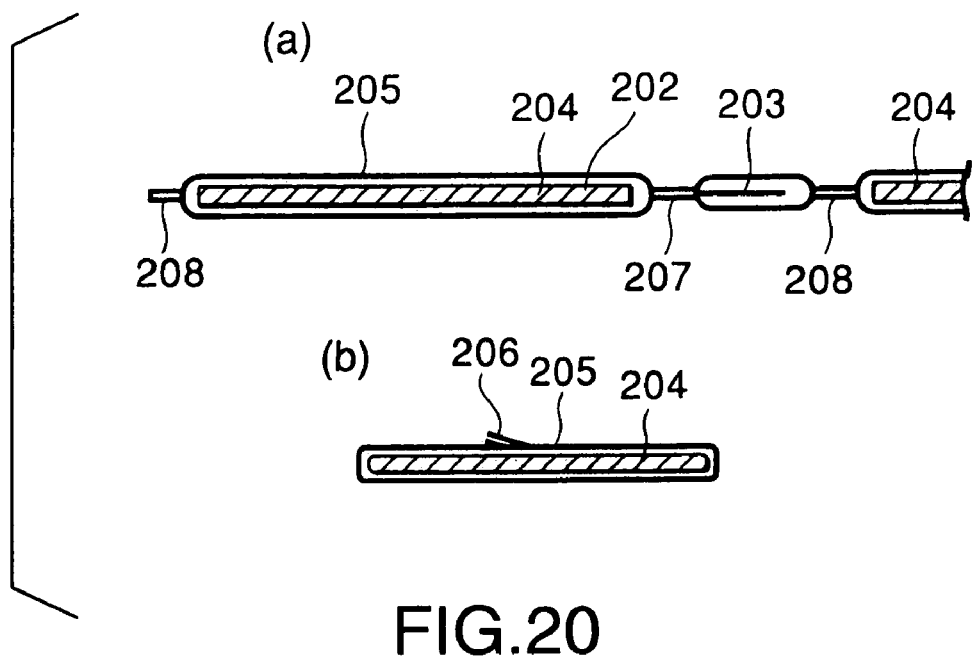
FIG. 20 is a sectional view of a battery pouch shown in FIG. 19.

The lithium battery 201 is used as a power supply for various electric devices. As shown in FIG. 18, the lithium battery 201 is formed by packaging a lithium battery module 202 in the pouch 205. The lithium battery module 202 has a thin, plate-shaped main part 204 and terminals 203 projecting from one side of the main part 204 as shown in FIG. 18(a).

The pouch (lithium battery package) 205 must perfectly seal the lithium battery module 202 therein with the terminals 203 partly projected outside from the pouch 205.

As shown in FIGS. 19(a) and 19(b), the pouch 205 has a first sealed end part (heat-bonded end part) 207 formed in one end thereof on the side of the terminals 203 of the lithium battery 201, and a second sealed end part 208 formed in the other end thereof opposite the first sealed end part 207. A nonsealed part 209 extends from the first sealed end part 207. Cuts 212 are formed in the opposite side portions of the nonsealed part 209, respectively.

As shown in FIG. 18(c), a pair of leaves 210 forming the nonsealed part 209 are folded back and are bonded to corresponding portions of the laminated structures 220 (FIGS. 23(a) and 23(b)) with adhesive layers 211. Thus, the end edge of the conductive aluminum foil 222 serving as a barrier layer is not exposed in the edge of the first sealed end part 207 from which the terminals 203 project outside and hence the terminals 203 are not short-circuited by the aluminum foil 222.

The cuts 212 may be formed by cutting opposite side portions of the nonsealed part 209 as shown in FIG. 19(b). The cuts 212 facilitate folding back the pair of leaves of the nonsealed part 209.

A method of packaging the lithium battery module 202 will be explained. As shown in FIG. 19(a), a length of the laminated structure 220 unwound from a roll of laminated structure is formed in a tubular structure, the lithium battery module 202 is fed into the tubular structure of the laminated structure 220, and overlapped side portions are bonded together in a sealed back seam 206. To form the laminated structure 220 in a pouch tightly fitting the lithium battery module 202, the overlapped side portions of the laminated structure are held between rotating rubber rollers during the formation of the sealed back seam 206 so that the laminated structure may not become loose.

To restrain the lithium battery module 202 from being longitudinally dislocated relative to the pouch 205 while the lithium battery module 202 is fed into the tubular structure of the laminated structure 220 and the sealed end parts 207 and 208 are formed, it is desirable to bond a portion of the laminated structure 220 corresponding to the first sealed end part 207 to the terminals 203 with a tack-welding bar 215 to fix the position of the lithium battery module 202 relative to the tubular structure of the laminated structure 220 as shown in FIG. 21. After thus fixing the position of the lithium battery module 202 relative to the tubular structure, the overlapped side portions of the laminated structure 220 are bonded together to form the sealed back seam 206, and the first sealed end part 207 and the second sealed end part 208 are formed by using heat-sealing bars 216 and 217. Although only the heat-sealing bars are shown in FIG. 21, each of actual heat-sealing units includes the heat-sealing bar and a pressure plate.

The lithium battery module 202 can be hermetically packaged in the pouch 105 by forming the sealed end parts 207 and 208. As shown in FIG. 19(b), the cuts 212 are formed in the opposite side portions of the nonsealed part 209 extending between the first sealed end part 207 and the second sealed end part 208. In view of producing lithium batteries at a high productivity, it is preferable that the sealed end parts 207 and 208 and the cuts 212 are formed simultaneously. However, the cuts 212 may be formed either before or after the formation of the sealed end parts 207 and 208. The cuts 212 facilitate folding back the pair of leaves of the nonsealed part 209.

After forming the first sealed end part 207 and the second sealed end part 208, the laminated structure 220 is cut along a cutting line 213 to separate the pouch 205 from the laminated structure 220. The pair of leaves 210 of the nonsealed part 209 of the pouch are folded back and are bonded to corresponding portions of the laminated structure 220 with the adhesive layers 211, i.e., layers of a hot-melt adhesive or adhesive films as shown in FIGS. 18(b) and 18(c). Thus, the end edge of the conductive aluminum foil 222 serving as a barrier layer is not exposed in the edge of the first sealed end part 207 from which the terminals 203 project outside and hence the terminals 203 are not short-circuited by the aluminum foil 222 (FIGS. 23(a) and 23(b)).

Figure 22:
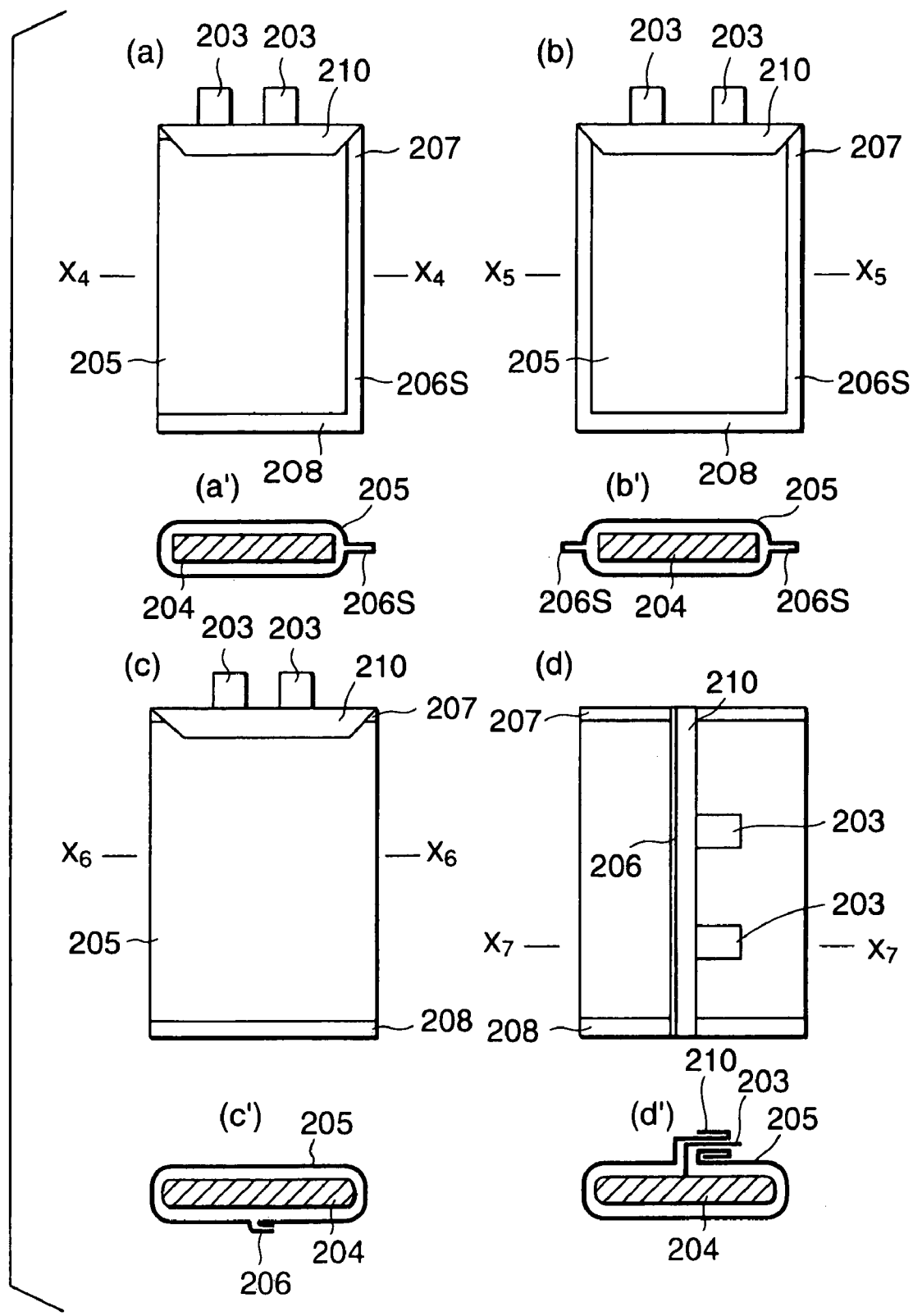
FIG. 22 is a view of battery pouches in modifications of the battery pouches according to the present invention.
Figure 23:
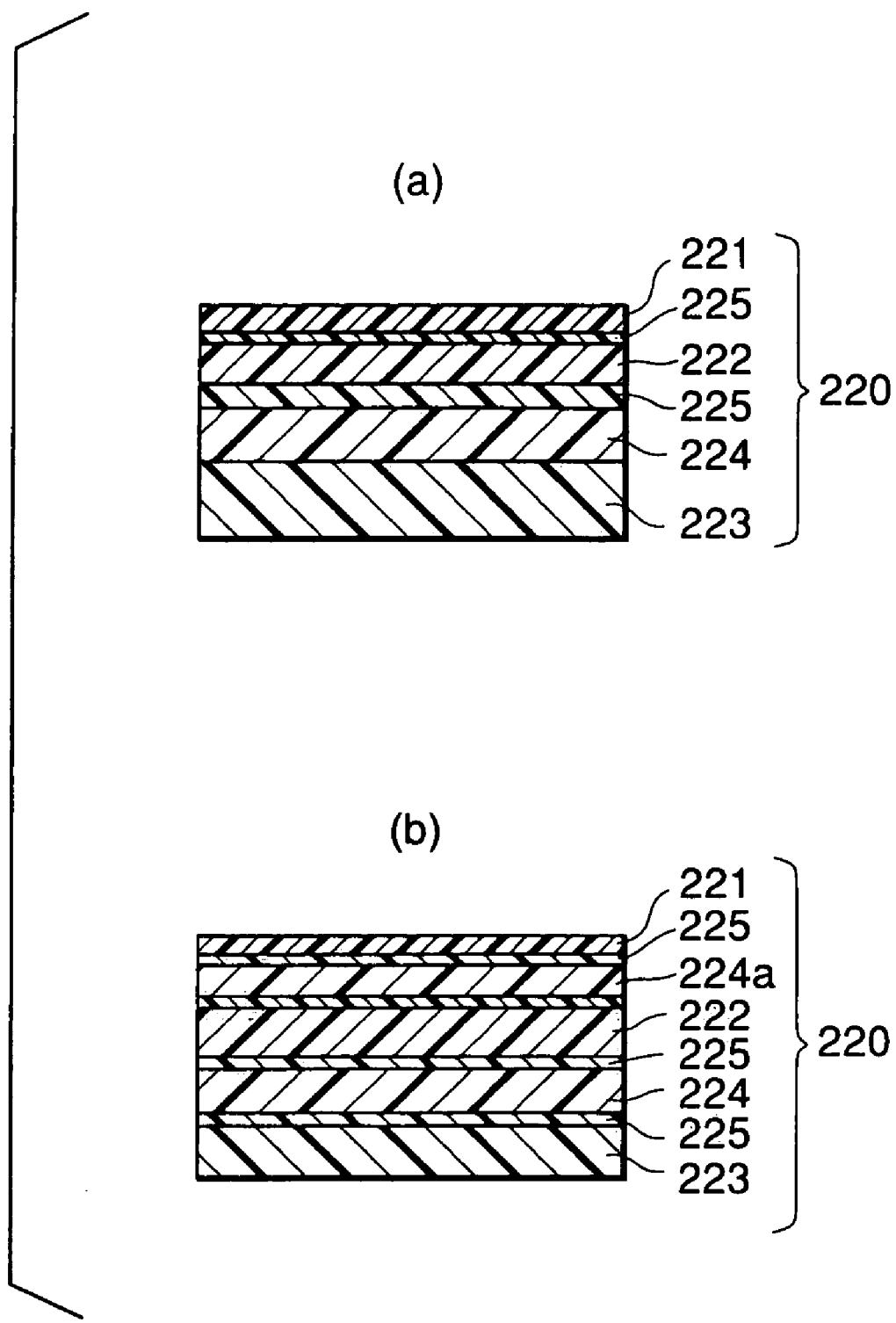
FIG. 23 is a typical sectional view of battery packaging laminated structures according to the present invention.

The lithium battery packages according to the present invention may be pouches of various types as shown in FIG. 22 other than the pouches of a pillow type as mentioned above. FIGS. 22(a), 22(b), 22(c) and 22(d) show a lithium battery with a three-sided seal pouch 205, a lithium battery with a four-sided seal pouch 205, a lithium battery with a pillow-type pouch 205 and a lithium battery with a pillow-type pouch 205, respectively. In the lithium battery having the pillow-type pouch 205 shown in FIG. 22(d), the terminals 203 project outside from the sealed back seam 206, portions of the terminals 203 are bonded to the sealed back seam 206 of the pouch 205, and a pair of leaves 210 forming a nonsealed part 209 continuous with the sealed back seam 206 are folded back. The pillow-type pouch 205 shown in FIG. 22(c) is most preferable because the same can be formed so as to fit the lithium battery module tight and can be easily used in an automatic battery packaging process.

Laminated structures 220 for forming the lithium battery according to the present invention will be described herein after with reference to FIGS. 23(a) and 23(b). The laminated structure 220 has a heat-adhesive innermost layer 223 capable of being heat-bonded to the terminals 203. The laminated structure 220 needs a barrier layer 222. The outer most layer 221 is a film having a high strength. When necessary, the laminated structure 220 is provided with an intermediate layer 224. The layers of the laminated structure 220 may be bonded together with adhesives or adhesive resins.

The laminated structure 220 of basic construction for forming the pouch 205 for a lithium battery comprises an outermost layer 221, a barrier layer 222 laminated to the outermost layer 221, and a hat-sealable layer (heat-adhesive resin layer) 223 laminated to the barrier layer 222. A reinforcing layer 224 may be sandwiched between the barrier layer 222 and the heat-sealable layer 223 to protect the barrier layer 222 and to maintain the barrier property of the pouch 205; that is, the laminated structure 220 may be a laminate: outermost layer 221/barrier layer 222/reinforcing layer 224/heat-sealable layer 223 as shown in FIG. 23(a). The laminated structure 220 may be provided with an additional reinforcing layer 224a sandwiched between the outermost layer 221 and the barrier layer 222 as shown in FIG. 23(b).

In FIGS. 23(a) and 23(b), adhesive layers 225 are sandwiched between the adjacent ones of the layers 211, 222, 223, 224 and 224a.

Materials of the laminated structure 220 for forming the pouches 205 for lithium batteries according to the present invention will be described with reference to FIGS. 23(a) and 23(b).

The outermost layer 221 is the base layer of the laminated structure 220 and is subjected to printing. A film having a sufficiently high tensile strength, abrasion resistant and an insulating property is used as the outermost layer 221. Possible films for forming the outermost layer 221 are those of polyester resins, polyamide resins, polypropylene resins, polycarbonate resins and the like. Preferably, oriented films of those resins are used for forming the outermost layer 221.

The thickness of the outermost layer 221 is in the range of 5 to 30 μm, preferably, in the range of 10 to 25 μm.

As shown in FIG. 23(b), the additional reinforcing layer 224a may be sandwiched between the outermost layer 221 and the barrier layer 222. The additional reinforcing layer 224a is used to enhance the strength of the laminated structure 220 and to prevent damage to the barrier layer 222. Possible films as the additional reinforcing layer 224a are oriented or unoriented films of polyester resins, polyamide resins, polypropylene resins, polycarbonate resins and the like. Biaxially oriented films of those resins are particularly desirable so far as strength is concerned.

The barrier layer 222 must have a perfect barrier property to inhibit the penetration of moisture into the lithium battery package 205. If moisture penetrates into the package 205, hydrogen fluoride is produced by the interaction of moisture and the electrolyte of the lithium battery, the hydrogen fluoride permeates the layers of the laminated structure and, consequently, the laminated structure is delaminated. The laminated structure must have a perfect barrier property, more concretely, the laminates structure must be perfectly impermeable to moisture. It was known through experiments on the effect of materials forming the barrier layer 222 and the thickness of the barrier layer 222 that a metal foil of 20 μm or above in thickness is desirable for forming the barrier layer 222. Metal foils of a thickness below 20 μm origin ally have pinholes, and there is the possibility that pinholes and cracks are formed therein when a package formed from a laminated structure provided with a barrier layer 222 of such a metal foil is bent. Possible barrier layers are foils of metals including copper, tin, lead, iron aluminum and alloys of some of those metals. Aluminum foils are preferred to other metal foils because aluminum foils are relatively inexpensive and easily workable and have a small specific weight. Preferably, the thickness of metal foils as the barrier layer 222 is 10 μm or above, preferably, in the range of 15 to 40 μm.

The reinforcing layer 224 sandwiched between the barrier layer 222 and the heat-sealable layer 223 is effective in preventing damage to the barrier layer 222, i.e., a metal foil. Damage to the barrier layer 222, i.e., the metal foil, includes formation of pinholes in the barrier layer 222 when the laminated structure is bent or breaks caused by the sharp corners of an article contained in a package formed from the laminated structure. The reinforcing layer 224 may be a film of the same materials as the additional reinforcing layer 224a, such as an oriented or unoriented film of any one of resins including polypropylene resins, polyester resins, polyamide resins and polycarbonate resins. A biaxially oriented film is particularly desirable as the reinforcing layer 224 so far as strength is concerned.

The heat-sealable layer (heat-adhesive resin layer) 223 of the laminated structure for forming the package 205 for a lithium battery according to the present invention is formed of a heat-adhesive resin capable of being heat-bonded to terminals 203 formed of a conductive material, such as copper foils or aluminum foils.

The resin forming the heat-sealable layer 223 must be unsusceptible to the detrimental effects of the electrolyte of the lithium battery.

Possible resins for forming the heat-sealable layer 223 are, for example, ethylene-vinyl acetate copolymers, ethylene-acrylate copolymers, ethylene-methacrylate copolymers, polyolefin resins prepared by blending polyethylene or polypropylene, and one or some of those copolymers. Particularly preferable resins are polyolefin resins produced through the copolymerization and modification of acid-modified polyolefin resins, such as ethylene-acrylate copolymers and ethylene-methacrylate copolymers, copolymers of polyethylene, polypropylene, copolymers of those and α-olefins, ethylene-vinyl acetate copolymers, ethylene-acrylate copolymers, and polyolefin resins produced through the graft copolymerization and modification of polyolefin resins, such as terpolymers of those polymers, and unsaturated carboxylic acids, such as acrylic acid, methacrylic acid, maleic acid, maleic anhydride, citraconic anhydride, itaconic acid and itaconic anhydride, or the anhydrides of those. Resins having a melting point of 100° C. or above among those resins are used to form highly heat-resistant battery packages.

The component layers of the laminated structure for forming packages for lithium batteries are laminated by a dry lamination process using a two-part isocyanate adhesive, a sandwich dry lamination process that extrudes a film of an adhesive resin between the layers and applies pressure to the layers, or a thermal lamination process that sandwiches a heat-adhesive film between the layers and applies heat and pressure to the layers. Those lamination processes and electrolyte-resistant adhesives are used selectively.

A pouch 205 is formed by superposing a pair of sheets 205a and 205b, i.e., the laminated structures 220, with the heat-adhesive resin layers 223 thereof facing each other, and forming heat-sealed parts 207 and 208.

EXAMPLES

Packages for the lithium battery according to the present invention and a packaging method will be described herein after. A lithium battery module 202 has a main part 204 of 110 mm×70 mm×1.5 mm in size and 25 mm long terminals 203 projecting from one end of the main part 204. A laminated structure 220 for forming a pouch 205 for a lithium battery 201 had the following construction.

PET16/DL/AL20/DL/PET16/AD50

The acid-modified unsaturated polyolefin film (AD50) was formed by an extrusion lamination process.

A roll of the laminated structure 220 was supplied to a packaging machine that forms pillow-type pouches and packages lithium battery modules 202 in the pouches. The laminated structure 220 was unwound from the roll, the laminated structure 220 were shaped to form pillow-type pouches successively, lithium battery modules 202 were fed successively into the pouches, and first and second end portions of each pouch were sealed for automatic packaging. Cuts are formed in opposite side portions of an on sealed part 209 extending between the first sealed part 207 of the preceding pouch and the second sealed part 208 of the succeeding pouch. A pair of leaves 210 forming the nonsealed part 209 were folded back and were bonded to corresponding portions of the laminated structures 220 with adhesive films to complete a lithium battery 201.

The terminals 203 of the lithium battery 201 were not short-circuited by the conductive barrier layer 222 of the laminated structures 220 forming the pouch 205 when the terminals 203 were bent in any direction. The lithium battery 201 was quite normal in its basic functions.

Although the pair of leaves 210 forming the nonsealed part 209 are bonded to corresponding portions of the laminated structures 220 with adhesive films, the same can be easily bonded to corresponding portions of the laminated structures 220 by an automatic bonding process using a hot-melt adhesive and an adhesive applicator.

There is no possibility that the terminals of the lithium battery according to the present invention are short-circuited by the conductive barrier layer of the laminated structure forming the package for the lithium battery.

The battery package manufacturing method of the present invention is able to carry out processes for making packages and packaging lithium batteries in the packages efficiently substantially in an in-line assembly mode.

Tenth Embodiment

Figure 24:
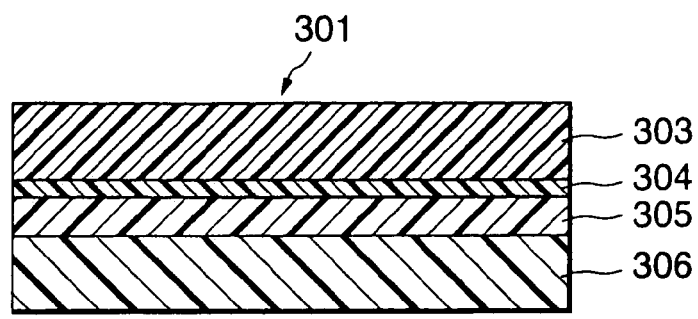
FIG. 24 is a typical sectional view of a battery packaging laminated structure according to the present invention.
Figure 25:
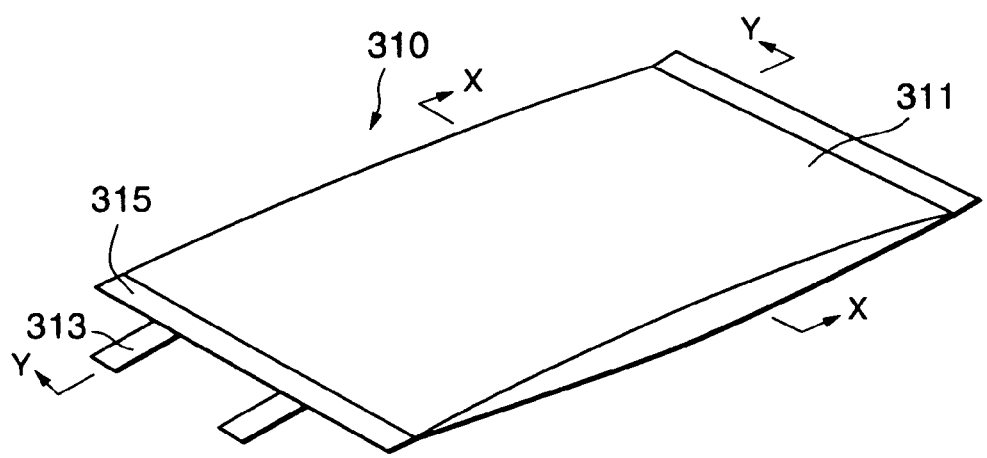
FIG. 25 is a perspective view of a lithium battery.
Figure 26:
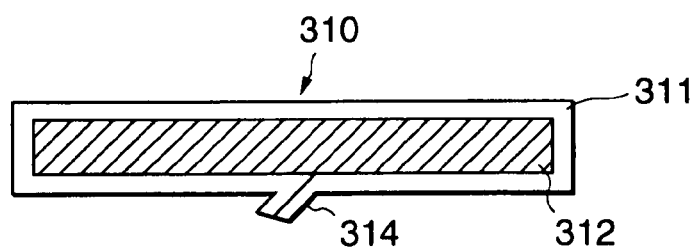
FIG. 26 is a typical sectional view taken on line X-X in FIG. 25.
Figure 27:
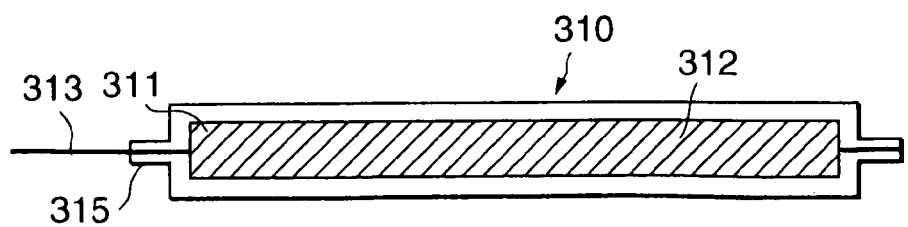
FIG. 27 is a typical sectional view taken on line Y-Y in FIG. 25.

Tenth embodiment according to the present invention will be described with reference to FIGS. 24 to 27. FIG. 24 is a typical sectional view of a battery packaging laminated structure according to the present invention, FIG. 25 is a perspective view of a lithium battery according to the present invention, FIG. 26 is a typical sectional view taken on line X-X in FIG. 25, FIG. 27 is a typical sectional view taken on line Y-Y in FIG. 25. Shown in FIGS. 24 to 27 are a laminated structure 301 according to the present invention, an aluminum foil 303, an easy-to-bond layer 304, an adhesive layer 305, an inner layer 306, a lithium battery 310, a pouch 311, a lithium battery module 312, terminals 313, a sealed back seam 314 and a heat-sealed end part 315.

Referring to FIG. 24, the laminated structure 301 is formed by laminating the inner layer 306 to the easy-to-bond layer 304 formed on a surface of the aluminum foil 303 with the adhesive layer 305.

As shown in FIGS. 25 to 27, the lithium battery 310 is formed by sealing the lithium battery module 312 in the pillow-type pouch 311 having the sealed back seam 314 with portions of the terminals 313 extending outside from the pouch 311 and other portions of the same sealed in the heat-bonded end part 315. The laminated structure 301 of the present invention is a principal material of the pouch 311 for the lithium battery.

The laminated structure 301 of the present invention will be concretely described herein after.

The aluminum foil of the laminated structure 301 prevents the penetration of moisture and gases into the lithium battery 310. The thickness of the aluminum foil 303 is 15 μm or above, preferably, 20 μm or above in view of pinholes originally existing in aluminum foils and securing sufficient resistance to pinhole forming effects of processing and handling. In view of workability (lamination, embossing and pouch making) and facility of handling pouches, a soft aluminum foil of a thickness of 100 μm or below, preferably, 80 μm or below is suitable.

At least one of the surfaces of the aluminum foil 303 is processed to form the easy-to-bond layer 304. The easy-to-bond layer 304 is formed to ensure the firm bonding of the aluminum foil 303 and the inner layer 306 with the adhesive layer 305 and to protect the surface of the aluminum foil 303 facing the inner layer 306 from the detrimental action of the electrolyte of the lithium battery 310 or hydrofluoric acid produced by the hydrolysis of the electrolyte. The easy-to-bond layer 304 is formed, for example, by degreasing the surface of the aluminum foil 303 on the side of the inner layer 306 by a known degreasing process, such as an alkali dipping process, an electrolytic cleaning process, a pickling process, an electrolytic pickling process or an acid-activation process, and applying a processing liquid (solution) containing, as a principal component, a metal phosphate, such as chromium phosphate, titanium phosphate, zirconia phosphate or zinc phosphate, or a mixture of some of those metallic salts, a processing liquid (solution) containing, as a principal component, a nonmetallic phosphate or a mixture of some of nonmetallic phosphates, or a processing liquid (solution) prepared by mixing some of those salts and a water-soluble synthetic resin, such as an acrylic resin, a phenolic resin or a urethane resin, by a known coating process, such as a roll coating process, a gravure printing processor a dipping process to the cleaned surface of the aluminum foil. When a chromium phosphate solution is used, the easy-to-bond layer 304 is a film of chromium phosphate ($CrPO_4$), aluminum phosphate ($AlPO_4$), aluminum oxide ($Al_2O_3$), aluminum hydroxide ($Al(OH)_x$) or aluminum fluoride ($AlF_x$). When a zinc phosphate solution is used, the easy-to-bond layer 304 is a film of zinc phosphate hydrate ($Zn_2PO_4 \cdot 4H_2O$), aluminum phosphate ($AlPO_4$), aluminum oxide ($Al_2O_3$), aluminum hydroxide ($Al(OH)_x$) or aluminum fluoride ($AlF_x$). The thickness of the easy-to-bond layer 304 as dried is in the range of 1 to 200 nm, generally, in the range of 10 to 50 nm. When the mixed processing liquid (solution) containing the water-soluble synthetic resin is used, the thickness of the easy-to-bond layer 304 is in the range of 100 to 500 nm.

The easy-to-bond layer 304 can be formed by another method that decreases at least a surface of the aluminum foil 303 on the side of the inner layer 306 by an alkali dipping process, an electrolytic cleaning process, a pickling process, a electrolytic pickling process or an acid-activation process, and subjects the cleaned surface of the aluminum foil 303 to a known anodic oxidation process. The protective layer 340 formed by this method is an aluminum oxide film ($Al_2O_3$ film). Generally, the thickness of the aluminum oxide film is in the range of several micrometers to several hundreds micrometers. According to the present invention, a suitable thickness of the aluminum oxide film as the easy-to-bond layer 304 is in the range of several micrometers to 20 μm.

The inner layer 306 of the laminated structure may be a heat-adhesive layer capable of forming the heat-sealed end part 315 sealing portions of the terminals 313 therein or may be a reinforcing layer for reinforcing a heat-adhesive layer bonding together a pair of inner layers 306 as shown in FIG. 27. It is essential that the inner layer 306 has a melting point of 80° C. or above to ensure the environmental suitability (heat resistance and cold resistance) to the lithium battery. In view of such requirements, possible materials for forming the inner layer 306 are polyolefin resins, acrylic resins, polyester resins, fluorocarbon resins, derivatives of those resins, and mixtures of some of those resins.

The polyolefin resins include low-density polyethylene resins, medium-density polyethylene resins, high-density polyethylene resins, linear low-density polyethylene resins, ethylene-α-olefin copolymers produced by polymerization using a single-site catalyst, ionomers, polypropylene resins, ethylene-propylene copolymers, ethylene-vinyl acetate copolymers, saponified ethylene-vinyl acetate copolymers, polybudene resins, unsaturated carboxylic acid graft polyolefin resins having a Vicat softening point of 70° C. or above including unsaturated carboxylic acid graft polyethylene resins unsaturated carboxylic acid graft polypropylene resins and unsaturated carboxylic acid graft poly(methylpentene) resins, and derivatives of those resins.

The acrylic resins include ethylene-methacrylic acid derivative copolymers and ethylene-acrylic acid derivative copolymers. More concretely, the acrylic resins are ethylene-acrylic acid copolymers, ethylene-methacrylic acid copolymers, ethylene-methyl acrylate copolymers, ethylene-ethyl acrylate copolymers and ethylene-methyl methacrylate copolymers The polyester resins include polyethylene terephthalate. polybutylene terephthalate, polyethylene naphthalate, polybutylene naphthalate, polycarbonate, copolymers of some of those polymers and derivatives of those polymers.

The fluorocarbon resins include tetrafluoroethylene, trifluoroethylene, polyvinylidene fluoride, polyvinyl fluoride, ethylene tetrafluoroethylene, polychlorotrifluoroethylene, ethylene-chlorotrifluoroethylene copolymers, tetrafluoroethylene-hexafluoropropylene copolymers.

Oriented or unoriented films of those resins are used. When necessary, the surfaces of the films may be processed by a corona discharge process and/or an atmospheric pressure plasma treatment. When the inner layer 306 is used as a heat-adhesive resin layer, the heat-sealed end part 315 must be formed so that any gaps may not be formed between the inner layer 306 and the terminals 313. The inner layer 306 must have a thickness of 10 μm or above, preferably, 50 μm or above. Although the thickness of the inner layer 306 may be about 100 μm so far as the sealing ability of the inner layer 306 is concerned, an appropriate thickness of the inner layer 306 is 100 μm or below in view of cost reduction and forming the lithium battery in a small volume. When the inner layer 306 is used as a reinforcing layer for reinforcing the heat-adhesive resin layer and is disposed on the side of the aluminum foil with respect to the heat-adhesive resin layer, a suitable thickness of the inner layer 306 is in the range of 10 to 50 μm. A suitable value of the sum of the respective thicknesses of the reinforcing layer and the heat-adhesive layer is 100 μm or below in view of cost reduction and forming the lithium battery in a small volume.

The adhesive layer 305 will be described herein after. Possible resins for forming the adhesive layer 305 are known adhesives for dry lamination including polyester resins, polyether resins, polyurethane resins, polyether-urethane resins, polyester-urethane resins, isocyanate resins, polyolefin resins, polyethylene-imine resins, cyanoacrylate resins, organotitanium compounds, epoxy resins, imide resins, silicone resins, derivatives of those resins and mixtures of some of those resins. The adhesive layer 305 can be formed by applying a solution of the foregoing resin in a film to the easy-to-bond layer 304 formed on the aluminum foil 305 by a known coating method, such as a roll coating method or a gravure coating method and drying the film. The inner layer 306 is attached to the adhesive layer 305 to complete the laminated structure of the aluminum foil 303 and the inner layer 306.

A silane coupling agent may be mixed properly in the resin for forming the adhesive layer 305. Possible silane coupling agents are, for example, epoxy organosilane compounds including 3-glycidxypropyle trimethoxylan, amine organosilane compounds including [3-(2-aminoethyl)aminopropyl]trimethoxylan, and isocyan organosilane compounds including 3-isocyanate propyl triethoxysilane. Epoxy organosilane compounds are preferable because epoxy organosilane compounds have an affinity for metals higher than that of isocyan organosilane compounds and the former are more adhesive to metals than the latter. Amine organosilane compounds proper have the function of an accelerator and have short pot life. The silane coupling agent solid content of the adhesive layer 305 is not smaller than 1% and less than 50%, preferably, not smaller than 10% and less than 30%.

The laminated structure 301 according to the present invention having the inner layer 304, i.e., a heat-adhesive resin layer, can be used for forming a package for a lithium battery. However, the piercing strength of the package formed from the laminated structure 301, as compared with that of a metal can, is not high enough. To provide a laminated structure having a sufficiently high piercing strength, an outer layer of a biaxially oriented polyester or polyamide film is bonded to the outer surface of the aluminum foil 303. Possible polyester films are polyethylene terephthalate films, polybutylene terephthalate films, polyethylene naphthalate films, polybutylene naphthalate films and polycarbonate films. Possible polyamide films are films of nylon 6, nylon 66 and the like. The outer layer is at least one biaxially oriented polyester or polyamide film of a thickness of 6 μm or above, preferably, in the range of 12 to 25 μm. The outer layer and the aluminum foil 303 can be laminated by a known dry lamination process using the foregoing adhesive layer 305. Naturally, a bonding surface of the biaxially oriented polyester or polyamide film are finished by a corona discharge process.

EXAMPLES

Examples of the tenth embodiment will be described herein after. A 20 μm thick soft aluminum foil (untreated foil) was immersed in a 10% by weight sodium hydride solution heated at 50° C. for 4 min, was cleaned with demineralized water and was subjected to hot-air drying for degreasing to prepare a degreased soft aluminum foil. The degreased soft aluminum foil was subjected to an anodic oxidation process using a dilute sulfuric solution to form an aluminum oxide film ($Al_2O_3$ film) as a protective layer on the surface of the degreased soft aluminum foil to obtain a soft aluminum foil coated with an aluminum oxide film.

Example 1

A chromium phosphate solution containing 10% by weight chromium phosphate was applied in a film to one surface of the degreased soft aluminum foil and the film was dried to form an easy-too-bond layer. A mixed liquid prepared by mixing polyester polyol, bisphenol A-type epoxy resin and trilene diisocyanate (TDI) was applied to the easy-to-bond layer to form an adhesive layer of a dry weight per unit are a of 4 g/m². A surface treated by a corona discharge process of a 25 μm thick biaxially oriented polyethylene terephthalate film was boned to the aluminum foil with the adhesive layer to form a laminated structure 301 in Example 1.

Example 2

A laminated structure 301 in Example 2 was formed by the same procedure as that by which the laminated structure 301 in Example 1 was formed, except that a mixed solution prepared by mixing a solution containing 5% by weight chromium phosphate and a solution containing 10% by weight hydroxyethyl methacrylate was used instead of the solution containing 10% by weight chromium phosphate.

Example 3

A laminated structure 301 in Example 3 was formed by the same procedure as that by which the laminated structure 301 in Example 1 was formed, except that an adhesive layer of a dry weight per unit are a of 4 g/m² by coating one of the surfaces of the soft aluminum foil coated with an aluminum oxide film with a mixed liquid prepared by mixing polyester polyol, bisphenol A-type epoxy resin and TDI, and a surface processed by a corona discharge process of a 25 μm thick biaxially oriented polyethylene terephthalate film was bonded to the aluminum foil with the adhesive layer.

Example 4

A mixed liquid prepared by mixing a solution containing 5% by weight chromium phosphate and a solution containing 10% by weight hydorxyethyl acrylate was applied in a film to one of the surfaces of the degreased soft aluminum foil and film was dried to form an easy-to-bond layer on the surface of the degreased soft aluminum foil. An adhesive layer A of a dry weight per unit are a of 6 g/m² was formed on the easy-to-bond layer by spreading a mixed liquid of polyester polyol, an anhydride and an epoxy resin in a film and drying the film. An adhesive layer B of a dry weight per unit are a of 6 g/m² was formed on a surface processed by a corona discharge process of a 25 μm thick biaxially oriented polyethylene terephthalate film by spreading a mixed liquid of polyester polyol and TDI in a film and drying the film. The adhesive layers A and B were joined together to form a laminated structure 301 in Example 4.

Example 5

An adhesive layer A of a dry weight per unit are a of 6 g/m² was formed on the a surface of the soft aluminum foil coated with an aluminum oxide film by spreading a mixed liquid of polyester polyol, an anhydride and an epoxy resin in a film and drying the film. An adhesive layer B of a dry weight per unit are a of 6 g/m² was formed on a surface processed by a corona discharge process of a 25 μm thick biaxially oriented polyethylene terephthalate film by spreading a mixed liquid of polyester polyol and TDI in a film and drying the film. The adhesive layers A and B were joined together to form a laminated structure 301 in Example 5.

Example 6

A laminated structure in Example 6 was formed by the same procedure as that by which the laminated structure 301 in Example 1 was formed, except that a mixed liquid prepared by mixing polyester polyol, bisphenol A-type epoxy resin, TDI and 15% by weight solid epoxy organosilane compound, concretely, 3-glycidxypropyle trimethoxysilane, was used instead of the mixed liquid prepared by mixing polyester polyol, the epoxy resin and TDI applied to the easy-to-bond layer formed on the decreased soft aluminum foil.

Comparative Example 1

A mixed liquid prepared by mixing polyester polyol, bisphenol A-type epoxy resin and TDI was applied in a film to one surface of a 20 μm thick aluminum foil (untreated foil) to form an adhesive layer of a dry weight per unit are a of 4 g/m². A surface treated by a corona discharge process of a 25 μm thick biaxially oriented polyethylene terephthalate film was boned to the aluminum foil with the adhesive layer to form a laminated structure in Comparative example 1.

The laminated structures in Examples 1 to 6 and the laminated structure in Comparative example 1 were immersed in an electrolyte heated at 60° C. and the variation of adhesive strength between the aluminum foil and the biaxially oriented polyethylene terephthalate film in each laminated structure was measured in time sequence and for the time-series analysis of the adhesive strength. Results of the time-series analysis are tabulated in Table 10-1.

Electrolyte: 1 M phosphorus lithium hexafluoride solution prepared by dissolving phosphorus lithium hexafluoride in a mixed solvent (ethylene carbonate/diethyl carbonate/dimethyl carbonate=1/1/1).

In Table 10-1, double circles indicate "hardly peelable", circles indicate "peelable", triangles indicate "easily peelable" and crosses indicate "delamination".

TABLE 10-1

| | Time of immersion (Day) | | | | | |
|---|---|---|---|---|---|---|
| | 0 | 1 | 3 | 5 | 7 | 10 |
| Example 1 | ⊚ | ⊚ | ⊚ | ○ | ○ | ○ |
| Example 2 | ⊚ | ⊚ | ⊚ | ⊚ | ○ | ○ |
| Example 3 | ⊚ | ⊚ | ⊚ | ⊚ | ○ | ○ |
| Example 4 | ⊚ | ⊚ | ⊚ | ⊚ | ⊚ | ⊚ |
| Example 5 | ⊚ | ⊚ | ⊚ | ⊚ | ⊚ | ⊚ |
| Example 6 | ⊚ | ⊚ | ⊚ | ○ | ○ | ○ |
| Comparative example 1 | ○ | X | X | X | X | X |

* A state at 0 in time of immersion is a state before immersion in the electrolyte.

As obvious from Table 10-1, the reduction with time of the adhesive strength between the aluminum foil and the biaxially oriented polyethylene terephthalate film in all the laminated structures in Examples 1 to 6 is insignificant and the laminated structures in Examples 1 to 6 are excellent in resistance to the electrolyte.

As is apparent from the foregoing description, the laminated structures according to the present invention have an excellent barrier property to inhibit the permeation of moisture and gases and an excellent resistance to the electrolyte, and the initial adhesive strength between the aluminum foil and the layer bonded to the aluminum foil in the laminated structures of the present invention is maintained.

What is claimed is:

1. A battery packaging laminated structure comprising:
at least an outermost layer, a barrier layer and an innermost layer laminated in that order;
wherein the outermost layer is formed of a formable base material, the barrier layer is formed of an impermeable aluminum base material having a barrier property, and the innermost layer is a multilayer film including two resin films, wherein the resin film on the side of the barrier layer includes an unsaturated carboxylic acid graft polyolefin resin and the resin film that defines an exterior surface of the laminated structure includes a polyolefin resin, and the barrier layer has a surface on the side of the innermost layer coated with an acid-resistant film containing a mixture of a phosphate, which may be metal and/or non-metallic, and a water-soluble synthetic resin.

2. The battery packaging laminated structure according to claim 1, wherein said one of the resin films of the innermost layer has a thickness of 10 μm or above and is formed of a material having a melting point of 80° C. or above and a Vicat softening point of 70° C. or above, and the unsaturated carboxylic acid graft polyolefin resin includes unsaturated carboxylic acid graft polyethylene resin, unsaturated carboxylic acid graft polypropylene resin or unsaturated carboxylic acid graft poly(methyl pentene) resin.

3. The battery packaging laminated structure according to claim 1, wherein said two resin films are formed by coextrusion, and one of the resin films cannot be welded to metal members but the same resin film can be adhered to itself by heat-sealing.

4. The battery packaging laminated structure according to claim 1, wherein the multilayer film is formed by coextrusion.

5. The battery packaging laminated structure according to claim 1, wherein said at least two resin films are formed by coextrusion, and one of the resin films is capable of being welded to metal members.

6. The battery packaging laminated structure according to claim 5, wherein the resin film capable of being welded to metal members is formed of at least one material selected from the group consisting of acid-modified polyolefin resin, acid-modified polyethylene resin, ethylene-acrylic acid copolymer, metal ion crosslinked polyethylene resin, copolymer of ethylene and acrylic acid derivative, copolymer of ethylene and methacrylic acid derivative, copolymer of propylene and acrylic acid derivative, copolymer of propylene and methacrylic acid derivative, and derivatives of those resins.

7. The battery packaging laminated structure according to claim 1 wherein the outermost layer comprises at least one layer selected from the group consisting of an oriented polyester resin, an oriented nylon resin, and an oriented polyamide resin.

8. The battery packaging laminated structure according to claim 7, wherein the oriented polyester resin, the oriented nylon resin or the oriented polyamide resin has a thickness of 6 μm or above.

9. The battery packaging laminated structure according to claim 7, wherein the outermost layer is polyethylene terephthalate copolymer or polybutylene terephthalate copolymer.

10. The battery packaging laminated structure according to claim 1, wherein the barrier layer is an aluminum foil having a surface on the side of the innermost layer, finished by degreasing or pickling.

11. The battery packaging laminated structure according to claim 10, wherein the barrier layer has a surface on the side of the innermost layer coated with a layer containing at least silicon dioxide, calcium carbonate, zinc, aluminum, lead suboxide, zinc oxide, zinc oxide lead cyanamide, zinc chromate, barium potassium chromate or barium zinc chromate.

12. The battery packaging laminated structure according to claim 10, wherein a surface of the barrier layer is coated with a film containing a coupling agent, and at least silicon dioxide, calcium carbonate, zinc, aluminum, lead suboxide, zinc oxide, zinc oxide lead cyanamide, zinc chromate, barium potassium chromate or barium zinc chromate.

13. The battery packaging laminated structure according to claim 10, wherein the aluminum foil has a thickness of 15 μm or above.

14. The battery packaging laminated structure according to claim 13, wherein the aluminum foil is a soft aluminum foil having an iron content in the range of 0.3 to 9.0%.

* * * * *